US012624799B2

(12) United States Patent
Jaramillo et al.

(10) Patent No.: US 12,624,799 B2
(45) Date of Patent: May 12, 2026

(54) SYSTEM AND/OR METHOD FOR HYDROGEN REFUELING

(71) Applicant: Verne Inc., San Francisco, CA (US)

(72) Inventors: David E. Jaramillo, San Francisco, CA (US); Julio Moreno-Blanco, Leon (MX); Salvador Martin Aceves, Salamanca (MX)

(73) Assignee: Verne Inc., San Francisco, CA (US)

( * ) Notice: Subject to any disclaimer, the term of this patent is extended or adjusted under 35 U.S.C. 154(b) by 0 days.

(21) Appl. No.: 19/196,645

(22) Filed: May 1, 2025

(65) Prior Publication Data

US 2025/0341286 A1 Nov. 6, 2025

Related U.S. Application Data

(60) Provisional application No. 63/641,156, filed on May 1, 2024.

(51) Int. Cl.
*F17C 5/06* (2006.01)

(52) U.S. Cl.
CPC ........ *F17C 5/06* (2013.01); *F17C 2205/0138* (2013.01); *F17C 2205/037* (2013.01); *F17C 2221/012* (2013.01); *F17C 2223/0161* (2013.01); *F17C 2223/036* (2013.01); *F17C 2227/015* (2013.01); *F17C 2227/0302* (2013.01); *F17C 2227/0355* (2013.01); *F17C 2265/065* (2013.01)

(58) Field of Classification Search
CPC ................ F17C 5/06; F17C 2205/0138; F17C 2205/037; F17C 2221/012; F17C 2223/0161; F17C 2223/036; F17C 2227/015; F17C 2227/0302; F17C 2227/0355; F17C 2265/065
USPC .......................................................... 141/11
See application file for complete search history.

(56) References Cited

U.S. PATENT DOCUMENTS 2,507,778 A 5/1950 Frey
3,650,290 A 3/1972 Moen et al.
(Continued)

FOREIGN PATENT DOCUMENTS

CN 107076055 A 8/2017
CN 115468109 A * 12/2022 ............. F17C 13/00
(Continued)

OTHER PUBLICATIONS

"Cryogas/Cryo-Compressed Hydrogen Gas Fueling", Apr. 21, 2021, Cryomotive, p. 15 (Year: 2021).*
(Continued)

*Primary Examiner* — Kenneth Rinehart
*Assistant Examiner* — Stephanie A Shrieves
(74) *Attorney, Agent, or Firm* — Jeffrey Schox; Evan Myers

(57) ABSTRACT

A system for hydrogen dispensation can include: a hydrogen collector; a cryo-compressed buffer storage system; and a hydrogen dispenser. The system functions to facilitate hydrogen fueling/dispensation (e.g., rapid dispensation) while additionally utilizing hydrogen storage in a cryo-compressed hydrogen state. The system and/or method may be implemented in any general use case that requires hydrogen storage and/or hydrogen refueling.

20 Claims, 41 Drawing Sheets
(14 of 41 Drawing Sheet(s) Filed in Color)

(56) References Cited

U.S. PATENT DOCUMENTS

| | | | | |
|---|---|---|---|---|
| 4,608,831 | A | 9/1986 | Gustafson | |
| 4,625,753 | A | 12/1986 | Gustafson | |
| 4,783,969 | A | 11/1988 | Hohol | |
| 4,988,014 | A | 1/1991 | Varghese et al. | |
| 5,261,764 | A | 11/1993 | Walles | |
| 5,579,654 | A | 12/1996 | Longsworth et al. | |
| 6,186,356 | B1 | 2/2001 | Berkley et al. | |
| 6,354,088 | B1 | 3/2002 | Emmer et al. | |
| 6,357,238 | B1 | 3/2002 | Brothers | |
| 6,374,618 | B1 | 4/2002 | Lak | |
| 6,401,963 | B1 | 6/2002 | Seal et al. | |
| 6,708,502 | B1 | 3/2004 | Aceves et al. | |
| 6,769,262 | B1 | 8/2004 | Gray | |
| 6,802,875 | B1 | 10/2004 | Kimbara et al. | |
| 7,032,768 | B2 | 4/2006 | Felbaum | |
| 7,036,324 | B2 | 5/2006 | Bradley et al. | |
| 7,263,845 | B2 | 9/2007 | Lee | |
| 7,264,025 | B2 | 9/2007 | Farese et al. | |
| 7,293,418 | B2 | 11/2007 | Noble et al. | |
| 7,911,071 | B2 | 3/2011 | Devine | |
| 8,460,408 | B2 | 6/2013 | Inoue et al. | |
| 9,057,483 | B2 | 6/2015 | Espinosa-Loza et al. | |
| 9,291,309 | B2 | 3/2016 | Gupta et al. | |
| 9,494,282 | B2 | 11/2016 | Kampitsch et al. | |
| 9,640,808 | B2 | 5/2017 | Brunner et al. | |
| 9,677,713 | B1 | 6/2017 | Aceves et al. | |
| 9,777,889 | B2 | 10/2017 | Leachman et al. | |
| 9,784,410 | B2 | 10/2017 | Brunner et al. | |
| 9,863,581 | B2 * | 1/2018 | Santos | F17C 5/06 |
| 10,006,697 | B2 * | 6/2018 | Varrassi | F17C 13/126 |
| 10,054,262 | B2 | 8/2018 | Baust et al. | |
| 10,087,896 | B1 | 10/2018 | Perez | |
| 10,145,509 | B2 * | 12/2018 | Nagura | F17C 5/06 |
| 10,323,794 | B2 | 6/2019 | Leachman et al. | |
| 11,009,185 | B2 | 5/2021 | Li et al. | |
| 11,060,665 | B2 | 7/2021 | Thieu et al. | |
| 11,137,116 | B2 | 10/2021 | Winand et al. | |
| 11,155,459 | B2 | 10/2021 | Crispel et al. | |
| 11,725,780 | B2 * | 8/2023 | Santos | F17C 1/12 62/53.2 |
| 2002/0029821 | A1 * | 3/2002 | Ovshinsky | C22C 22/00 141/231 |
| 2003/0189053 | A1 | 10/2003 | Felbaum | |
| 2005/0183424 | A1 * | 8/2005 | Bradley | F17C 11/005 705/413 |
| 2005/0287407 | A1 * | 12/2005 | Bushko | H01M 8/04208 141/82 |
| 2006/0156742 | A1 | 7/2006 | Farese et al. | |
| 2008/0127654 | A1 | 6/2008 | Barker et al. | |
| 2009/0199574 | A1 * | 8/2009 | Hirose | F17C 11/005 62/50.7 |
| 2009/0200318 | A1 | 8/2009 | Handa | |
| 2009/0308083 | A1 * | 12/2009 | Brunner | F17C 9/02 62/50.2 |
| 2010/0236259 | A1 | 9/2010 | Brunner et al. | |
| 2013/0299504 | A1 | 11/2013 | Koppert et al. | |
| 2014/0130896 | A1 | 5/2014 | Mayr | |
| 2014/0263358 | A1 | 9/2014 | Espinosa-Loza et al. | |
| 2015/0033674 | A1 | 2/2015 | Downie et al. | |
| 2015/0121905 | A1 | 5/2015 | Watts | |
| 2015/0300571 | A1 | 10/2015 | Szoucsek | |
| 2015/0330573 | A1 * | 11/2015 | Petitpas | F17C 5/06 222/3 |
| 2016/0159450 | A1 | 6/2016 | Yoo et al. | |
| 2016/0230931 | A1 | 8/2016 | Reese et al. | |
| 2016/0348841 | A1 | 12/2016 | Jones et al. | |
| 2017/0059089 | A1 | 3/2017 | Uchida et al. | |
| 2017/0074458 | A1 * | 3/2017 | Handa | F17C 5/06 |
| 2017/0102110 | A1 * | 4/2017 | Lomax | F17C 5/06 |
| 2017/0146193 | A1 | 5/2017 | Aceves et al. | |
| 2018/0231182 | A1 | 8/2018 | Posselt | |
| 2018/0313496 | A1 | 11/2018 | Garner et al. | |
| 2018/0346313 | A1 | 12/2018 | Feng et al. | |
| 2019/0331299 | A1 | 10/2019 | Lose et al. | |
| 2020/0173608 | A1 | 6/2020 | Heisch | |
| 2020/0200326 | A1 | 6/2020 | Aceves et al. | |
| 2020/0224825 | A1 | 7/2020 | Winand et al. | |
| 2021/0198095 | A1 | 7/2021 | Fairy | |
| 2021/0199244 | A1 | 7/2021 | Fairy | |
| 2021/0247024 | A1 | 8/2021 | Kronholz et al. | |
| 2021/0269301 | A1 * | 9/2021 | Feng | F17C 9/02 |
| 2021/0270522 | A1 | 9/2021 | Molter et al. | |
| 2022/0090739 | A1 * | 3/2022 | Stager | F17C 7/04 |
| 2023/0282851 | A1 * | 9/2023 | Beaufrere | H01M 8/04089 429/428 |
| 2023/0392752 | A1 | 12/2023 | Mcklveen et al. | |
| 2024/0118023 | A1 * | 4/2024 | Minas | F17C 5/06 |
| 2024/0263743 | A1 * | 8/2024 | Lacapere | F17C 5/06 |
| 2025/0172244 | A1 | 5/2025 | Jaramillo et al. | |

FOREIGN PATENT DOCUMENTS

| | | | |
|---|---|---|---|
| DE | 102008053463 | A1 | 5/2010 |
| DE | 102014207300 | A1 | 10/2015 |
| DE | 102015219984 | A1 | 4/2017 |
| DE | 102015219985 | A1 | 4/2017 |
| DE | 102016220146 | A1 | 4/2018 |
| DE | 102019125184 | A1 | 3/2021 |
| DE | 102019125185 | A1 | 3/2021 |
| DE | 102019125186 | A1 | 3/2021 |
| DE | 102020107562 | A1 | 9/2021 |
| EP | 0840056 | A1 | 5/1998 |
| EP | 1915566 | B1 | 3/2009 |
| EP | 2466186 | A1 | 6/2012 |
| EP | 2535585 | A1 | 12/2012 |
| EP | 3353462 | A1 | 8/2018 |
| EP | 3173041 | B1 | 2/2019 |
| FR | 2636122 | A2 | 3/1990 |
| WO | 2021052994 | A2 | 3/2021 |
| WO | 2021138169 | A1 | 7/2021 |

OTHER PUBLICATIONS

CN-115468109-A English Translation of Specification (Year: 2025).*

"Heavy Duty Event CRYOGAS Technology Brunner Forstner Cryomotive min", Cyromotive, https://cleanenergypartnership.de/wp-content/uploads/2022/03/Heavy-Duty-Event-CRYOGAS-Technology_BrunnerForstner-Cryomotive-min.pdf, Apr. 21, 2021.

"PCT Third Party Observation", for PCT/US23/080841, dated Jul. 19, 2024.

Brunner, et al., "Heavy Duty Event—CRYOGAS / Cryo-compressed hydrogen gas fueling", https://www.youtube.com/watch?v=20Q4nd5psas, Apr. 21, 2021.

Duschek, et al., "CCH2—Cryo-Compressed Hydrogen Gas Gaseous Hydrogen Land Vehicle Refuelling Process White Paper Process", Cryomotive, White Paper Process CcH2, Release 1.2, https://cleanenergypartnership.de/wp-content/uploads/2022/03/20211201_CcH2_Refuelling-min.pdf, published Dec. 1, 2021.

Gardiner, et al., "Cryomotive ot manufacture first CRYOGAS hydrogen storage vessels using Mikrosam winder", CompositesWorld.com, Sep. 21, 2022, https://www.compositesworld.com/news/cryomotive-to-manufacture-first-cryogras-hydrogen-storage-vessels-using-mikrosam-winder.

Jaramillo, et al., "Compact Inserts for Cyro-Compressed Storage Vessels", U.S. Appl. No. 18/689,028, filed Mar. 4, 2024.

Jaramillo, et al., "System and Method for Cryo-Compressed Hydrogen Production and Utilization", U.S. Appl. No. 19/128,742, filed May 9, 2025.

Nallienger, Michal, "The Fuel Conundrum for H2-Trucking", H2-international Issue No. 3, 34-37, Aug. 2022.

Petitpas, et al., "Para-H2 to ortho-H2 conversion in a full-scale automotive cryogenic pressurized hydrogen storage up to 345 bar", International Journal of Hydrogen Energy vol. 39, Issue 12, Feb. 25, 2014.

* cited by examiner

High densities are maintained for $CcH_2$ rapid refueling

SYSTEM AND/OR METHOD FOR HYDROGEN REFUELING

CROSS REFERENCE TO RELATED APPLICATIONS

This application claims the benefit of U.S. Provisional Application No. 63/641,156, filed 1 May 2024, which is incorporated herein in its entirety by this reference.

This application related to PCT Application Number is PCT/US2023/080841, filed 22 Nov. 2023, which claims the benefit of U.S. Provisional Application No. 63/427,814, filed 22 Nov. 2022, each of which is incorporated herein in its entirety by this reference.

STATEMENT OF GOVERNMENT SUPPORT

This invention was made with government support under Award Number DE-AR0001670 awarded by the Department of Energy. The government has certain rights in the invention.

TECHNICAL FIELD

This invention relates generally to the hydrogen storage field, and more specifically to a new and useful hydrogen refueling system and/or method in the hydrogen storage field.

BACKGROUND

Liquid hydrogen refueling for heavy-duty transportation, such as for Class 8 trucks, relies on liquid hydrogen cryo-pumps. These pumps are energy efficient but suffer from low refueling rates (<3 kg/min). Increasing the refueling rates to >8 kg/min with these systems can be cost prohibitive. Such pumps can be a major cost factor for refueling stations and can slow the deployment of fast-refueling stations for trucks, as an example. Furthermore, such pumps, especially at high power operations will require frequent maintenance, which may not be acceptable for the constant refueling needs of trucking.

Cryo-compressed hydrogen ($CcH_2$) storage is a combination of the attributes of compressed gaseous hydrogen ($GH_2$) storage and liquid hydrogen ($LH_2$) storage. One of the disadvantages of compressed hydrogen storage is that large volumes and high pressures are required to store sufficient energy for desired applications. Some of the main disadvantages of liquid hydrogen storage are boil-off losses, high operational complexity, high-costs, and a centralized supply chain. Cryo-compressed hydrogen storage serves to address some of these challenges, and to enable a solution that combines the availability and usability of $GH_2$ with the high densities of $LH_2$.

By leveraging the properties of cryo-compressed hydrogen buffer storage, faster and more efficient means of hydrogen fueling may be achieved. This system and method provide such a solution.

BRIEF DESCRIPTION OF THE FIGURES

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
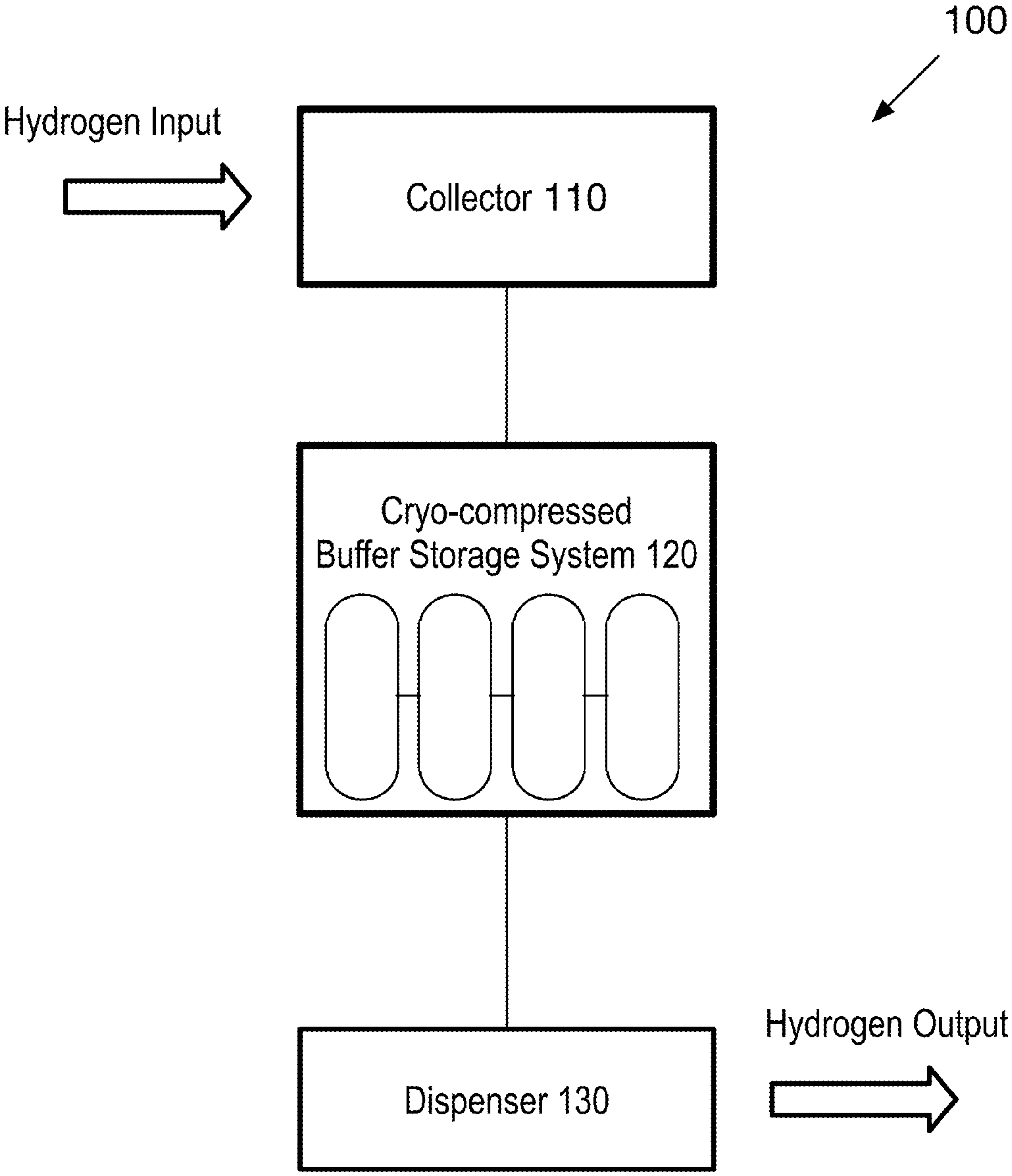
FIG. 1 is a schematic for an example system.

The system for hydrogen dispensation 100, an example of which is shown in FIG. 1, can include: a hydrogen collector 110; a cryo-compressed buffer storage system 120; and a hydrogen dispenser 130. The system functions to facilitate hydrogen fueling/dispensation (e.g., rapid dispensation) while additionally providing hydrogen storage via a cryo-compressed hydrogen state.

A method for fast hydrogen refueling includes: collecting a hydrogen fuel; converting the hydrogen to a cryo-compressed state and storing it in a buffer storage; and dispensing the hydrogen fuel. The system and method function to provide energy-efficient and energy-dense hydrogen fuel storage and a means of fast refueling with hydrogen.

The system and method can decouple the refueling rates (and/or hydrogen dispensation rate) from a hydrogen cryo-pump. For example, a hydrogen pump dispenses hydrogen at a (comparatively) slow and reliable rate into a cryo-compressed hydrogen buffer storage system. As the hydrogen is pressurized and remains cold, it can be subsequently dispensed (e.g., comparatively more quickly; at a larger mass flow rate), driven by the differential pressure ($\Delta P$), into various types of on-board truck systems such as cryo-compressed hydrogen storage vessels or regular compressed vessels.

The system and method may be implemented in any general use case that requires hydrogen storage and hydrogen refueling. The system and method may be particularly useful for use cases where there is a need for high-density hydrogen and fast refueling (i.e., faster relative to the maximum mass flowrate of the hydrogen pump within the architecture). The system and method may be particularly useful as an improvement over current refueling systems and methods that utilized liquid. For example, stations that have $LH_2$ delivered but ultimately dispense compressed hydrogen to fill ambient 700 bar tanks, as is common today.

Variants can include or operate in conjunction with the system(s) and/or method(s) as described in U.S. application Ser. No. 18/842,615, filed 29 Aug. 2024, and U.S. application Ser. No. 18/259,902, filed 29 Jun. 2023, each of which is incorporated herein in its entirety by this reference, Variations of the technology can be used with a single-port storage vessel (e.g., directly pressurizing the receiving vessel) or a multi-port vessel.

In a first variant, the system can dispense directly into a single-port storage vessel, which may directly pressurize the receiving vessel with the hydrogen source flow from buffer storage.

In a second variant, the system can circulate the dispensing flow through a multi-port receiving vessel (e.g., hydrogen dispensation into a first port/inlet 10; recirculation through a second port/outlet 20), which may increase the maximum storage density (e.g., by about 20%) by reducing hydrogen compression (and a corresponding heating effect) within the receiving tank 200, as the hydrogen dispensing flow is at higher pressure (and lower temperature) than the receiving tank 200 during dispensation. Thus, at an equilibrium and/or target/terminal pressure, the hydrogen within the receiving tank 200 may be at lower temperature (e.g., compared to the first variant), thus increasing the storage density at a given storage pressure. As an example, the system can achieve a hydrogen temperature of about 80K at pressure of about 350-500 bar, with a hydrogen source flow of about 77K (e.g., where LN2 is used for the cryogenic cooling). As a second example, liquified hydrogen can be warmed within buffer storage.

In a third variant, nonexclusive with the first or second variants, a cascade of buffer storage tanks can be sequentially operated to achieve a target fill pressure (e.g., partially depleted to increase the pressure differential between the buffer storage and the receiving vessel).

In a fourth variant, buffer storage hydrogen can be warmed during dispensation to increase the pressure differential (e.g., to allow complete depletion of the storage capacity). Alternatively, the buffer storage hydrogen may be only partially depleted during dispensation (e.g., to achieve comparatively lower temperatures at the receiving vessel and/or higher densities, absent auxiliary cooling during dispensation).

In a fifth variant, buffer storage can be cooled (e.g., via a liquid nitrogen heat exchanger) during dispensation. Alternatively, the dispensation flow can be driven entirely preconditioned, without auxiliary cooling.

However, the system can be otherwise configured.

In a first set of variants, a cascade system for cryo-compressed hydrogen (CcH2) dispensation comprising: a cryogenic pump; a plurality of cryogenic buffer storage tanks, each housing CcH2 and configured to be selectively fluidly coupled to the cryogenic pump; a hydrogen dispenser comprising set of fluid connections configured to be selectively coupled to the plurality of cryogenic buffer storage tanks; and a receiving tank 200 comprising: a first inlet port and a second outlet port, the first inlet port coupled to a first fluid connection 131 of the hydrogen dispenser 130, wherein CcH2 pressure within the first fluid connection is configured to circulate CcH2 through the second outlet port.

In one or more variants, the second outlet port is configured to be selectively fluidly coupled to a cryogenic buffer storage tank of the plurality via a second fluid connection 132 of the hydrogen dispenser 130 to reduce temperature rise due to hydrogen compression within the receiving tank 200 during CcH2 dispensation. In one example, the first fluid connection is configured to catalyze hydrogen spin-state conversion.

In one or more variants, the plurality of cryogenic buffer storage tanks comprises a cascade filling system based on $CcH_2$ pressure.

In a second set of variants, nonexclusive with the first set, a method for managing cryo-compressed hydrogen comprising: compressing a mass of hydrogen gas ($GH_2$) using a compressor; cooling the mass of compressed hydrogen gas ($CGH_2$) to a cryo-compressed hydrogen ($CcH_2$) state; storing the mass of $CcH_2$ in a plurality of cryogenic buffer storage tanks; dispensing, from the plurality of cryogenic buffer storage tanks, a first portion of the mass of $CcH_2$ by cascade filling; and concurrently with dispensing the first portion of the mass of $CcH_2$, cooling the first portion and catalyzing a hydrogen spin state conversion.

In one or more variants, the method further comprising: dispensing a second portion of the mass of $CcH_2$, from at least one cryogenic buffer storage tank of the plurality; and heating the second portion to produce $CGH_2$. In a first variant, the first and second portion comprise hydrogen gas from a first cryogenic buffer storage tank of the plurality of cryogenic buffer storage tanks.

In one or more variants, the first portion of the mass of $CcH_2$ is dispensed into a receiving tank via a first fluid connection, the method further comprising: contemporaneously with dispensing the first portion of the mass of $CcH_2$, evacuating a subset of the first portion through an outlet of the receiving tank contemporaneous with dispensation into the receiving tank. In a first variant, the method further comprising: externally cooling the subset of the first portion relative to the receiving tank; and, subsequently, storing the subset of the first portion. In one example, the subset of the first portion is stored in a cryogenic buffer storage tanks tank of the plurality. In a second variant, evacuating the subset of the first portion reduces compressive heating of $CcH_2$ within the receiving tank by the first fluid connection. In a first example, a fluid pressure within the first fluid connection is above 350 bar. In a second example, the pressure differential across the receiving tank is less than 50 bar.

In one or more variants, the mass flow rate of dispensation of the first portion is more than double a maximum mass flow rate of the compressor.

In one or more variants, the plurality of cryogenic buffer tanks defines a cascade of $CcH_2$ pressures, wherein dispensing the first portion of the mass of $CcH_2$ comprises selectively dispensing from the plurality of cryogenic buffer tanks, based on the cascade of $CcH_2$ pressures, from lowest to highest $CcH_2$ pressure. In a first variant, selectively dispensing from the plurality of cryogenic buffer tanks is further based on a $CcH_2$ ortho-concentration.

In one or more variants, the method further comprising: after dispensing from a first tank of the plurality, selectively heating a depleted tank to increase the $CcH_2$ pressure.

In one or more variants, the method further comprising venting gaseous hydrogen from the plurality of cryogenic buffer storage tanks; and recycling the gaseous hydrogen to the compressor.

In one or more variants, the first portion is cooled using liquid nitrogen ($LN_2$).

In one or more variants, the first portion is cooled using a refrigeration system.

2. Benefits

Variations of the technology can afford several benefits and/or advantages. The system and method are not limited to always providing such benefits and are presented only as exemplary representations for how the system and method may be put to use. The list of benefits is not intended to be exhaustive and other benefits may additionally or alternatively exist.

First, by decoupling the cryogenic hydrogen pump from the refueling process, via a cryo-compressed hydrogen buffer storage system, the system and method provide the potential benefit of removing the cryogenic hydrogen pumps limitation from the refueling process (e.g., a current standards may rely on cryogenic hydrogen pumps to drive the fueling flow rates).

Second, the system and method may additionally provide the potential benefit of flexible refueling. That is, the system and method may provide multiple fuel outputs (e.g., ambient hydrogen gas, compressed hydrogen gas, liquid hydrogen, cryo-compressed hydrogen, etc.) thereby enabling a fueling station to fuel different types of vehicles and machinery. This would enable the refueling asset to have very high utilization, increasing the profitability of the solution and therefore commercial deployment. This is currently a major bottleneck for the industry. For cryo-compressed hydrogen operations, despite transferring the hydrogen into a buffer storage system before it enters onto a truck system, the system and method may provide the potential benefit of keeping the temperature of the hydrogen low enough so that it remains a very high-density fuel.

Third, fast refueling may be maintained and improved without the need to scale up the pump operations. This is particularly important as the cryo-pump can be the main cost driver for a hydrogen refueling station, especially when it is exhibits high flow rates. The system and method may enable faster refueling rates without the need to scale up the piston and power operations of the liquid hydrogen cryo-pump. Additionally, by not requiring more expensive and faster flowing cryo-pumps to drive the refueling flow rate, the system and method provide the potential benefit of improved reliability, since multiple cheaper cryo-pumps may be incorporated to improve redundancy. Furthermore, instead of having one, expensive fast-flow pump, a storage system is installed, which has minimal moving parts and has a much longer average time between required maintenance events.

Fourth, for ambient refueling applications, the system and method provide and improved cost of operations by not requiring a large coolant heat exchanger, which can be a major cost element to the operations of a fueling station. The system and method also provide the benefit of efficient hydrogen storage with less waste as compared to liquid hydrogen systems. That is, any venting (i.e., boil off) that would occur from liquid hydrogen tanks may be transferred to the cryo-compressed hydrogen storage system, thereby preventing hydrogen fuel loss. This fuel is effectively recaptured and can be dispensed into a vehicle. The system and method allow refueling to a truck, for example, to occur via the cryo-pump and via the cryo-compressed buffer storage system. This multi-route refueling option provides additional variables that can be optimized to lower the cost of the station. For example, the buffer storage systems can be designed to be lower pressure. The refueling via the cryo-pump then helps meet the desired pressure on the truck when it is above the buffer storage pressure.

Additionally or alternatively, the system and/or method can provide any other suitable benefits, such as, but not limited to, any or all of: enabling hydrogen to be pressurized and remain cold during dispensing, and further dispensed based on a pressure differential into various types of on-board truck systems (e.g., cryo-compressed hydrogen storage vessels or regular compressed vessels) with rapid refueling (e.g., greater than 7.2 kg/min) possible, where in dispensing to regular compressed vessels, only minor heating is needed; enabling fast refueling without needing to scale up the piston and power operations of the liquid hydrogen cryo-pump; enabling commercially available pumps to be coupled to $CcH_2$ buffer storage to enable >8 kg/min, greatly simplifying the CAPEX and OPEX for rapid refueling of both $CcH_2$ storage systems and ambient 350 and 700 bar storage systems; providing an energy efficient pathway as it avoids the need of having to use a coolant heat exchanger, and any venting that occurs from the $LH_2$ system can be transferred to the buffer $CcH_2$ storage system; enabling the on-board truck system to be directly filled via the $CcH_2$ buffer storage system and the $LH_2$ cryo-pump, which unlocks key variables that can be optimized to design a station (e.g., the $CcH_2$ buffer storage can be at a lower pressure, which can drive down the cost—for instance, the pressure can be 175 bar. If tank is at 60 K, these exhibits densities of 57 g/L; to finalize the fill, the direct line from the cryo-pump can be utilized, where the pump can do the last 20% of the fill); and/or any other benefits.

However, variations of the technology can additionally or alternately provide any other suitable benefits and/or advantages.

3. System

The system for hydrogen dispensation 100, an example of which is shown in FIG. 1, can include: a hydrogen collector 110; a cryo-compressed buffer storage system 120; and a hydrogen dispenser 130. The system functions to facilitate hydrogen fueling/dispensation (e.g., rapid dispensation) while additionally providing hydrogen storage via a cryo-compressed hydrogen state.

As a system for collection and dispensation of hydrogen, in many variations the system may thus include additional components to interact with complementary systems. That is, the system preferably includes the appropriate tubes, hoses, nozzles, valves, latches, etc., such that it is able to collect and dispense hydrogen from the desired sources and destinations. For example, in some variations, the system may include a connector to collect liquid hydrogen from liquid hydrogen tanks. In another example, the system may include the appropriate fueling nozzle to dispense hydrogen fuel to a class 8 hydrogen fueled truck at high flow rates.

Figure 2:
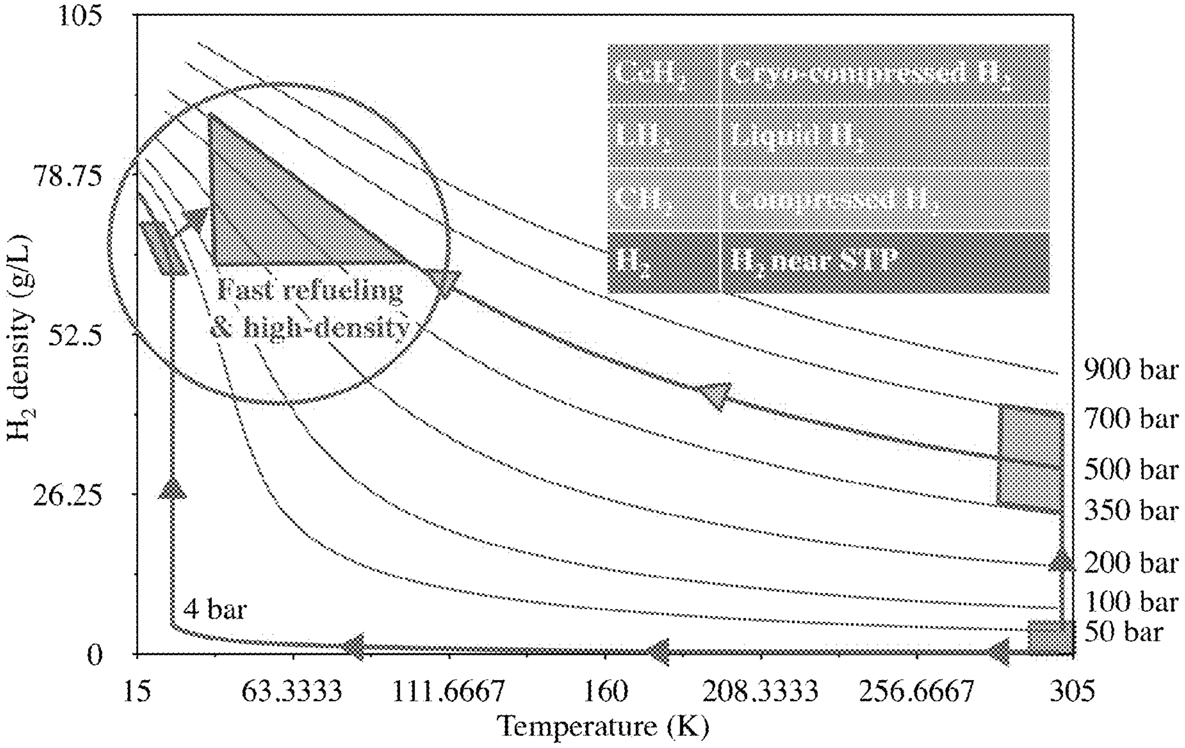
FIG. 2 is a hydrogen phase diagram that includes pathways for cryo-compressed hydrogen formation.
Figure 3:
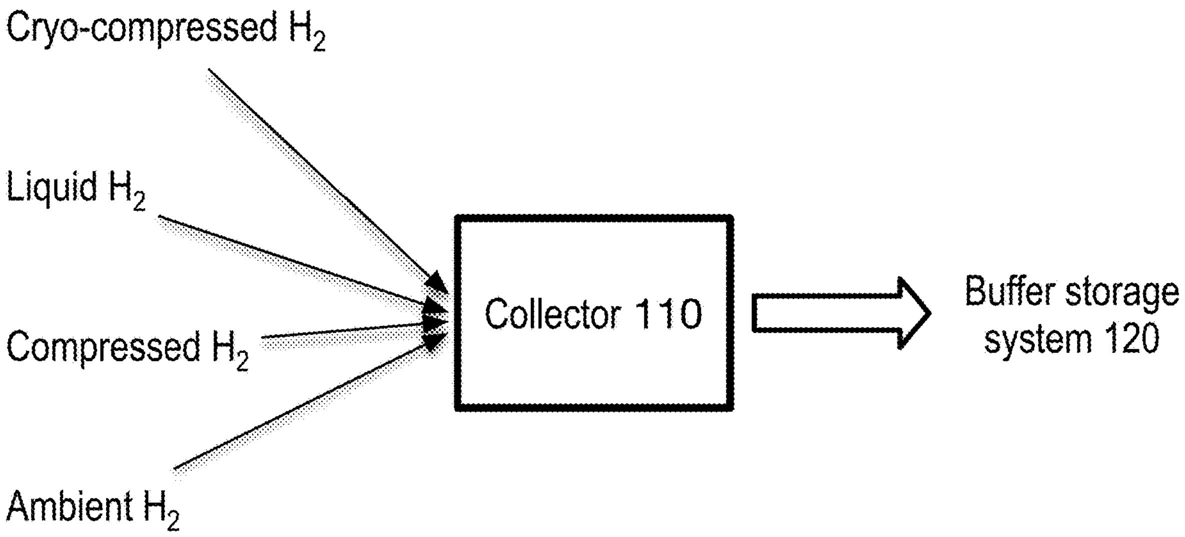
FIG. 3 is a schematic of example embodiments of the hydrogen collector.
Figure 4:
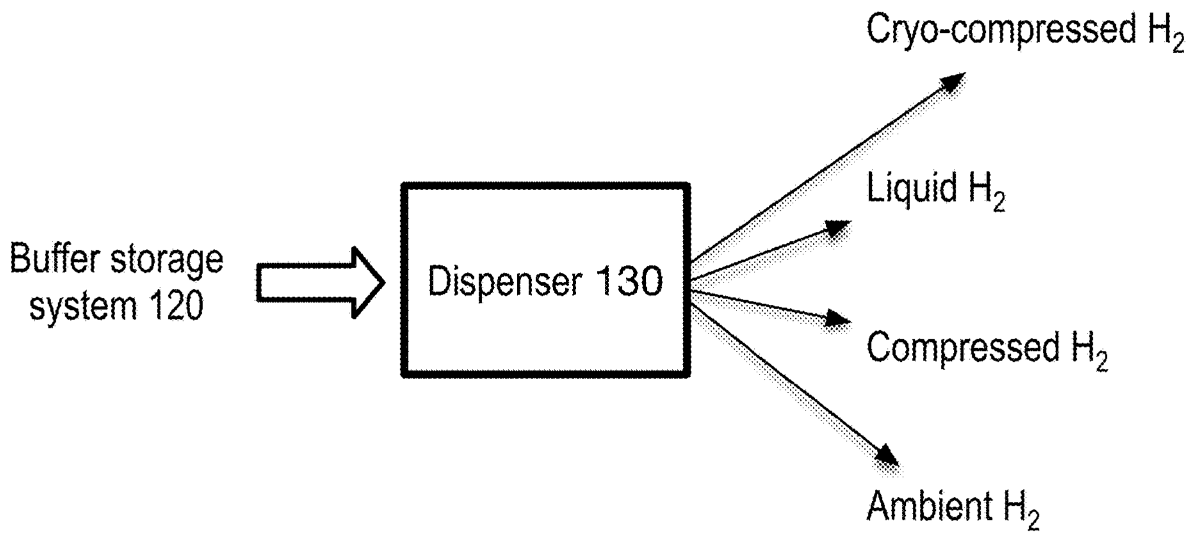
FIG. 4 is a schematic of example embodiments of the hydrogen dispenser.

The system may have different embodiments, dependent on the desired use case, the system comprises components that "collect" and store hydrogen from any initial state (e.g., gaseous hydrogen, liquid hydrogen) with any initial thermodynamic conditions appropriate to that state (e.g., room temperature, cooled or subcooled, sea level pressure, pressurized/compressed, etc.), and fuel/dispense the hydrogen in a desired state with any thermodynamic conditions appropriate for that state (e.g., $H_2$ at room temperature or near STP, compressed $H_2$, liquid $H_2$, cryo-compressed $H_2$, etc.). As shown in the phase diagram in FIG. 2 and the schematic drawings of FIGS. 3 and 4, these different embodiments may be highlighted in the initial/final form of hydrogen to be collected/dispensed, and the different potential pathways that can be taken to convert between the initial/final hydrogen state and the cryo-compressed hydrogen state. Very often, these different use cases may be set by the initial state of hydrogen input and how the hydrogen will be used (e.g., sporadic hydrogen use for a truck, continuous use for a generator for a data center, etc.). FIG. 2 shows two exemplary routes to get to the cryo-compressed hydrogen state, starting with near STP hydrogen. Once the hydrogen is in the cryo-compressed state, and stored in the cryo-compressed buffer storage system, fast refueling with high-densities is possible.

Figure 9:
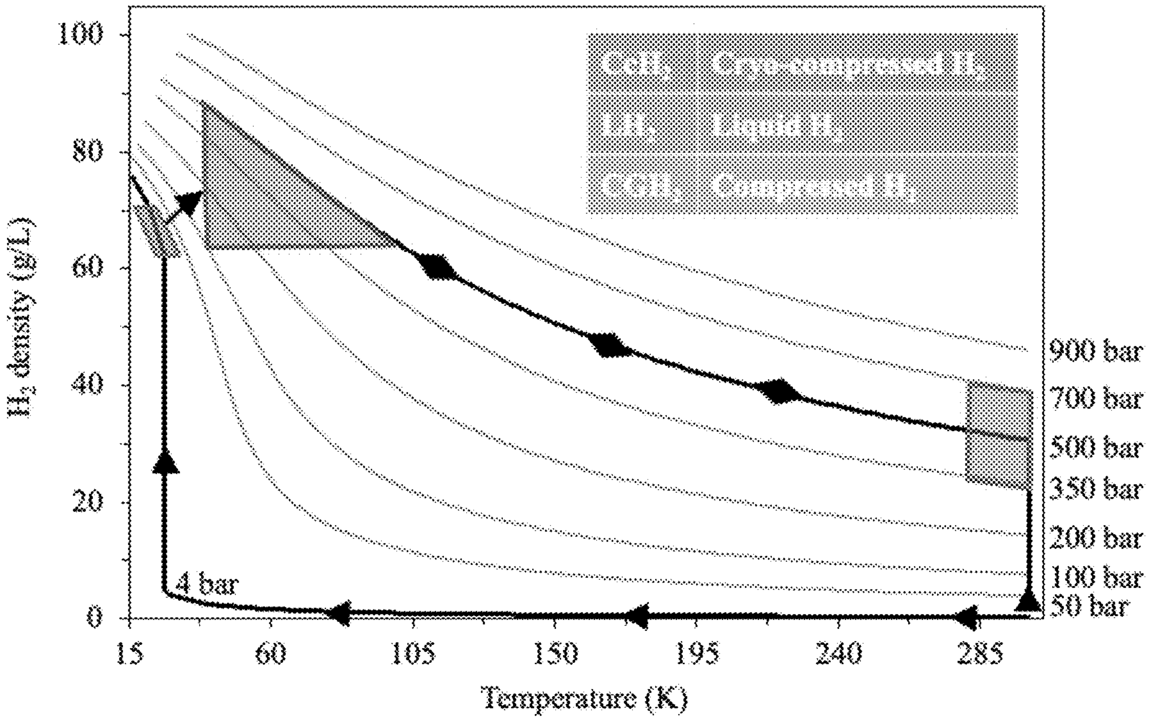
FIG. 9 is a hydrogen phase diagram that includes pathways between ambient temperature and pressure hydrogen and cryo-compressed hydrogen.
Figure 18:
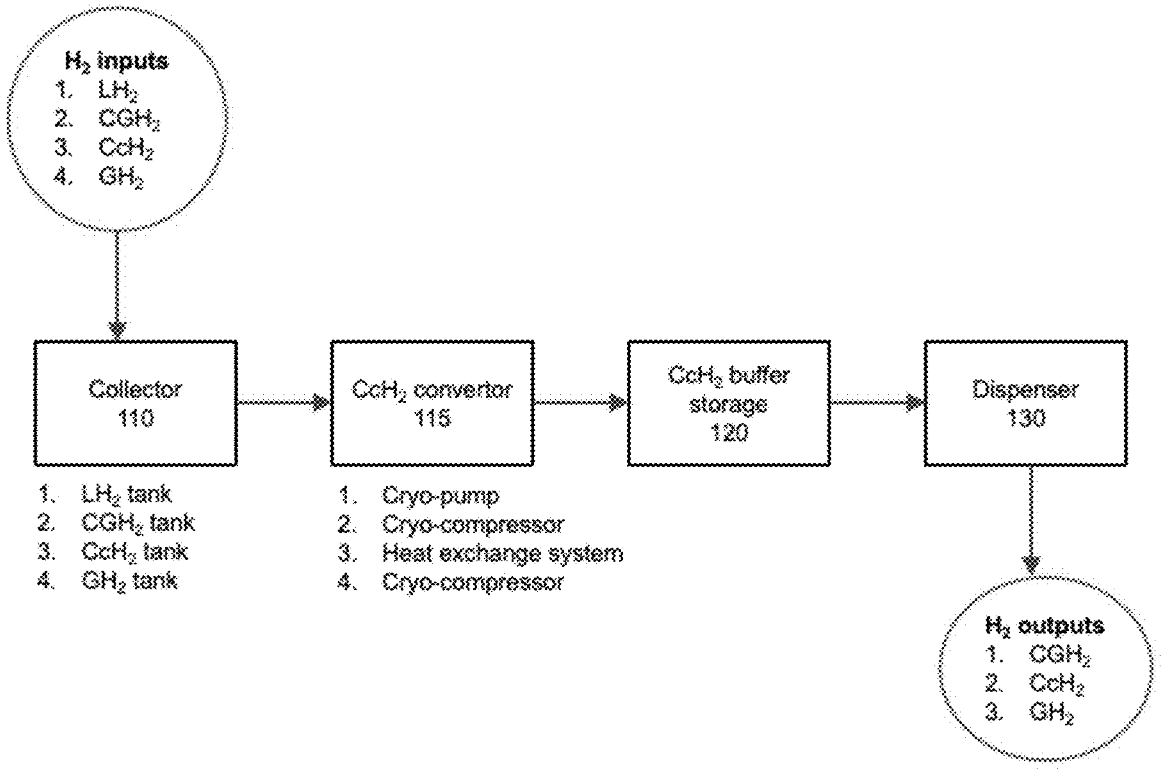
FIG. 18 is a flowchart of an example method.
Figure 19:
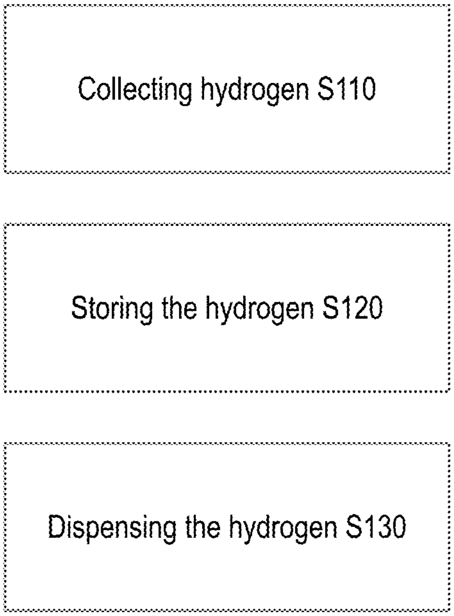
FIG. 19 is a flowchart of an example method.
Figure 20:
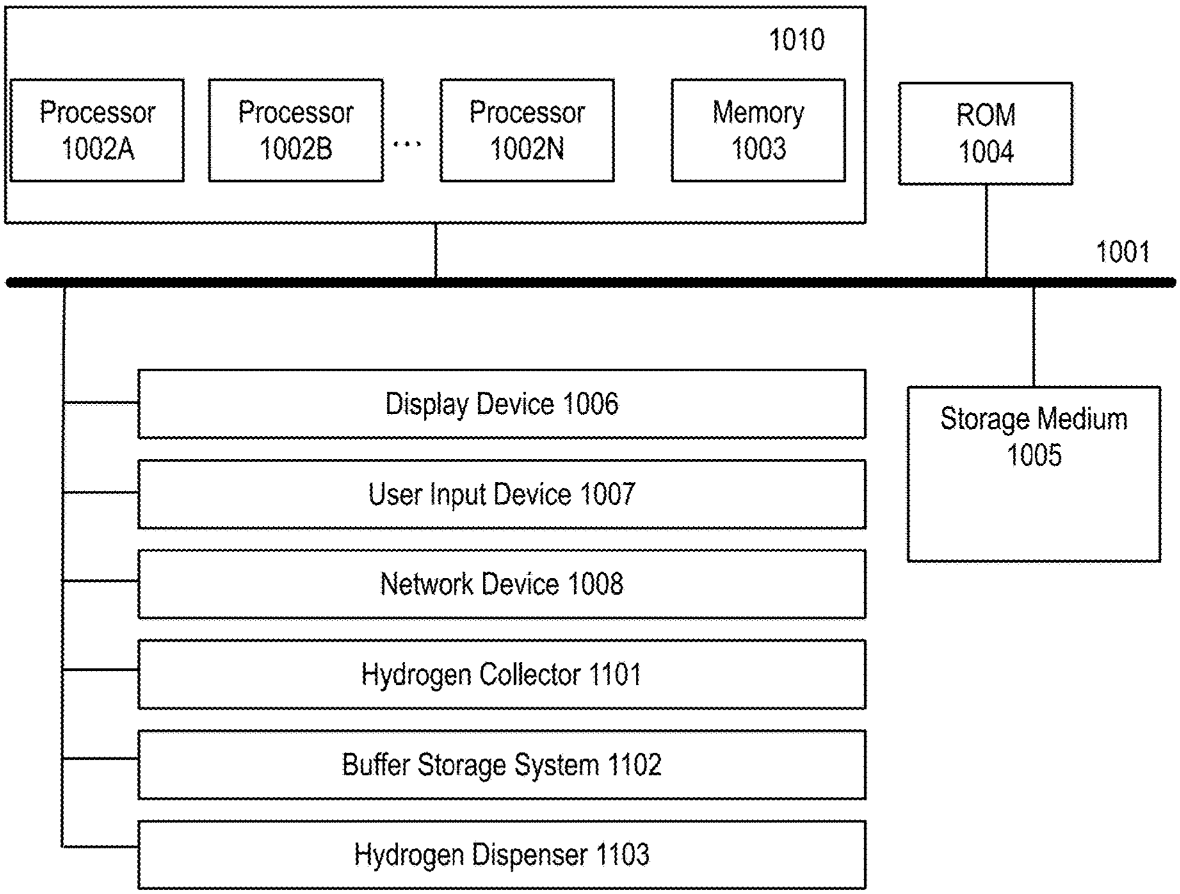
FIG. 20 is an exemplary system architecture that may be used in implementing the system and/or method.

As shown in FIG. 18, the system may be configured to support one or more sources. Depending on the fuel source, the system may additionally include a converter 115 which functions to convert the fuel source to a cryo-compressed state. As shown in FIG. 9, there may be various paths to transiting from some hydrogen fuel state to a cryo-compressed state-such as transitioning from liquid to cryo-compressed, or from compressed hydrogen to cryo-compressed hydrogen. A converter system 115 may also function to transition from any suitable initial state, potentially using an intermediary state such as transitioning from hydrogen near STP to cryo-compressed state by using an intermediary liquid state or an intermediary compressed state.

Additionally for each input variation, the system may also be adapted to output different forms of hydrogen fuel when dispensing. In some variations, the dispensed hydrogen fuel could be $CGH_2$, $CcH_2$, or $GH_2$. In multimodal variations, the system could dispense in multiple forms. A multi-modal variation could be used to selectively dispense in different hydrogen fuel states. For example, the system may selectively engage a dispenser to dispense an appropriate form of hydrogen fuel. A multi-modal variation may also be one where a cryo-compressed buffer storage system 120 is used to supply multiple dispensing systems simultaneously, and those different dispensing systems dispense different forms of hydrogen fuel.

Figure 5:
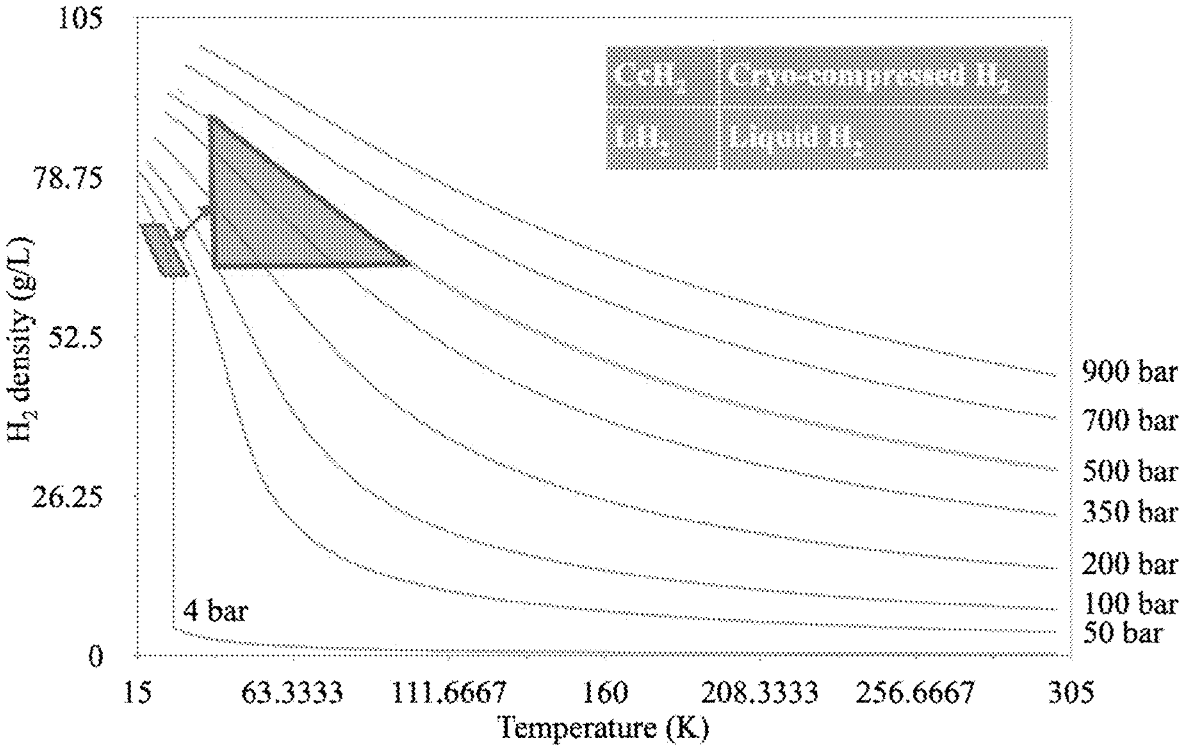
FIG. 5 is a hydrogen phase diagram that includes pathways between liquid hydrogen and cryo-compressed hydrogen.
Figure 6A:
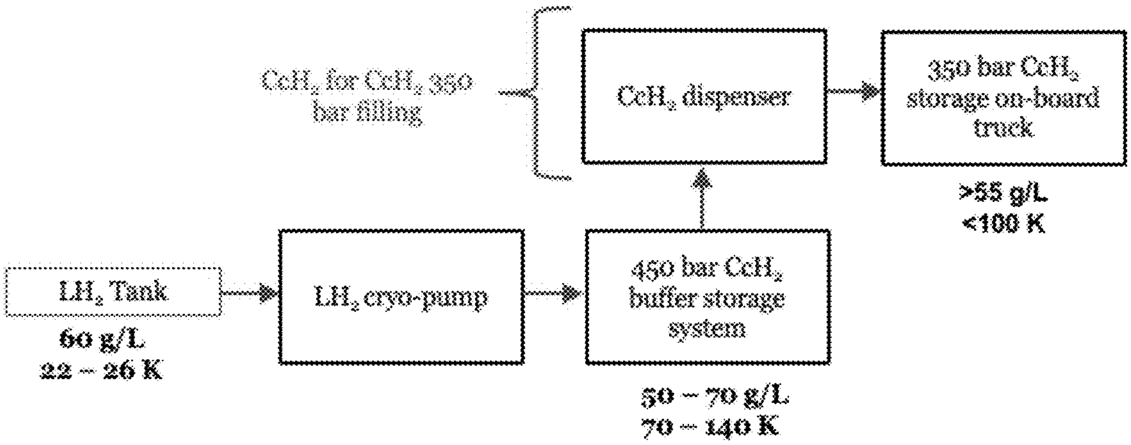
FIGS. 6A and 6B are schematics of an example system for liquid hydrogen input.
Figure 6B:
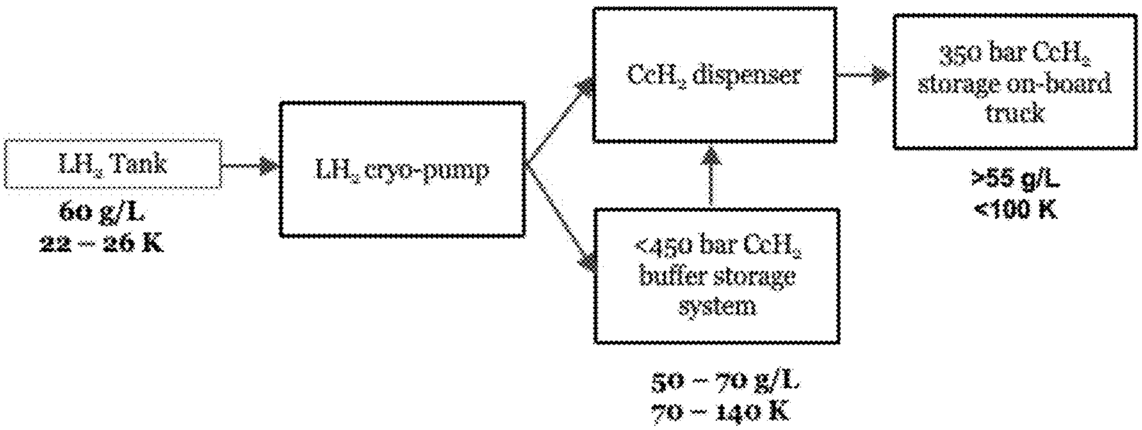

For example, as highlighted in the phase diagram in FIG. 5, liquid hydrogen may be transitioned to a cryo-compressed state. In one system variation, liquid hydrogen is collected and transferred to the buffer storage system as cryo-compressed hydrogen. This can be done by thermal compression or by using a cryo-pump. It can then be dispensed as cryo-compressed hydrogen. As shown in FIG. 6A, in a variation with liquid hydrogen input, the liquid hydrogen may be converted to cryo-compressed hydrogen for storage and then dispensed. In a related variation, the cryo-pump may be configured for direct refueling in addition to refueling via a cryo-compressed buffer storage. As shown in FIG. 6B, a cryo-pump can supply cryo-compressed hydrogen directly to a dispenser or to the buffer storage. In alternate embodiments, liquid hydrogen may be collected and dispensed as hydrogen in other states (e.g., compressed gaseous hydrogen and/or ambient temperature hydrogen). However, hydrogen can be otherwise supplied/dispensed.

Figure 7:
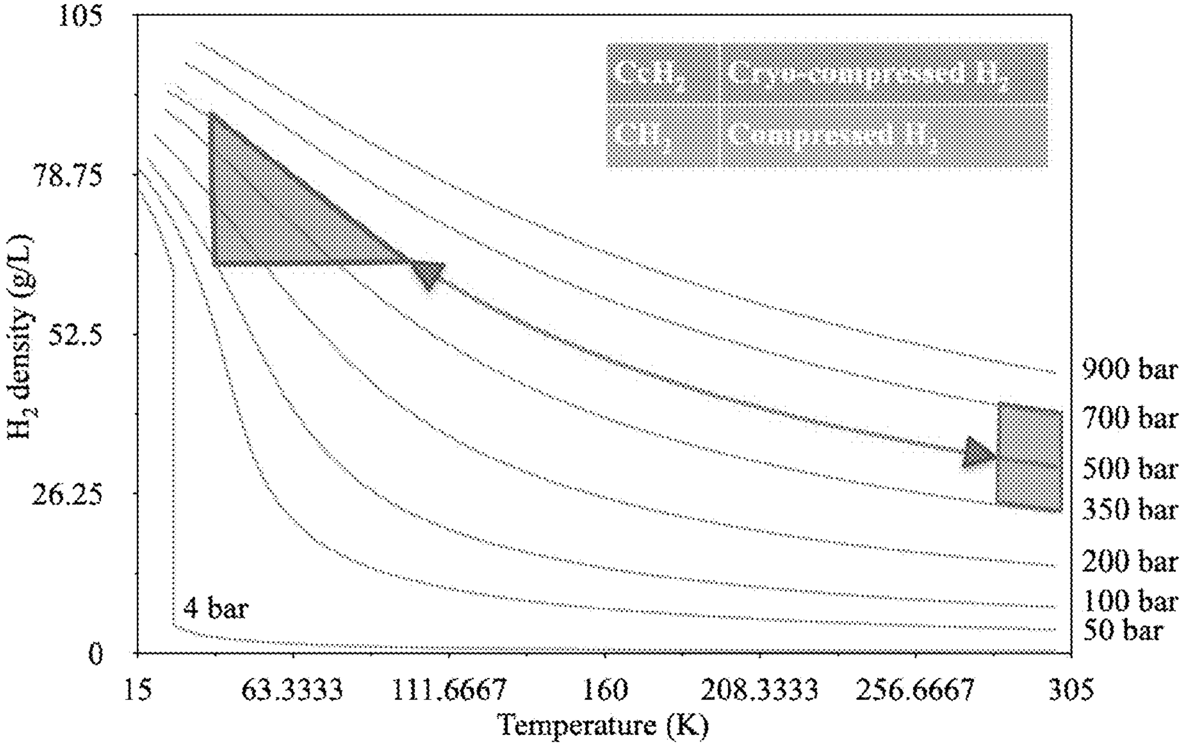
FIG. 7 is a hydrogen phase diagram that includes pathways between compressed hydrogen and cryo-compressed hydrogen.
Figure 8:
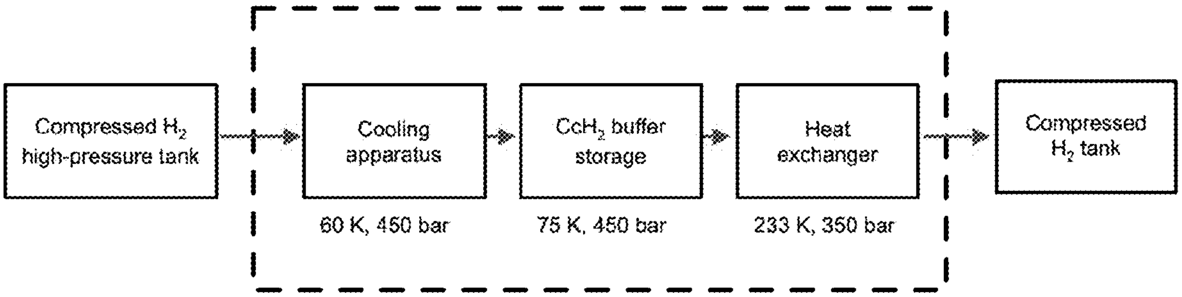
FIG. 8 is a schematic of an example system for compressed hydrogen collection and compressed hydrogen dispensing.

As highlighted in the phase diagram in FIG. 7, in one embodiment of the system, compressed hydrogen is collected, converted to cryo-compressed hydrogen and stored in cryo-compressed buffer storage, and ultimately dispensed as compressed hydrogen. In different embodiments, the hydrogen can be dispensed as cryo-compressed hydrogen into cryo-compressed hydrogen storage systems. As shown in FIG. 8, in the compressed hydrogen collection and dispensing embodiment, compressed hydrogen may be converted to cryo-compressed hydrogen for storage and then converted back to, and dispensed as, compressed hydrogen.

Figure 10:
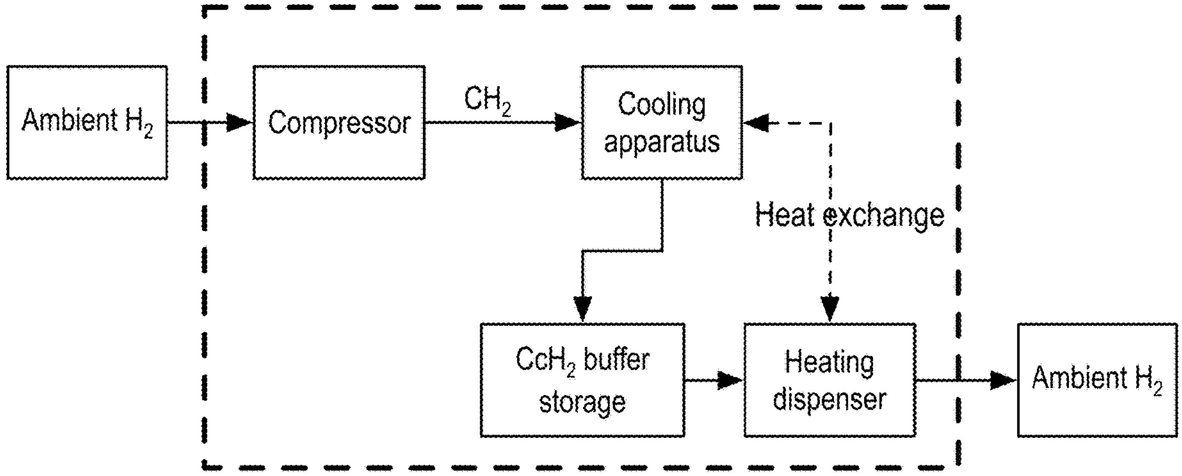
FIG. 10 is a schematic of an example system for ambient temperature and pressure hydrogen collection and ambient temperature and pressure hydrogen dispensing.
Figure 11:
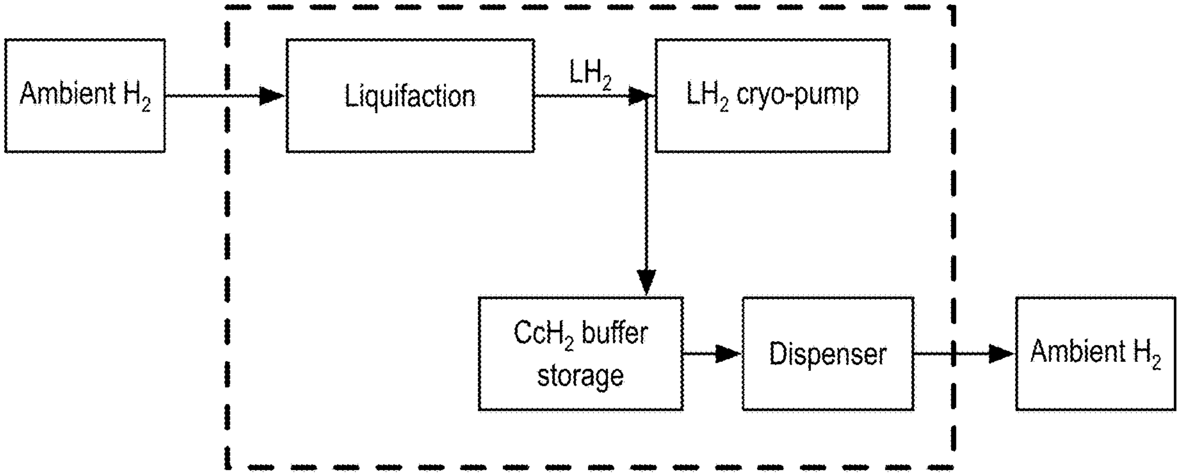
FIG. 11 is a schematic of a second example system for ambient temperature and pressure hydrogen collection and ambient temperature and pressure hydrogen dispensing.

In one variation of the gaseous hydrogen collection and dispensing embodiment, as shown in FIG. 10, the collector 110 may include a compressor and refrigerant system, wherein the ambient hydrogen gas is initially compressed and then cooled to a cryo-compressed state. In another variation of the gaseous hydrogen collection and dispensing embodiment, as shown in FIG. 11, the collector 110 may include a liquefaction component and a liquid hydrogen cryo-pump, wherein that ambient hydrogen gas is initially converted to liquid hydrogen which is then allowed to expand to cryo-compressed hydrogen.

As used herein, examples are presented for ambient hydrogen gas, compressed hydrogen, compressed gaseous hydrogen, cryo-compressed hydrogen, and liquid hydrogen. These examples are presented to convey the broad range capability of the invention and are in no way presented as a limitation of the system. The system may function for collecting, storing, and dispensing hydrogen under any thermodynamic conditions. Additionally, although technically not the same, the terms "ambient conditions" and "STP" (standard temperature and pressures) may be used synonymously as they refer to a relatively small window of use cases of temperatures and pressures that the system may function under.

In some implementations, the system may be implemented with only a subset of components. For example, in one variation, the system may comprise the hydrogen collector 110 and the cryo-compressed buffer storage system 120, such that the system functions for only collection of liquid hydrogen and buffer storage of cryo-compressed hydrogen. In a second variation, the system may comprise the cryo-compressed buffer storage system 120, and the hydrogen dispenser 130, wherein the system functions to dispense previously processed/stored hydrogen.

The system may include a hydrogen collector 110. The hydrogen collector 110 functions to collect hydrogen external from the system and prepare and transfer it to cryo-compressed buffer storage. The hydrogen collector 110 may have a hydrogen fuel input for one or more of $LH_2$ (liquid hydrogen), $CGH_2$ (Compressed Gaseous Hydrogen), $CcH_2$ (Cryo-compressed hydrogen), and/or $GH_2$ (Gaseous Hydrogen). The hydrogen collector 110 will preferably include or be a tank for storage of the type of hydrogen.

Dependent on implementation, the hydrogen collector may collect and prepare hydrogen from a single source or multiple sources. For example, collect and prepare hydrogen from both compressed hydrogen and liquid hydrogen.

In some variations, the system may additionally or alternatively be coupled to some other system that contains hydrogen, such that the hydrogen collector 110 may collect vented hydrogen from the other system and prepare it for cryo-compressed hydrogen buffer storage.

In some variations, the hydrogen collector 110 may collect hydrogen that is produced from water, i.e., extracts gaseous hydrogen from liquid water and transfer. In one of these variations, the hydrogen collector 110 comprises an electrolysis apparatus connected to a water source, wherein the electrolysis apparatus extracts gaseous hydrogen from the water source.

Depending on the source of hydrogen, the system may additionally include a cryo-compressed converter 115. The cryo-compressed converter may function as a subsystem facilitating conversion from the hydrogen input to a cryo-compressed form.

In a variation with a liquid hydrogen tank, a cryo-pump may be used to fill the cryo-compressed buffer storage system 120 from a $LH_2$ source. In a variation, with a compressed gaseous hydrogen tank, a cryo-compressor may be used to fill the cryo-compressed buffer storage system 120 from a $CGH_2$ source. In a variation, with a source cryo-compressed hydrogen tank, a heat exchange system may be used to fill the cryo-compressed buffer storage system 120 from a $CcH_2$ source. In a variation with a gaseous hydrogen tank, a cryo-compressor may be used to fill the cryo-compressed buffer storage system 120 from a $GH_2$ source.

Figure 12:
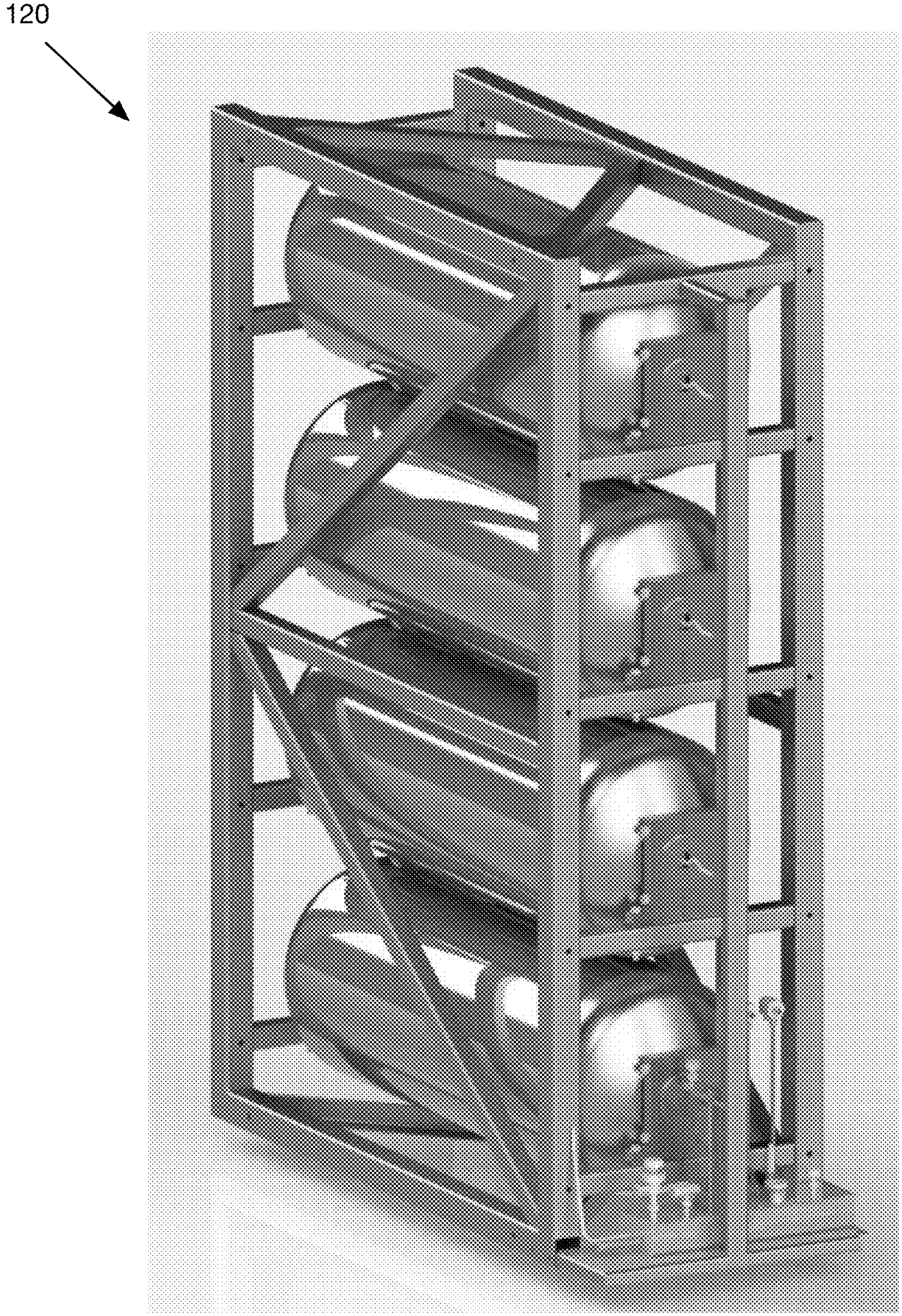
FIG. 12 is a picture of a prototype cryo-compressed hydrogen buffer storage system.

The system may include a cryo-compressed buffer storage system 120 (also referred to as a buffer storage system or simply storage system). The buffer storage system 120 functions to store and maintain hydrogen in a cryo-compressed state, thereby enabling both efficient hydrogen storage and a fast method of hydrogen fueling/dispensing. Thus, cryo-compressed buffer storage system 120 comprises one, or more, tanks/receptacles enabled to store cryo-compressed hydrogen and may be connected to the hydrogen collector 110 and the hydrogen dispenser. An example prototype image of a cryo-compressed buffer storage system 120, may be seen in FIG. 12. In many variations, the cryo-compressed buffer storage system 120 may comprise a set of tanks, and associated cooling/collecting components.

The cryo-compressed buffer storage system 120 may comprise one, or more, tanks/receptacles enabled to hold high pressure hydrogen. Additionally, the tanks may be sufficiently insulated such that cryo-compressed hydrogen held within the tanks is maintained at relatively constant temperature. Additionally or alternatively, some, or all tanks of the storage system 120 may have minimal, or no, insulation but are contained within a cooling system, such that the cooling system provides additional cooling and/or insulation for the tanks. In some variations, the tanks of the cryo-compressed buffer storage system 120 may be multi-layered insulated storage vessels for enhanced cryo-compressed hydrogen.

In many variations, the cryo-compressed buffer storage system 120 may include a plurality of tanks for cryo-compressed hydrogen storage. Dependent on implementation, these tanks may or may not be interconnected. In variations wherein the buffer storage system 120 includes a plurality of tanks, the tanks may be designated for different types of hydrogen storage, e.g., short-term or long-term storage. In other words, the tanks may contain specific population of ortho-hydrogen for specific end-use cases, such as immediate driving or immediate idling of a long haul truck. Generally, in variations that include a plurality of tanks, each tank (or group of tanks) may be constructed differently, and/or situated differently for better functionality. This is not necessarily a requirement of the system and identical types of tanks may be used for different functionalities.

Figure 16:
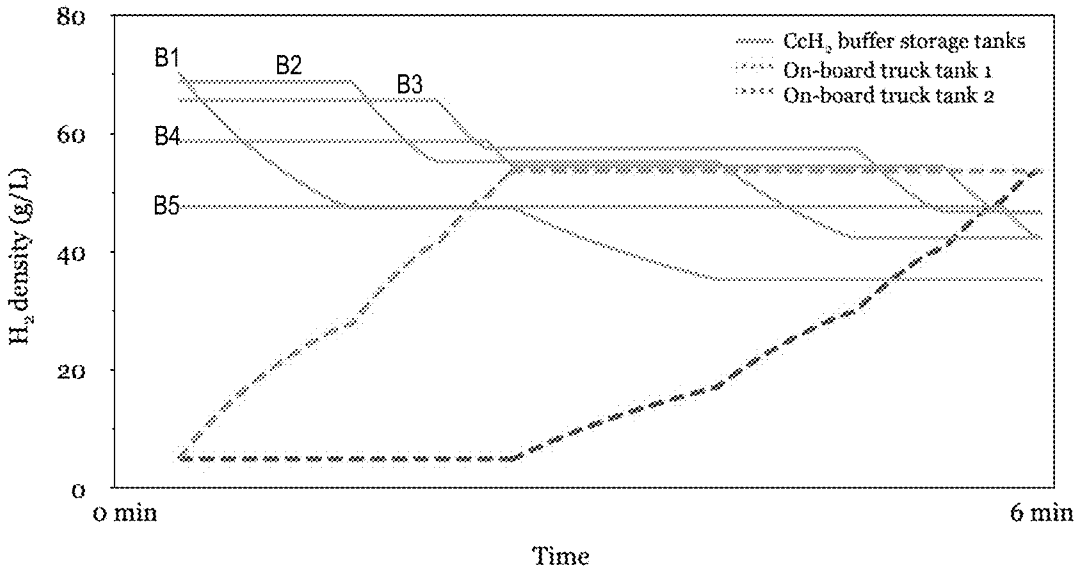
FIG. 16 is a graph showing the density evolution of cryo-compressed hydrogen buffer storage tanks and receiving tanks.
Figure 17:
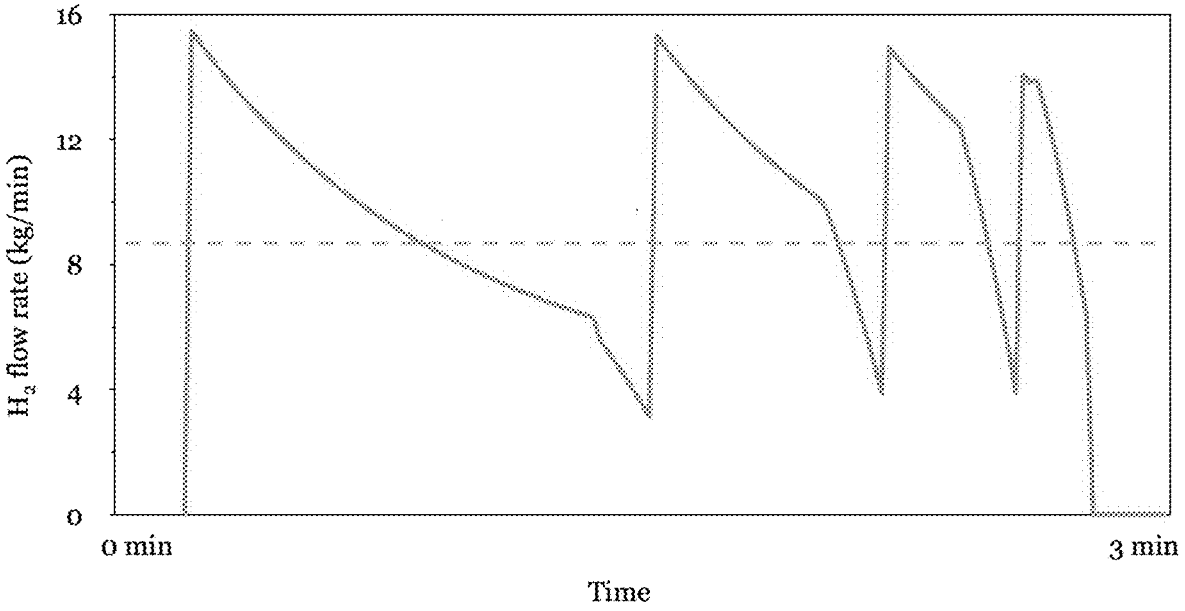
FIG. 17 is a graph showing the fast refueling capabilities of the system and method.

In some variations, the system may be configured such that dispensing of hydrogen is performed with coordinated use of a plurality of cryo-compressed buffer storage systems 120. As shown in FIG. 16, multiple storage tanks may be in varying states, and when refueling a truck, the system can selectively dispense using a particular cryo-compressed buffer storage system 120 depending the state of the truck tank and the buffer storage system. In this example, truck 1 may initially receive fuel from buffer storage B1, then the system transitions to B2, then B3, and finally B4. Truck 2 similarly can initially dispense using B1 and then transition to B2, B3, B4, and then B5. As shown in FIG. 17, using a cascade buffer storage system, the system may be able to achieve an enhanced average refueling flow rate. In the example, of FIG. 17, $CCH_2$ refueling from a cascade of multiple $CCH_2$ buffer storage systems may achieve an average refueling rate of 10 kg/min.

As used herein, long-term storage tanks refer to tanks wherein the cryo-compressed hydrogen is enabled to relax to a majority para state, its equilibrium state. As used herein short-term storage tanks refer to tanks wherein the cryo-compressed hydrogen is produced relatively quickly (as compared to the ortho to para conversion) such that cryo-compressed hydrogen is closer to the initial hydrogen gas make up that is obtained (e.g., 75% ortho, 25% para at room temperature). Such a tank contains hydrogen outside of its thermodynamic equilibrium. In other words, the management and tanks are designed to trap the kinetic product.

As used herein, long-term use hydrogen refers to cryo-compressed hydrogen that has been converted to its equilibrium, or near-equilibrium, para-ortho concentration. As mentioned before, the para to ortho conversion of hydrogen is an endothermic reaction. The stored cryo-compressed hydrogen storage can warm up over time due to controlled or uncontrolled heat flux through the storage system, which drives the equilibrium concentration towards ortho-hydrogen. Over time, this results in the endothermic para-to-ortho conversion, which absorbs energy and can thereby increase dormancy.

Alternatively, short-term use hydrogen refers to cryo-compressed hydrogen closer to the initial hydrogen gas para-ortho concentration that was used to produce the cryo-compressed hydrogen. Typically, this is normal hydrogen, which comprises of 75% ortho-$H_2$. As the terms "short-term" and "long-term" are relatively analogous with respect to use and storage, as used herein, the terms may equally refer to storage or use without any loss of generality. That is, since short-term storage tanks are used for short-term cryo-compressed hydrogen use, "short-term" may equally refer to short-term use or short-term storage; and since long-term storage tanks are used for long-term cryo-compressed hydrogen use, "long-term" may equally refer to long-term use or long-term storage. As short-term and long-term refer to the extreme cases, different states between these short-term and long-term states can also be implemented as desired.

In some variations, some tanks of the cryo-compressed buffer storage system 120 may be designated for short-term storage (i.e., short-term tanks). In some variations, short-term tanks are insulated tanks situated outside of the cooling system 120. Alternatively, short-term tanks may be situated within a cooling system.

In some variations, some tanks of the cryo-compressed buffer storage system 120 may be designated for long-term storage (i.e., long-term tanks or buffer storage). Such long-term storage tanks may contain hydrogen that can be dispensed for long term storage use cases, such as a truck idling for multiple days.

In some variations, long-term tanks may be connected to a compressor and/or the cooling system as described below. In these variations, as the tank naturally heats and para to ortho conversion occurs, the content of the long-term tank is re-cycled through the compressor and/or cooling system, thereby re-populating para-hydrogen and re-cooling the hydrogen. In another variation, long-term tanks may be situated within the cooling system. In this variation, the cooling system may continuously cool the long-term tank thereby maintain the equilibrium concentration and removing heat if any ortho to para conversion occurs. For example, in one implementation, a counter flow heat exchanger situated around the long-term tank may remove the heat generated. For better energy efficiency, this flow may be increased, decreased, and/or stopped dependent on the heat exchange needs. For example, the cooling flow can be tuned to match the heat flux into the tank and any exothermic conversions that occur.

In some variations, short-term tanks may convert to long-term tanks and vice-versa during regular operation. That is, during operation, tanks in the cryo-compressed buffer storage system 120 may change designation from short-term to long-term and vice-versa. For example, tanks may be initially designated as short-term. After the tank has been full for several days and is still relatively full, it may change designation to a long-term tank and the system may recycle or cool the stored cryo-compressed hydrogen to take into account the ortho to para conversion.

The system may include a hydrogen dispenser 130. The hydrogen dispenser 130 may function to "dispense" hydrogen fuel in some desired state (e.g., gaseous, cryo-compressed, or liquid hydrogen) in some thermodynamic condition (e.g., super-cooled, ambient temperatures, compressed, etc.). The hydrogen dispenser 130 may be connected to the cryo-compressed buffer storage system 120 such that cryo-compressed hydrogen may be "pumped" or transferred from the buffer storage system via the hydrogen dispenser for fueling. The dispenser 130 may be configured to dispense $CGH_2$ (Compressed Gaseous Hydrogen), $CcH_2$ (Cryo-compressed hydrogen), and/or $GH_2$ (Gaseous Hydrogen).

The hydrogen dispenser 130 may be designed for various use cases. That is, the hydrogen dispenser 130 may include a nozzle, feed-tube, breakaway, and/or other dispensing equipment that is designed to connect to the use case. For example, for truck fueling, the hydrogen dispenser 130 may include a nozzle appropriate to connect with the truck fuel tank receptacle, thereby enabling fueling of the truck.

In variations that include a plurality of cryo-compressed buffer storage system 120 tanks, the hydrogen dispenser 130, may preferably access different types of storage tanks (e.g., long-term, short-term) thereby, providing different types of cryo-compressed hydrogen as a fuel source. Dependent on implementation, the type of cryo-compressed hydrogen may be selected (e.g., by a user/customer) or automatically determined (e.g., by a control system provided with the type of available cryo-compressed hydrogen and/or the type of fuel utilization).

In some variations the system may include a thermal transfer system. Dependent on implementation, the thermal transfer system may be a component (or shared component) of the hydrogen collector 110, a cryo-compressed converter 115, cryo-compressed buffer storage system 120, and/or hydrogen dispenser 130. The thermal transfer system functions to provide the necessary temperate control to produce cryo-compressed hydrogen as part of the hydrogen collector. Additionally or alternatively, the thermal transfer system may function to provide cooling to maintain cryo-compressed hydrogen, i.e., provide cooling as part of the cryo-compressed buffer storage system 120. Accordingly, in some variations, the thermal transfer system may include or be characterized as a cooling system. Additionally or alternatively, the thermal transfer system may function to heat cryo-compressed hydrogen for ambient temperature as part of the hydrogen dispenser 130. For example, the thermal transfer system of some variations may extract heat during hydrogen collection 110, for cryo-compression, and pump the heat to the hydrogen dispenser 130 for heated dispensing. Generally, dependent on implementation, the thermal transfer system may function to independently cool hydrogen and/or function in conjunction with other system components to cool/heat hydrogen and/or maintain already cooled hydrogen. For example, the thermal transfer system may function in conjunction with the hydrogen compressor 110 to simultaneously cool hydrogen gas as it is being compressed. In another example, the thermal transfer system may be incorporated with the cryo-compressed buffer storage system 120 such that the thermal transfer system helps maintain the cryo-compressed hydrogen cold. In another example, the thermal transfer system may be incorporated with the hydrogen dispenser 130 to minimize heat loss during cryo-compressed hydrogen dispersement.

The thermal transfer system may implement any type of thermal control mechanism. In one variation, the thermal transfer system can preferably cool hydrogen from some initial hydrogen input temperate (e.g., ambient room temperature, ~293-298 K) to the cryo-compressed hydrogen temperatures (~33-110 K). The thermal transfer system may additionally be designed to function at the required pressures (~200-700 bar).

As described above, the thermal transfer system, may be implemented as any general type of cooling/refrigeration that is compatible with the appropriate temperature and pressure ranges. These may be cyclic or non-cyclic types of refrigeration. For example the thermal transfer system may implement: mechanical refrigeration, thermoelectric cooling, magnetic refrigeration, vapor-compression refrigeration, absorption refrigeration, adsorption refrigeration, heat, gas cycle, thermoacoustic refrigeration (e.g., pulse tube refrigerator), dilution refrigeration, etc.

It can be noted that many of these types of refrigeration have limited ranges of cooling and cooling efficiencies. For example, mechanical refrigeration and magnetic refrigeration work well near room temperature, but are somewhat inefficient below 0 C. On the other hand, thermoacoustic refrigeration and dilution refrigeration are much more efficient at temperatures on the order of 10 K. In many variations, the thermal transfer system may include multiple types of cooling refrigeration. For example, the thermal transfer system may include a magnetic refrigeration component intake that works in conjunction with the compressor 110, which cools ambient temperature hydrogen during compression, which is then then transferred to a cyclical vapor-compression refrigeration component (e.g., using liquid $N_2$), which then further cools the compressed hydrogen to the desired cryo-compressed temperatures. In the same manner, the thermal transfer system may use the same, or a different refrigeration component better optimized for cold temperature maintenance of the cryo-compressed buffer storage system 120. For example, the thermal transfer system may further include a dilution refrigerant (i.e., 3He/4He) surrounding the buffer storage system to maintain its temperature.

The thermal transfer system may further include a heat exchanger. The heat exchanger functions to enable heat transfer from the hydrogen out of the system (typically first to the implemented refrigerant), thereby cooling the hydrogen. The heat exchanger may be situated on, around, and through any other system component, thereby enabling heat transfer with that component. In some variations, the thermal transfer system may have a distinct heat exchanger situated between the hydrogen collector 110 and the cryo-compressed buffer storage system 120, and/or the hydrogen dispenser 130 (e.g., as shown in FIG. 10).

The heater exchanger may be a diffusion bonded heat exchanger. The heat exchanger may be any general type of heat exchanger. Examples include: shell and tube heat exchanger, double pipe heat exchanger, plate heat exchanger, plate and shell heat exchanger, adiabatic wheel heat exchanger, finned tube heat exchanger, pillow plate heat exchanger. Alternatively, the heat exchanger may be an adhesion bonded heat exchanger. In many variations, the heat exchanger comprises a parallel current flow heat exchanger (with, or counter-current). Alternatively, the heat exchanger may comprise a cross-current flow heat exchanger.

As mentioned above, the system may include multiple examples and embodiments, wherein the system may be incorporated for collecting and dispensing different states of hydrogen. Some example embodiments and variations on those embodiments are now presented.

Figure 13:
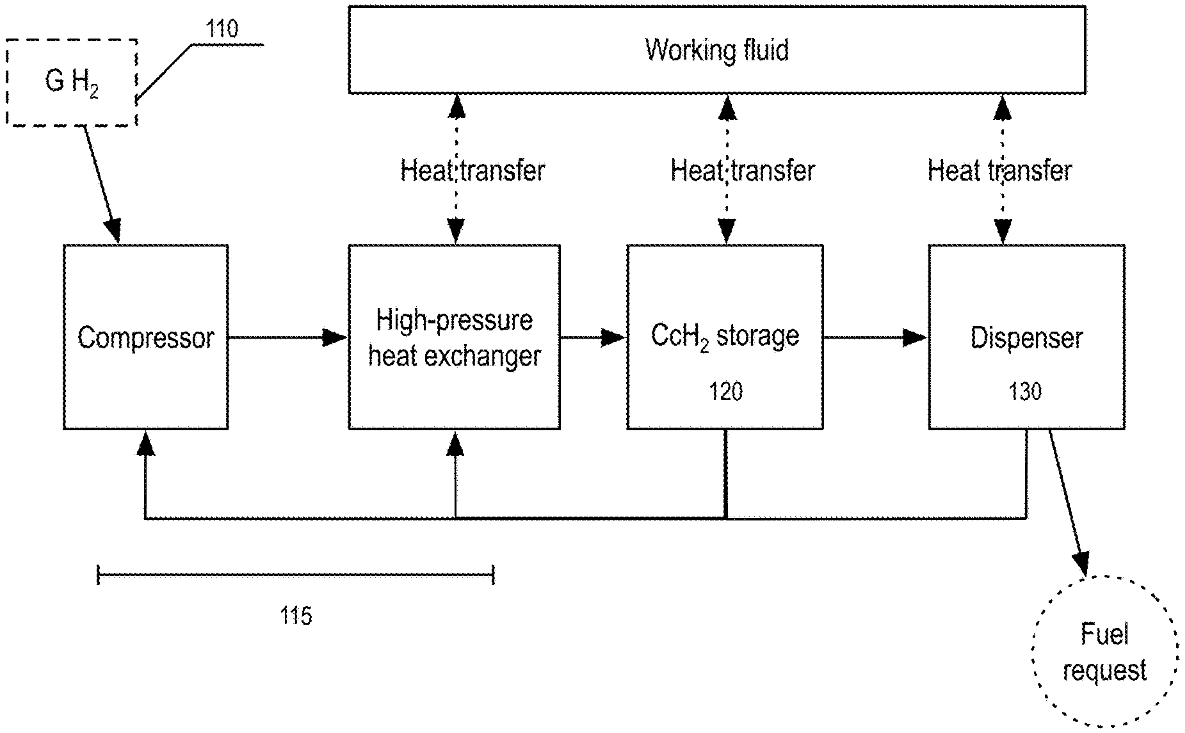
FIG. 13 is schematic of an example system.

In many variations of the system, as shown in FIG. 13, gaseous hydrogen may be collected as a fuel source, maintained in the cryo-compressed buffer storage system 120, and dispensed in some select state. For example, a system may enable selective dispensing of $CHH_2$, $CcH_2$, and/or $GH_2$. In such variations variation, the hydrogen collector 110 may comprise a compressor, a high pressure heat exchanger, and a refrigerant, to convert gaseous hydrogen to cryo-compressed hydrogen. Additionally, or alternatively, the cryo-compressed buffer storage system 120, may also further comprise a compressor, high-pressure heat exchanger, and a refrigerant to maintain cryo-compressed hydrogen in that given state. Additionally, or alternatively, the dispenser may also include a refrigerant, a compressor, and/or a high pressure heat exchanger to convert the cryo-compressed hydrogen to the desired state prior to carrying out a fuel request. In these variations, the hydrogen collector 110, the cryo-compressed buffer storage system 120, and the hydrogen dispenser may have a distinct compressor, and/or cooling system or they may share these components. In many examples, the heat exchanger may be implemented such that the system components complement each other. For example, for ambient temperature refueling. Heat generated from super cooling gaseous hydrogen from the hydrogen collector 110 and general heat generation from the cryo-compressed buffer storage system 120, may be pumped to the hydrogen dispenser for efficient heating of cryo-compressed hydrogen to ambient temperatures.

Figure 14:
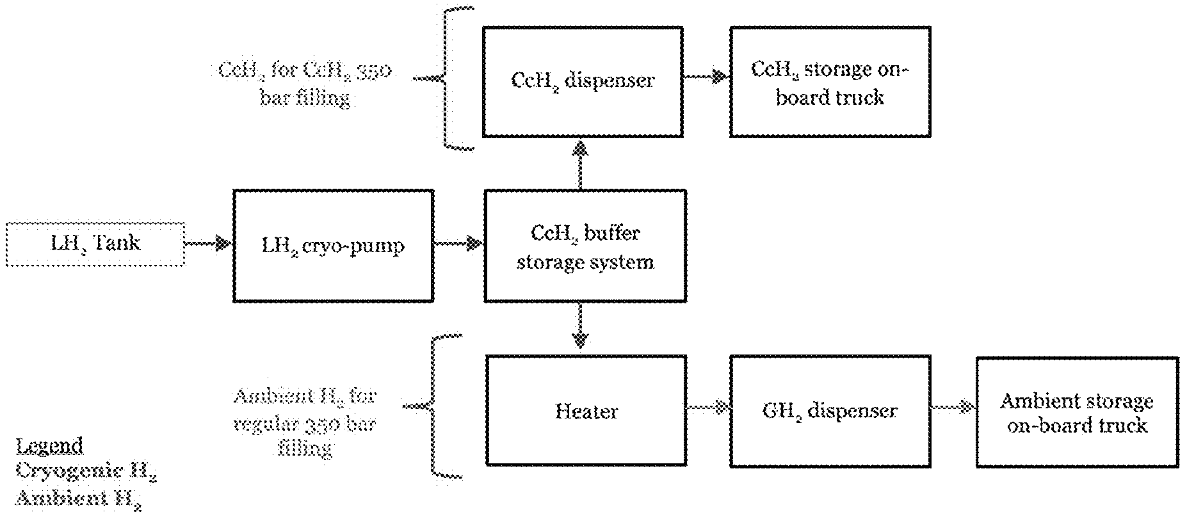
FIG. 14 is a schematic of an example system for dual refueling.

In addition to providing a single type of hydrogen input (via the hydrogen collector 110) and a single type of hydrogen output (via the hydrogen dispenser 130), the system may enable collection of multiple types of hydrogen and/or provide fueling through multiple types of hydrogen output. In one example implementation, for a single hydrogen source input, liquid hydrogen, duel refueling output is achieved: cryo-compressed hydrogen and ambient temperature gaseous hydrogen ($GH_2$), as shown in FIG. 14; the hydrogen collector may include liquid hydrogen tank and the liquid hydrogen cryo-pump, and the hydrogen dispenser 130 may include a heater (or heat exchanger). In this example, liquid hydrogen tanks may be obtained for an initial hydrogen source, and subsequently the hydrogen is stored in a cryo-compressed hydrogen state in the cryo-compressed buffer storage system 120 to enable fast refueling. The system may then fuel trucks by dispensing either cryo-compressed hydrogen directly, or ambient gaseous hydrogen, as desired.

Figure 15:
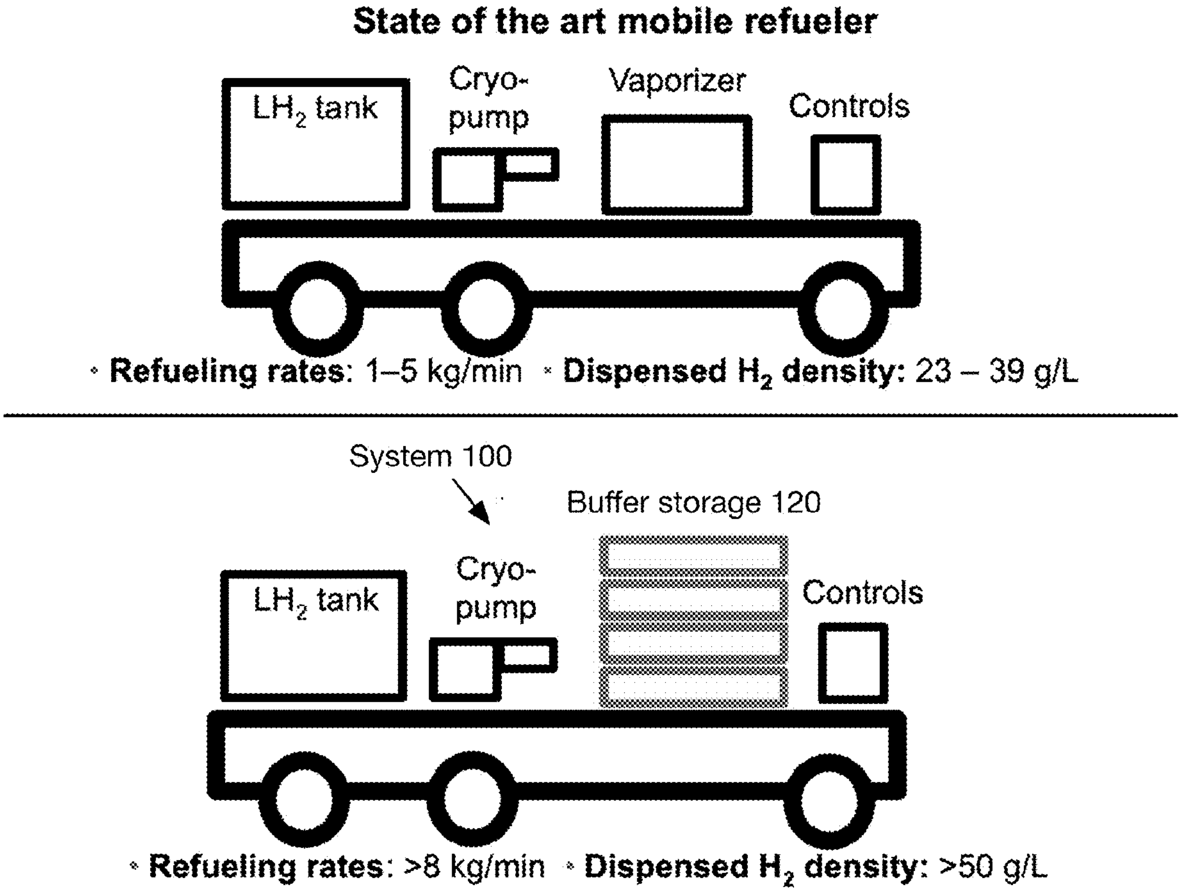
FIG. 15 is a schematic of an example system implementation as a mobile high-density refueler.

One implementation of the prior example, as shown in FIG. 15, would be an improved mobile refueling vehicle. That is, the system may be implemented as a high density mobile refueler (bottom of Figure) as a significant improvement in storage capacity, fueling rates, and functionality as compared to current state of the art refuelers (top of Figure).

However, the system can include any other suitable components.

4. Method

The method for hydrogen refueling S100, an example of which is shown in FIG. 18, can include: collecting hydrogen S110; storing, in a cryo-compressed state, the hydrogen S120; and dispensing the hydrogen S130. However, the method S100 can additionally or alternatively include any other suitable elements. The method functions to provide fast hydrogen refueling, beyond the current state of the art refueling techniques that utilize liquid hydrogen, and efficient hydrogen storage, by leveraging the properties of cryo-compressed hydrogen. Furthermore, in many variations the method incorporates a "disconnect" between hydrogen collection S110 and hydrogen fueling S130 by the addition of cryo-compressed buffer storage of hydrogen. Fueling from the cryo-compressed hydrogen state may provide significantly faster rates as compared to current standards. One example fueling rate by utilization of the method is shown in FIG. 17. Additionally, or alternatively, the method may provide an efficient means for fueling with hydrogen for vehicles (and other hydrogen fuel facilities and structures) with the flexibility to provide different types of hydrogen fuel dependent on the requirements of said vehicles (e.g., provide liquid hydrogen, ambient temperature hydrogen, cryo-compressed hydrogen, etc.). The method may be incorporated with a system as described above, but may be generally incorporated with any appropriate system. Overall, the methods enable multi-modal fueling.

Block S110, which includes collecting hydrogen, functions in receiving hydrogen fuel of some form to use as a fuel source. Collecting hydrogen may additionally include the processing of the supplied fuel input to dispense into the cryo-compressed storage system in block S120. Collecting hydrogen 110 may be implementation specific and can vary, dependent on the hydrogen source. Dependent on implementation, collecting hydrogen 110 may collect hydrogen from any starting state, gaseous or liquid, at any pressure or temperature (e.g., ambient temperature, super-cooled, high-pressure/compressed, etc.).

As with the system above, the hydrogen input may come in the form as $LH_2$ (liquid hydrogen), $CGH_2$ (Compressed Gaseous Hydrogen), $CcH_2$ (Cryo-compressed hydrogen), $GH_2$ (Gaseous Hydrogen). Depending on implementation collecting hydrogen may include receiving hydrogen fuel input and converting the hydrogen fuel to a cryo-compressed state.

In some variations, the method may include converting the hydrogen to a cryo-compressed state. Converting the hydrogen may be implementation specific and dependent on the type of hydrogen collected. As shown on the phase diagram in FIG. 2, converting the hydrogen may comprise various processes to transition a hydrogen fuel of some state to a cryo-compressed state.

Dependent on implementation, converting the hydrogen, may include any desired pathway for forming cryo-compressed hydrogen. In some variations, the hydrogen may be converted from a liquid state or compressed state to the cryo-compressed state. In some variations, the initial hydrogen state could be $H_2$ near STP then transitioned to cryo-compressed in stages. For example, for ambient hydrogen collection, the hydrogen is initially super-cooled and pressurized to a liquid state and then heated and depressurized to the cryo-compressed state. In another example, for ambient hydrogen collection, the hydrogen is first compressed to a compressed gaseous state, and then cooled to the cryo-compressed state.

In a $LH_2$ variation, block S110 can include receiving $LH_2$ and then using a cryo-pump to convert the $LH_2$ to $CcH_2$.

In a $CGH_2$ variation, block S110 can include receiving $CGH_2$ and then using a cryo-compressor to convert the $CGH_2$ to $CcH_2$.

In a $CcH_2$ variation, block S110 can include receiving $CcH_2$ and then potentially using a heat exchange system to prepare the $CcH_2$ for dispensing the $CcH_2$ buffer storage. In such a case, the heat exchange system can fine-tune the temperature for refueling.

In a $GH_2$ variation, block S110 can include receiving $GH_2$ and then using a cryo-compressor to convert the $GH_2$ to $CcH_2$.

In some variations, the method may include collecting hydrogen from two or more sources. Accordingly, the method may include two or more of the process for collecting hydrogen.

Block S120, which includes storing the hydrogen S120 in a cryo-compressed state, functions to create a cryo-compressed hydrogen buffer storage and maintain the cryo-compressed hydrogen at that state until required for fueling. Preferably, storing the hydrogen S120, stores the hydrogen in tanks that are enabled to hold hydrogen at high pressures and low temperatures for a sufficient amount of time dependent fueling requirements. Storing the hydrogen S120 may be implementation and dependent on the type of hydrogen collected.

Block S130, which includes dispensing the hydrogen, functions to provide hydrogen as requested. Dispensing the hydrogen S130, may be implementation specific, and dependent on the type of hydrogen requested. That is, dispensing the hydrogen S130 comprises obtaining cryo-compressed hydrogen from the storage, converting the hydrogen to the requested state, and providing that hydrogen. Thus, for a cryo-compressed hydrogen request for truck refueling, dispensing the hydrogen S130 may include pumping the stored cryo-compressed hydrogen directly into the truck. For a liquid hydrogen request, dispensing the hydrogen S130 may include converting the cryo-compressed hydrogen to liquid hydrogen (e.g., by pressurizing the hydrogen) while refueling the truck. For a compressed hydrogen request, dispensing the hydrogen S130 may include heating the cryo-compressed hydrogen prior to, or during, providing the hydrogen.

5. System Integration

Variants of the system can function to produce, store, manage, and/or dispense cryo-compressed hydrogen. In some variations, the system can enable producing cryo-compressed hydrogen directly from gaseous hydrogen. Additionally or alternatively, some system variations may enable storing cryo-compressed hydrogen in different hydrogen configurations (e.g., with targeted ortho-para concentrations). Additionally, some system variations may manage or control the ortho and para concentrations there enabling improved long and short-term storage and customization of such storage capabilities. As another additional or alternative capability, some system variations may dispense cryo-compressed hydrogen as "intelligently" dependent on its utilization.

Figure 21:
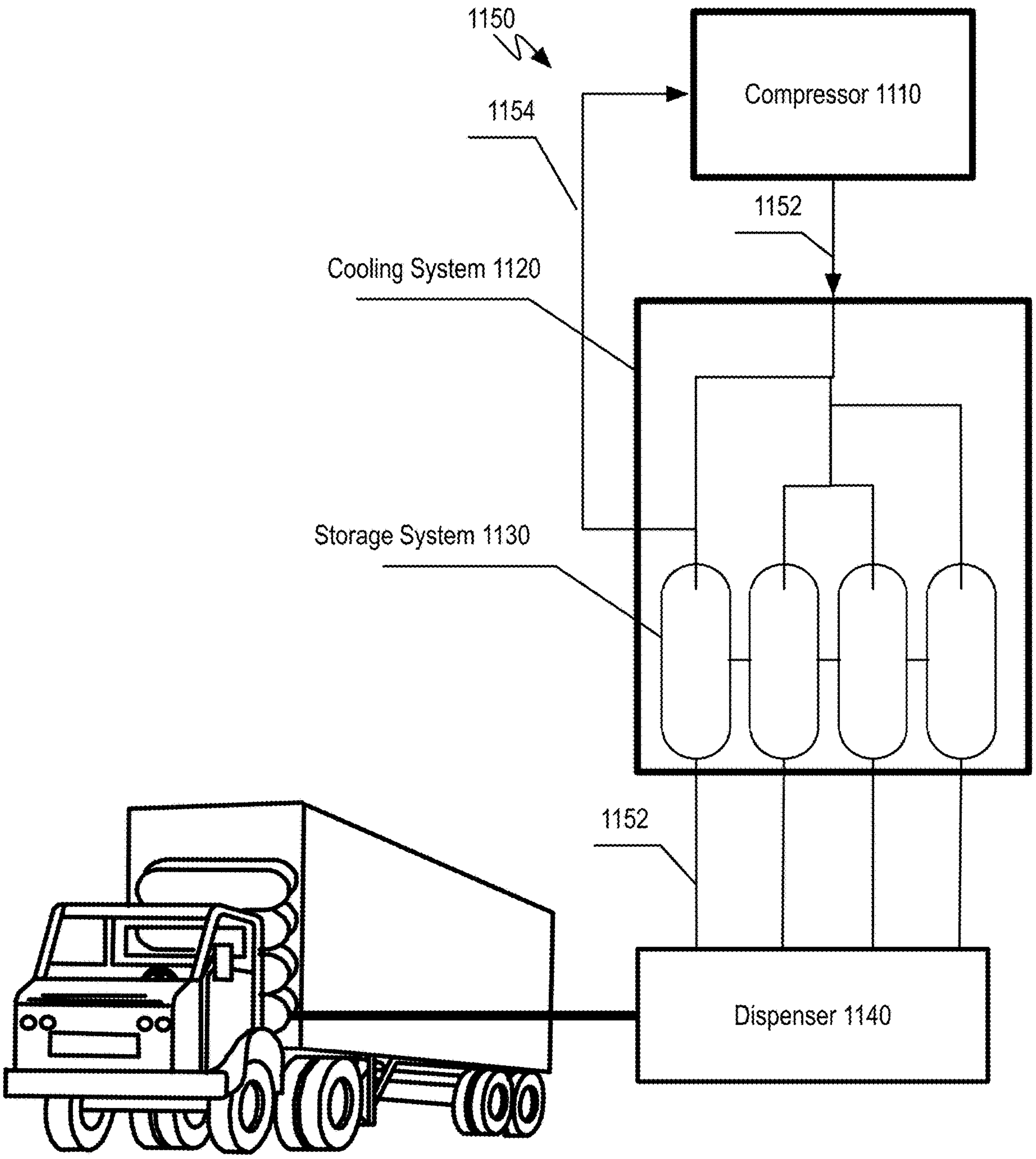
FIG. 21 is a schematic for an example system.

As shown in FIG. 21, one variation of the system for cryo-compressed hydrogen production, management, and/or utilization may include: a compressor 110 to pressurize hydrogen; a cooling system 1120 to cool high-pressure hydrogen; a storage system 1130 with at least one storage tank/vessel that stores cryo-compressed hydrogen; and a dispensing system 1140. The system additionally includes a fuel processing network 1150 comprised of conduit channels 1152 interconnecting the components of the system such as the compressor 1110, the cooling system 1120, the storage system 1130, the dispensing system 1140, and/or other components or sub-components described herein.

Figure 22:
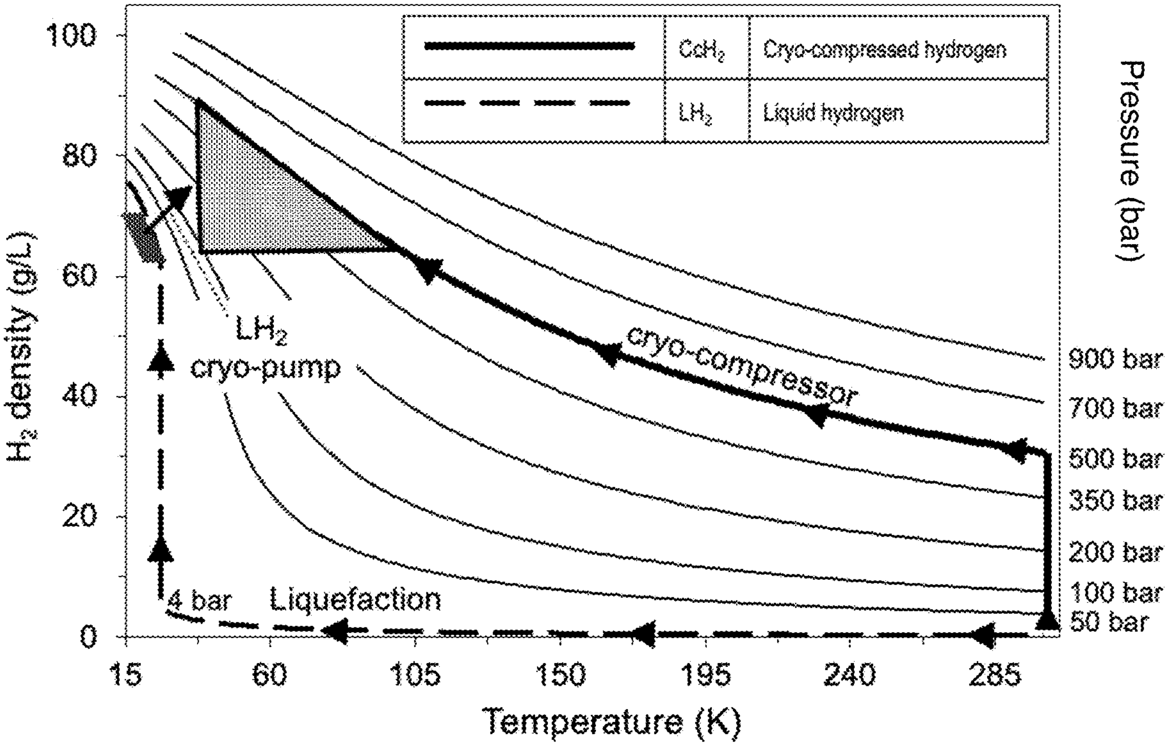
FIG. 22 is a pressure-temperature diagram that shows a comparison of an existing pathway to form cryo-compressed hydrogen shown in a dashed line compared to a pathway shown in a bold solid line of the systems and methods described herein.
Figure 39:
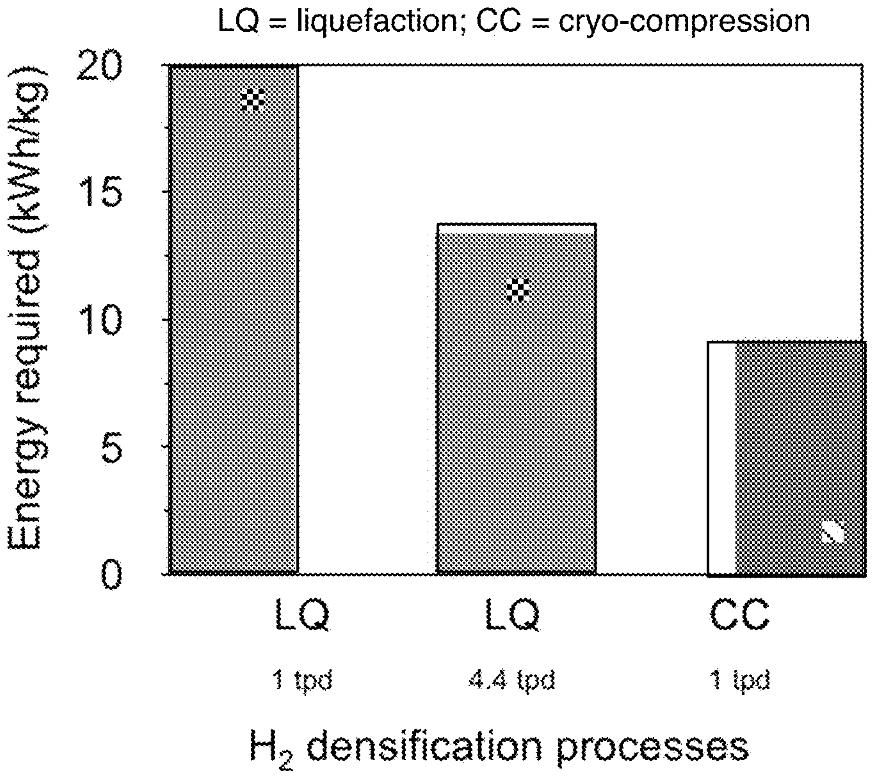
FIG. 39 is a chart showing the relative efficiencies for different methods of producing cryo-compressed hydrogen.

As shown in FIG. 22, cryo-compressed hydrogen can be produced by the system via a cryo-compressor route (bold solid path) which altogether avoids liquefaction (dashed path). By avoiding liquefaction, high-density hydrogen can be obtained with great energy savings, as shown in FIG. 39, even at small scales. The system may be implemented at any scale, for production, storage, and dispensation of cryo-compressed hydrogen and represents a lower cost system for high-density hydrogen management. That is, the system may be implemented for large scales (e.g., greater than five tons of cryo-compressed hydrogen per day), small scales (e.g., less than one ton of cryo-compressed hydrogen per day), or at scales in between for many different use cases.

The system may be configured into various configurations and/or sub-combinations of the components depending on the intended use case and desired functionality.

Figure 23A:
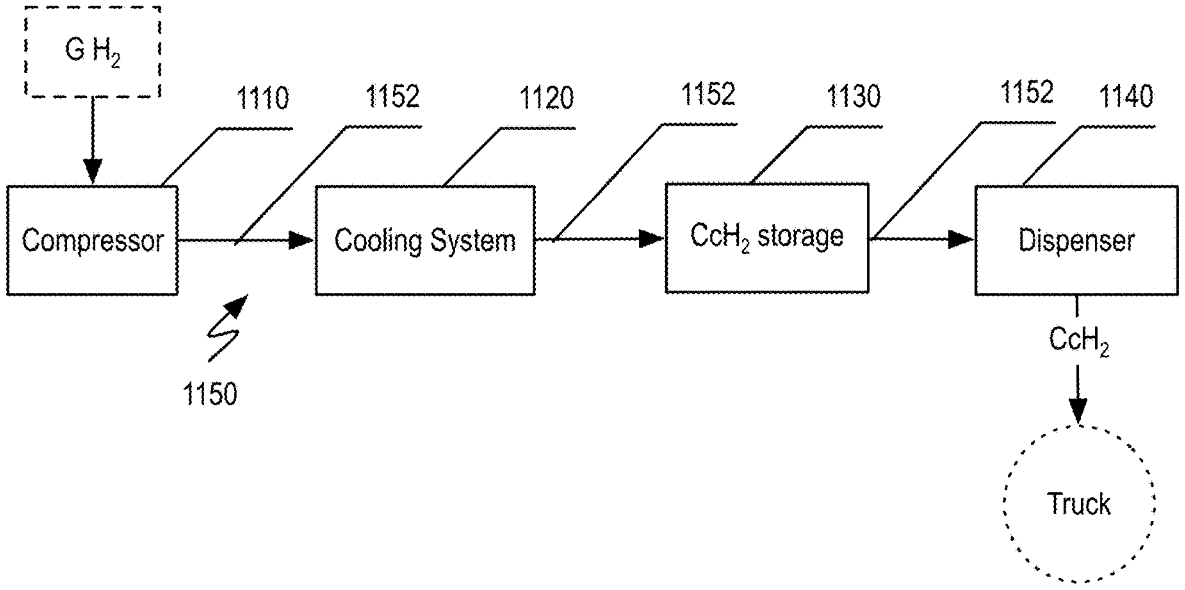
FIGS. 23A-23C are schematic representations of system variations with sequential processing flows.

In one variation, the system may be configured for a sequential processing flow through the different components. Accordingly, as shown in FIG. 23A, a system variation may include a compressor 1110, a cooling system 1120, a storage system 1130, a dispensing system 1140, and a fuel processing network 1150 comprised of conduit channels 1152, where the fuel processing network is configured to have a directed processing flow sequence of the compressor 1110, the cooling system 1120, the storage system 1130, and the dispensing system 1140.

More specifically, a system for managing a cryo-compressed state of hydrogen fuel hydrogen can include a compressor 1110 with a hydrogen input (e.g., a gaseous hydrogen input) and a compressor output (i.e., a compressed hydrogen output); a cooling system 1120, wherein the compressor output is coupled (e.g., fluidically coupled) to the cooling system for transfer of hydrogen fuel in a compressed state to the cooling system 1120; a storage system 1130, wherein the storage system 1130 stores hydrogen fuel in a cryo-compressed state resulting from cooling from the cooling system. The system will generally also include a fuel processing network 1150 that includes interconnecting conduit channels that connect at least the compressor, cooling system, and storage tank in a sequential processing flow.

The system may additionally include a dispensing system 1140 or connect with an external dispensing system. The dispensing system couples to the storage system 1130 and more specifically an output of the storage system (i.e., a storage system output). In variations with a dispensing system 1140, the interconnecting conduit channels of the fuel processing network 1150 preferably connects at least the compressor 110, cooling system 1120, storage tank 1130, and dispensing system 1140 in a sequential processing flow. In some variations, there may be no direct dispensing of cryo-compressed hydrogen fuel. For example, the storage vessel or tank from the storage system 1130 may be removed and used as fuel storage vessel for another system. In other words, such a storage system can be swapped out. The cooling system 1120 can have a cooling system input and a cooling system output, wherein the cooling system input, in some variations is compressed hydrogen fuel, in other words hydrogen fuel in a compressed state (e.g., 200-700 bar).

Figure 23B:
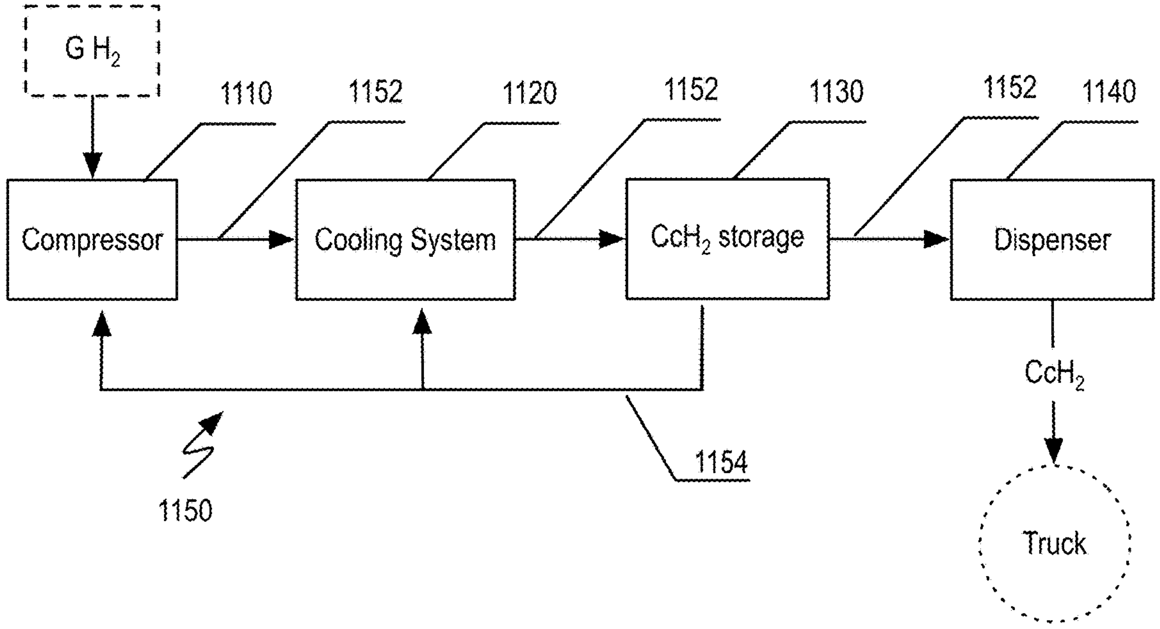

In some variations, the system may employ alternative and/or dynamic fuel processing paths. As one application, the system may enable reprocessing of fuel. This may be used to adjust the conditions of the fuel such as by altering the ortho-para concentrations of stored cryo-compressed hydrogen. As another application, the system may reprocess vented gaseous hydrogen so that it can be returned to a usable state. This may reduce fuel waste for the system. As shown in FIG. 23B, such a system variation may include a compressor 1110, a cooling system 1120, a storage system 1130, a dispensing system 1140, and a fuel processing network 1150 comprised of conduit channels 1152, where the fuel processing network is configured to have a directed processing flow sequence of the compressor 1110, the cooling system 1120, the storage system 1130, and the dispensing system 1140 as well as at least one reprocessing sub-network 1154. The sub-network may contain pressure regulation capabilities to ensure the re-processed hydrogen has the required pressure to re-enter the cooling system. The reprocessing sub-network may be controlled to dynamically direct the hydrogen fuel to an appropriate component depending on state of the hydrogen.

Figure 23C:
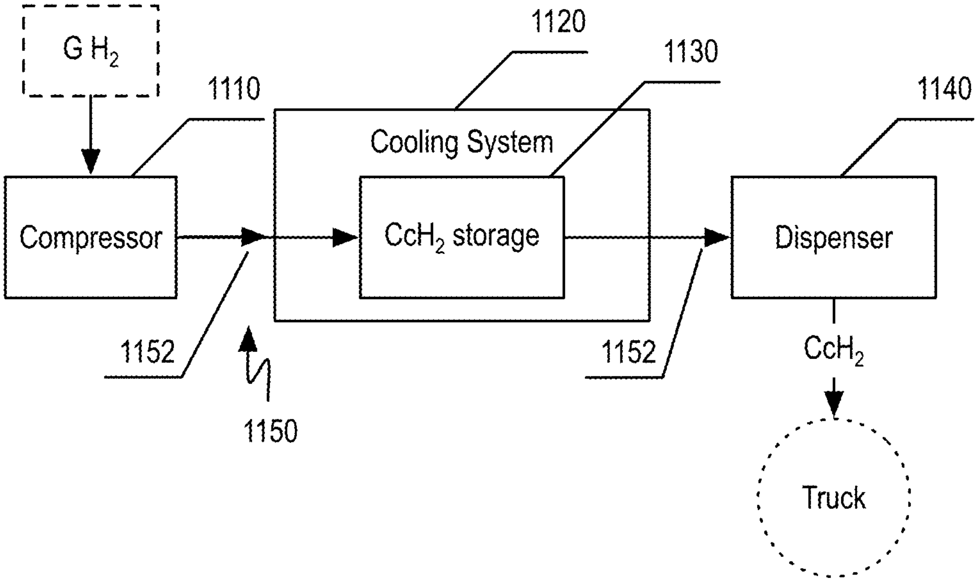

In one variation, the cooling system 1120 may be configured to integrate or include the storage system 1130. Accordingly, as shown in FIG. 23C, a system variation may include a compressor 1110, a cooling system 1120 that includes an integrated storage system 1130, a dispensing system 1140, and a fuel processing network 1150. As one example, the storage system may contain a liquid nitrogen jacket, and with sufficient thermal mass, the storage system ensures the compressed hydrogen is cooled and maintained to liquid nitrogen temperatures, close to 77 K.

Figure 24A:
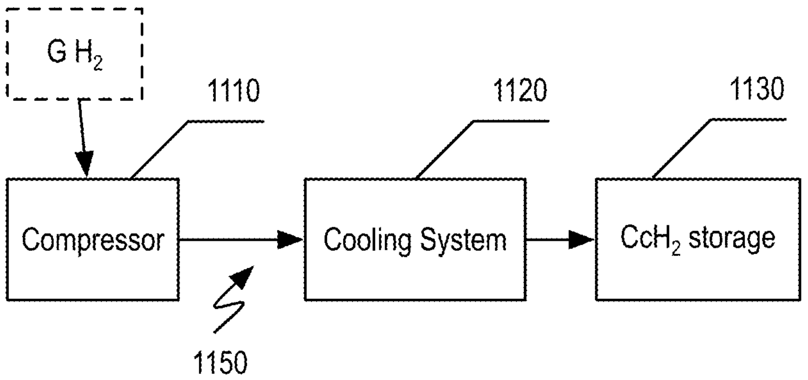
FIGS. 24A-24C are schematic representations of system variations used for producing and maintaining cryo-compressed hydrogen.
Figure 24B:
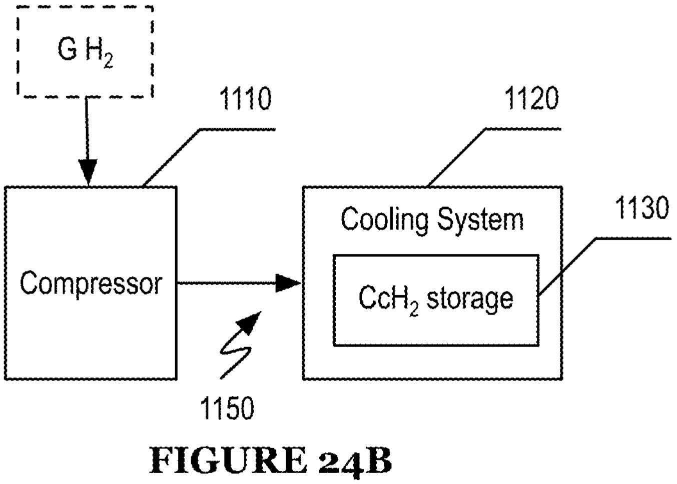
Figure 24C:
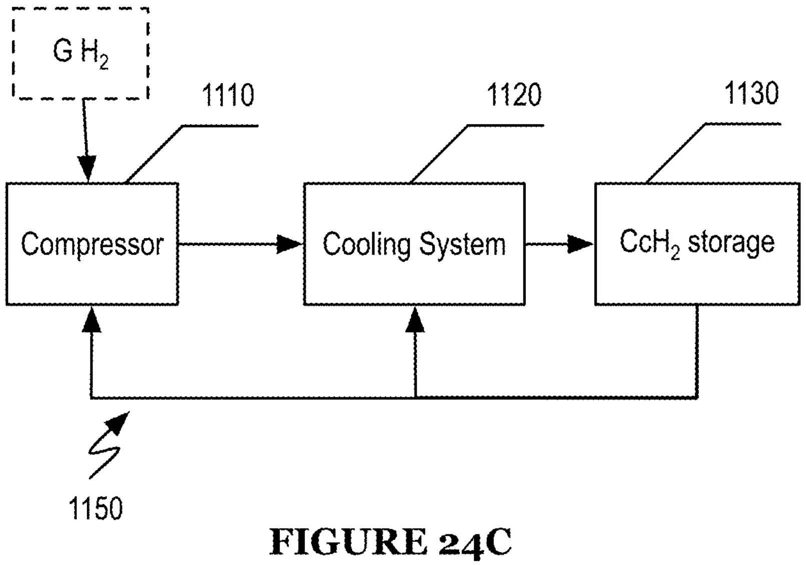

While the dispensing system 1140 may be applicable to many situations, in some applications a dispensing system 1140 may not be applicable or an external dispensing system may be used. Accordingly, as shown in FIG. 24A, a system variation may include a compressor 1110, a cooling system 1120, a storage system 1130, and a fuel processing network 1150 comprised of conduit channels 1152, where the fuel processing network is configured to have a directed processing flow sequence of the compressor 1110, the cooling system 1120, and the storage system 1130. Such a system variation may incorporate other variations of the system described herein. For example, such a variation could include variations with a cooling system 1120 with an integrated storage system 1130 as shown in FIG. 24B or with a reprocessing sub-network 1154 as shown in FIG. 24C.

Figure 25A:
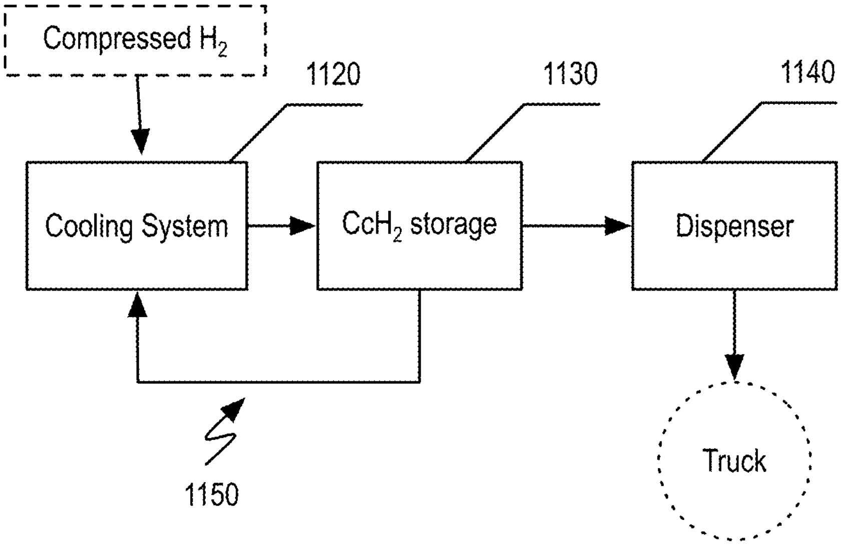
FIGS. 25A and 25B are schematic representations of system variations receiving compressed hydrogen from an outside source.
Figure 25B:
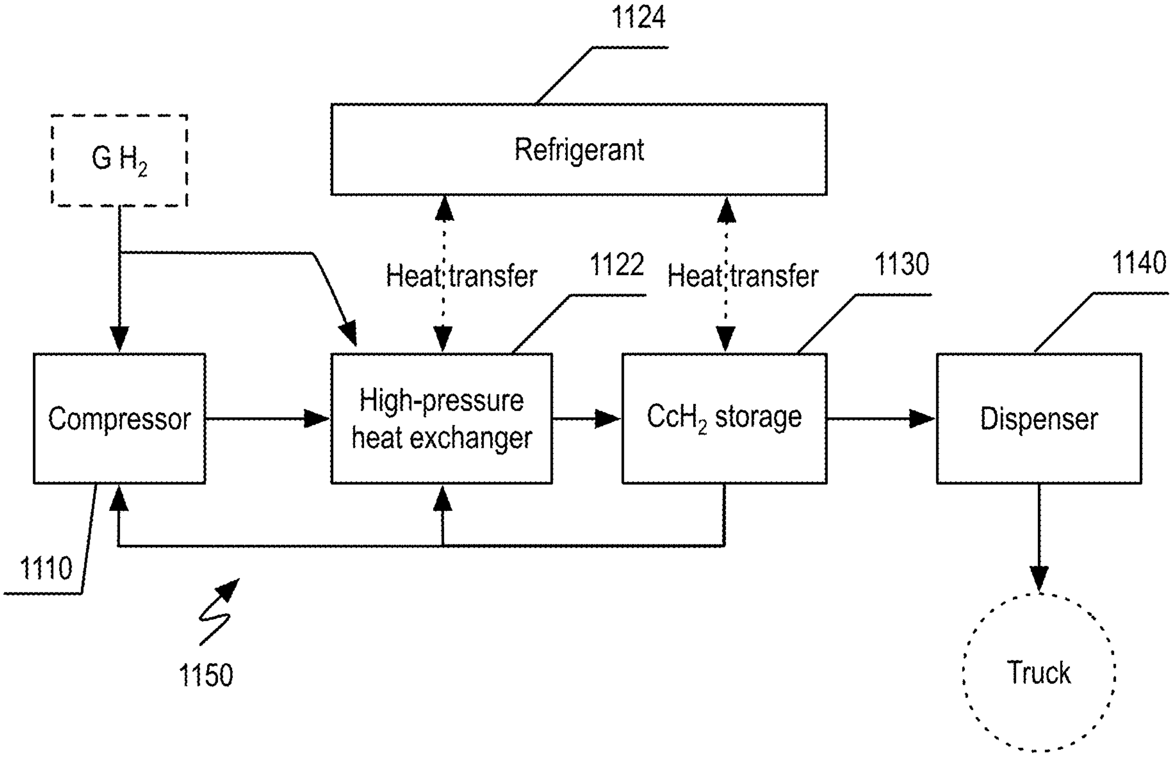

Herein, the system is primarily described as including a compressor 110 that functions to pressurize gaseous hydrogen. In some variations, pressurized gaseous hydrogen may be supplied from some external source. As such, as shown in FIG. 25A, the system may include a cooling system 1120, a storage system 1130, and a dispensing system 1140 and a fuel processing network 1150. High-pressure gaseous hydrogen may be delivered directly to the cooling system 1120. In some variations, the system may have a flexible design such that normal gaseous hydrogen or high-pressure gaseous hydrogen may be supplied. In the case of high-pressure gaseous hydrogen, then a valve can redirect the high-pressure gaseous hydrogen directly to the cooling system 1120; and in the case the gaseous hydrogen is not pressurized, directing the gaseous hydrogen to the compressor system 1110 as shown in FIG. 25B.

Figure 26:
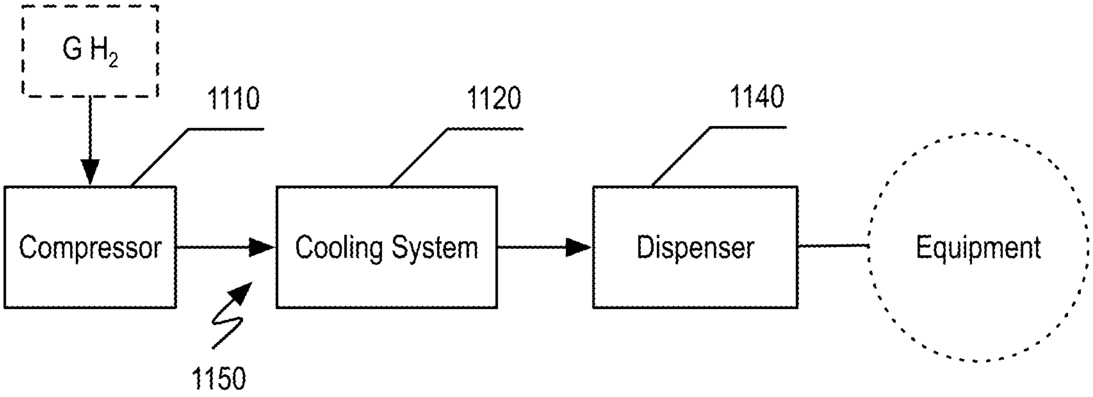
FIG. 26 is a schematic representation of producing cryo-compressed hydrogen for immediate dispensing.

While the storage system 1130 may be applicable to many situations, in some applications a storage vessel that functions as a buffer or temporary vessel for storage of cryo-compressed hydrogen, may not be applicable. Produced cryo-compressed hydrogen may be directly dispensed. Accordingly, as shown in FIG. 26, a system variation may include a compressor 1110, a cooling system 1120, a dispensing system 1140, and a fuel processing network 1150 comprised of conduit channels 1152, where the fuel processing network is configured to have a directed processing flow sequence of the compressor 1110, the cooling system 1120, and the dispensing system 1140.

Figure 27:
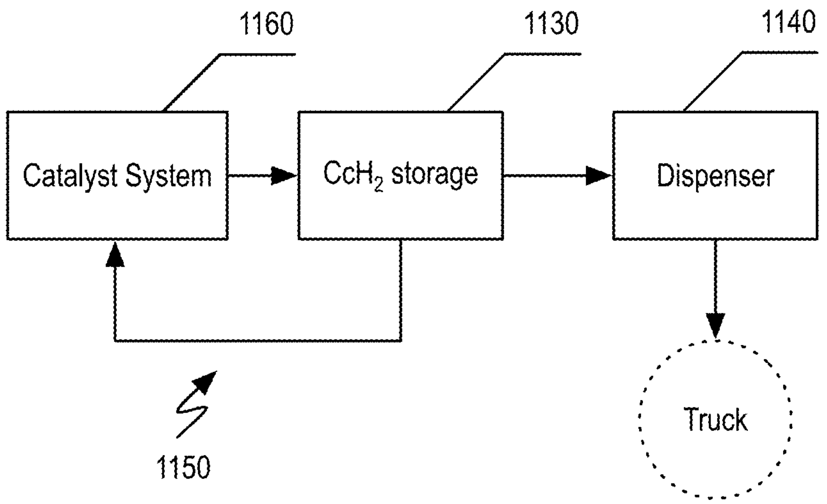
FIG. 27 is a schematic representation of a system variation that dynamically customizes ortho-para concentrations for dispensing.
Figure 28:
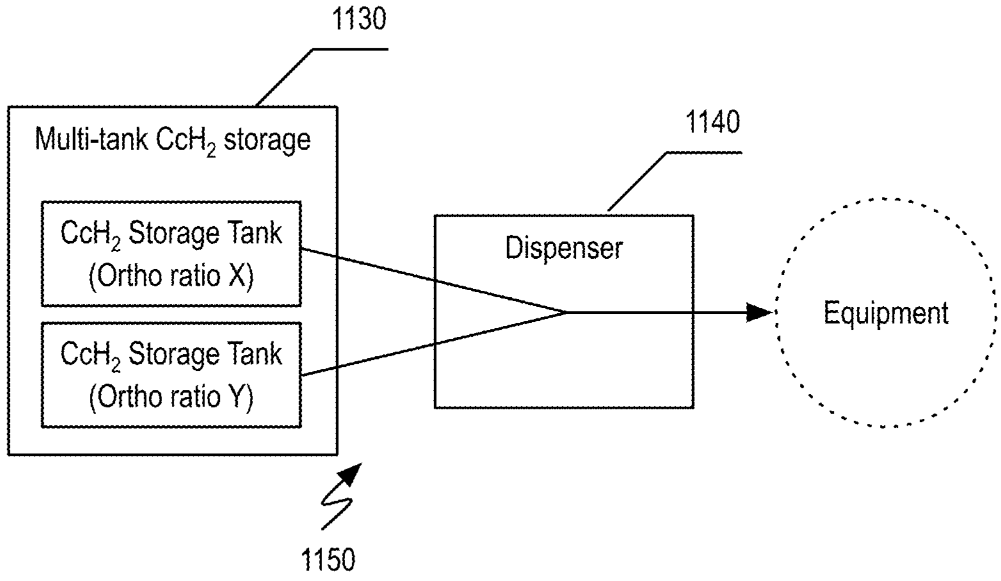
FIG. 28 is a schematic representation of a system variation that selectively dispenses from one or more storage tanks of a storage system based on desired dormancy.

In some variations, the system is implemented to enable dispensing of cryo-compressed hydrogen with calibrated ortho-para concentrations. While this capability may similarly be applied in other variations, one system variation may be reduced to a system that includes components for controlling ortho-para concentrations for dispensing. In one variation, as shown in FIG. 27 the system may include a catalyst system 1160, a storage vessel 1130, a dispensing system 1140, and a fuel processing network 1150 that incorporates a reprocessing sub-network for recycling hydrogen fuel for adjustments to the ortho-para concentration. In another approach, as shown in FIG. 28, a multi-tank storage system 1130 may be used where the dispensing system 1140 can either selectively dispense from different tanks and/or mix cryo-compressed hydrogen with different ortho/para concentrations to calibrate ortho/para concentrations of dispensed cryo-compressed hydrogen.

While these different variations of the system may be possible, herein the system is primarily described from the perspective of a fully integrated system that assists in producing cryo-compressed hydrogen, temporarily storing the cryo-compressed hydrogen, and then dispensing the cryo-compressed hydrogen as shown in FIG. 23A. Any of the component and system variations may be adapted to or integrated with the other variations described herein.

In some variations, the system may further include a hydrogen production apparatus; i.e., a component that produces gaseous hydrogen from liquid water and transfers it to the compressor 110. In one of these variations, the hydrogen production apparatus comprises an electrolysis apparatus connected to a water source, wherein the electrolysis apparatus extracts gaseous hydrogen from the water source.

In some variations, however, a system focused on production of cryo-compressed hydrogen may include a compressor 110, a cooling system 120, a storage system 1130, and a fuel processing network 1150 comprised of conduit channels 152 interconnecting the components of the system such as the compressor 110, the cooling system 1120, the storage system 1130 and/or other components or sub-components described herein.

A compressor 1110 functions to compress hydrogen gas. The compressor increases the pressure of a supplied hydrogen fuel, which will generally be in a gaseous form. As mentioned, in some variations, compressed hydrogen may alternatively be supplied directly. The compressor 1110 may be designed to function with an inlet pressure of approximately ambient pressure to 20 bar and an outlet pressure of approximately 200-875 bar but preferably closer to 500 bar. Accordingly, the compressor 110 may compress a gaseous hydrogen input to 200-875 bar. In some variations, the inlet pressure may be higher (e.g., 80 bar), depending on whether the hydrogen is produced on-site, and on the method of hydrogen production and delivery. Accordingly, the compressor 110 may have an input of gaseous hydrogen 20-80 bar, though other inputs may alternatively be used. In other variations, the inlet pressure may be much higher (e.g. 200 to 350 bar if it is being trucked into the cryo-compressor site as $GH_2$).

The compressor 1110 may be of any type of pressure system that can apply pressure to achieve the desired pressure range of a hydrogen fuel output. Examples of compressor types include: positive displacement compressors (e.g., reciprocating compressors, ionic liquid piston compressors, rotary screw compressors, rotary vane compressors, rolling piston compressors, diaphragm compressors) and dynamic compressors (e.g., air bubble compressors, centrifugal compressors, mixed-flow compressors). In many implementations, the system requires the compressor 110 to function in a high dynamic range (e.g., ~0-500 bar). For this reason, in some variations the system may include multiple compressors 110 wherein each compressor functions in some improved efficiency range, thereby providing better efficiency for compressing hydrogen.

The cooling system 1120 functions to cool or otherwise change the temperature of the hydrogen fuel to produce cryo-compressed hydrogen. Generally, the cooling system 1120 may function to independently cool hydrogen and/or function in conjunction with other system components to cool hydrogen and/or maintain already cooled hydrogen. In particular, the cooling system 120 preferably cools hydrogen fuel in a compressed state (e.g., high-pressure hydrogen fuel). As such the cooling system can include an inlet or input for hydrogen fuel in a compressed state. The compressed hydrogen may in some variations originate from a compressor 1110 (or more specifically a compressor output). The compressor output can be coupled to the cooling system for transfer of the hydrogen in the compressed state to the cooling system. In another variation, the cooling system 1120 may have an inlet with connection to another source of high-pressure hydrogen.

The cooling system 1120 in some preferred variations acts on or includes a sub-system that cools pressurized hydrogen fuel (supplied from the compressor 1110). In one example, the cooling system 1120 may function in conjunction with the compressor 1110 to simultaneously cool hydrogen gas as it is being compressed. Additionally, the cooling system 1120 may function to provide cooling to maintain cryo-compressed hydrogen, which in some variations includes integrating with the storage system 1130 to cool stored cryo-compressed hydrogen. For example, the cooling system 1120 may be incorporated with the storage system 1130 such that the cooling system helps maintain the cryo-compressed hydrogen cold. In another example, the cooling system 120 may be incorporated with the dispensing system 1140 to minimize heat loss during cryo-compressed hydrogen dispensation.

The cooling system 1120 may implement any type of cooling mechanism. The cooling system 1120 may be configured to cool within the appropriate thermodynamic conditions required to produce cryo-compressed hydrogen, as shown in FIG. 22; i.e., the cooling system must be able to operate in the appropriate temperature and pressure range. That is, the cooling system 1120 must be able to cool hydrogen from the implemented ambient temperatures (e.g., room temperature, ~293-298 K) to the cryo-compressed hydrogen temperatures (~33-110 K); and designed to function at the required pressures and preferably 500 bar. Accordingly, the cooling system 110 may cool and/or maintain temperature of 33-110 K for compressed hydrogen at ~200-875 bar, thereby establishing hydrogen fuel in a cryo-compressed state (i.e., cryo-compressed hydrogen).

Accordingly, when the compressor 1110 and the cooling system 1120 are used in combination the compressor compresses a hydrogen fuel in a gaseous state to a compressed state with a pressure of 200-875 bar; and the cooling system cools the hydrogen fuel in the compressed state to 33-100K thereby establishing hydrogen fuel in a cryo-compressed state (i.e., cryo-compressed hydrogen).

As described above, the cooling system 1120, may implement any general type of cooling/refrigeration that is compatible with the appropriate temperature and pressure ranges. These may be cyclic or non-cyclic types of refrigeration. For example, the cooling system 120 may implement: mechanical refrigeration, thermoelectric cooling, magnetic refrigeration, vapor-compression refrigeration, absorption refrigeration, adsorption refrigeration, heat, gas cycle, thermoacoustic refrigeration (e.g., pulse tube refrigerator), dilution refrigeration, and the like.

It can be noted that some of these types of refrigeration may have limited ranges of cooling and cooling efficiencies. For example, some forms of mechanical refrigeration and magnetic refrigeration work well near room temperature, but are somewhat inefficient below 0° C. On the other hand, thermoacoustic refrigeration and dilution refrigeration are much more efficient at temperatures on the order of 10 K. In many variations, the cooling system 1120 may include multiple types of cooling refrigeration. For example, the cooling system 1120 may include a magnetic refrigeration component intake that works in conjunction with the compressor 1110, which cools ambient temperature hydrogen during compression, which is then then transferred to a cyclical vapor-compression refrigeration component (e.g., using liquid $N_2$), which then further cools the compressed hydrogen to the desired cryo-compressed temperatures. In the same manner, the cooling system 1120 may use the same, or a different refrigeration component better optimized for cold temperature maintenance of the storage system 1130. For example, the cooling system may further include a dilution refrigerant (i.e., 3He/4He) surrounding the storage system 1130 to maintain its temperature.

Figure 29A:
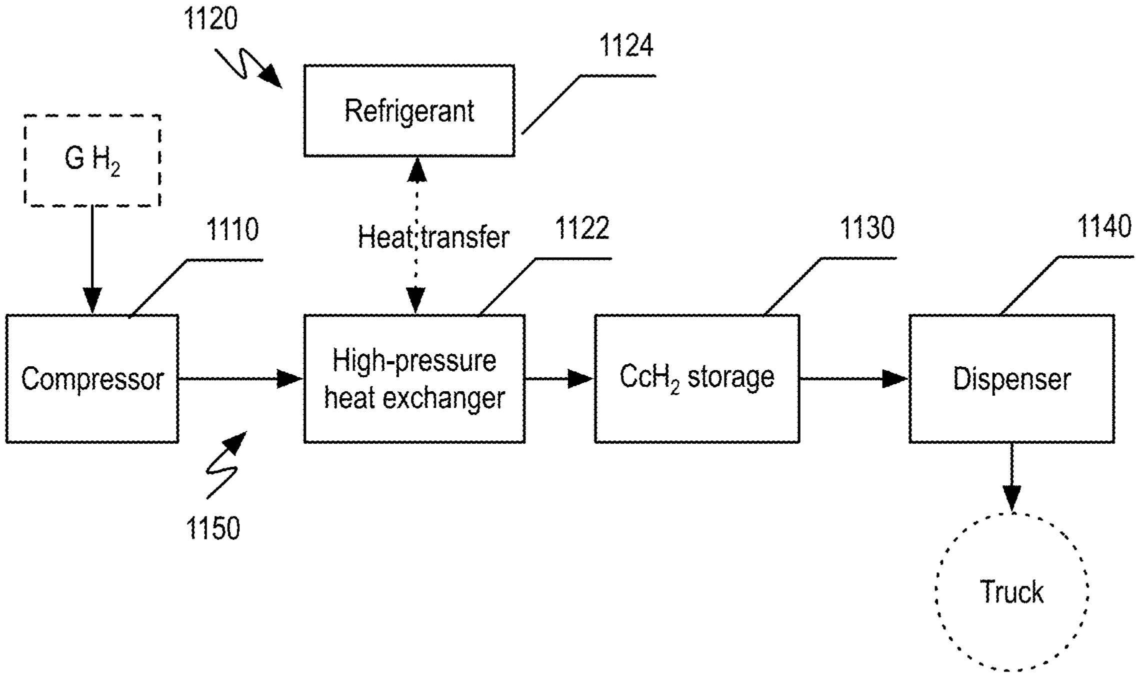
FIGS. 29A-29C are schematic representations of system variations with various cooling system configurations.

In one variation, the cooling system 1120 includes a heat exchanger 1122 and a refrigeration system 1124, where the heat exchanger is thermally coupled to a refrigeration system 1124, and where hydrogen in compressed state is passed through the heat exchanger as shown in FIG. 29A.

The heat exchanger functions to enable heat transfer from the hydrogen out of the system (typically first to the implemented refrigerant), thereby cooling the hydrogen. The heat exchanger may be situated on, around, and through any other system component, thereby enabling heat transfer with that component. The heater exchanger may be a diffusion bonded heat exchanger. Alternatively, the heat exchanger may be an adhesion bonded heat exchanger.

The heat exchanger may be any general type of heat exchanger. Examples include: shell and tube heat exchanger, double pipe heat exchanger, plate heat exchanger, plate and shell heat exchanger, adiabatic wheel heat exchanger, finned tube heat exchanger, pillow plate heat exchanger.

In many variations, the heat exchanger comprises a parallel current flow heat exchanger (with, or counter-current). Alternatively, the heat exchanger may comprise a cross-current flow heat exchanger.

The heat exchanger must be able to meet the required life cycle under cryo-compressed hydrogen operating conditions. The combination of hydrogen embrittlement, high pressures, and cryogenic temperatures can represent a challenge. The microdiffusion bonded heat exchanger, with an alloy like Stainless Steel 316L, is a preferred embodiment.

Figure 30A:
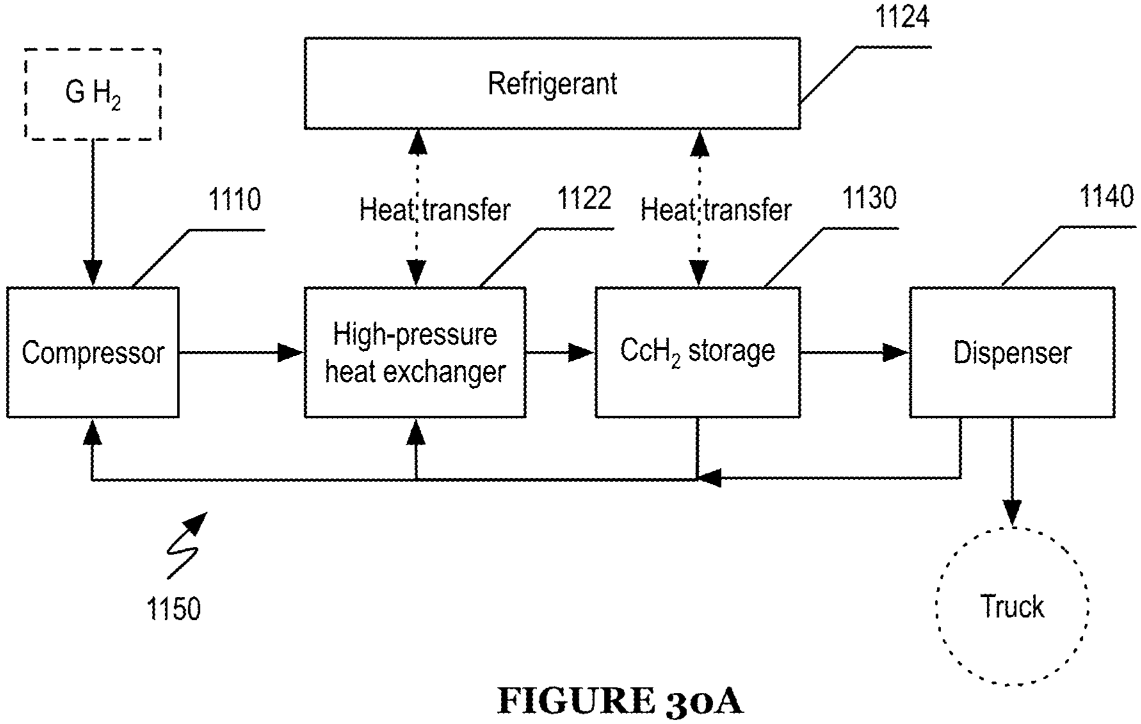
FIGS. 30A and 30B are dispensing system variations.
Figure 30B:
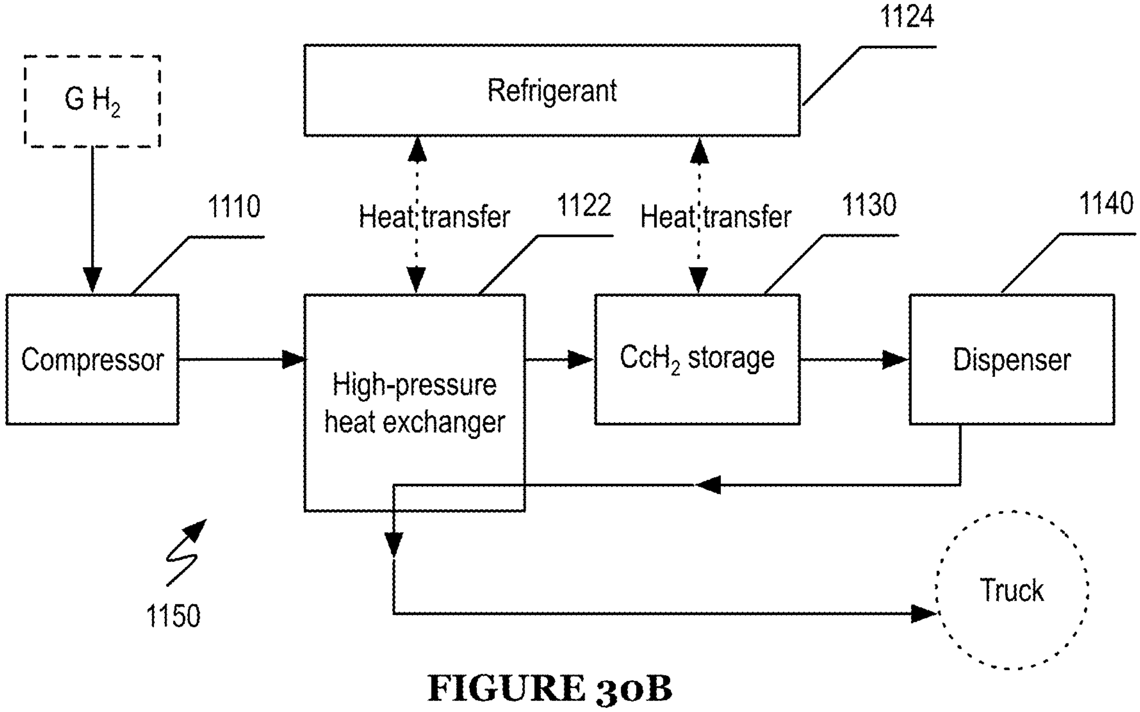

The heat exchanger 1122 in one variation is integrated in series between the compressor 110 and the storage system 1130, where the heat exchanger 1122 is a distinct heat exchanger as shown in FIG. 29A. The fuel processing network 1150 can interconnect the components such that hydrogen fuel (ambient gaseous hydrogen) is supplied to the compressor that outputs compressed hydrogen, which transfers through an interconnecting conduit channel to the heat exchanger 1122 of the cooling system 1120, and which then transfers hydrogen fuel that is now compressed and cooled to become cryo-compressed hydrogen to the storage system 1130. In one embodiment, the same heat exchanger, having sufficient thermal mass, can be used to also cool down hydrogen as it is being dispensed. As shown in FIG. 30B, hydrogen fuel may be cycled through the heat exchanger 122 during dispensing. This may function to share a heat exchanger resource for production of fuel as well as dispensing.

In some variations, the heat exchanger may include a catalyst 1160. In other words, the catalyst 1160 is integrated within the heat exchanger. The catalyst may be used to alter ortho/para concentrations within the hydrogen fuel. The catalyst 1160 may be incorporated into the heat exchanger as shown in FIG. 31 such that as fuel is cooled by the heat exchanger 1122, and the ortho/para concentrations may also be altered through exposure to the catalyst.

Additionally or alternatively, the heat exchanger 1122 may include or be integrated within a reprocessing sub-network of the fuel processing network 1150. This may be used so that hydrogen fuel may be recycled back through the heat exchanger.

In one variation, the reprocessing sub-network may be integrated with the heat exchanger 1122 to process hydrogen fuel over multiple cycles through the heat exchanger to iteratively cool the hydrogen fuel to a targeted temperature. In this variation, a reprocessing sub-network may be used to selectively reprocess hydrogen by the cooling system 1120 or to transfer hydrogen fuel to a connected component (e.g., the storage system 1130).

Figure 31:
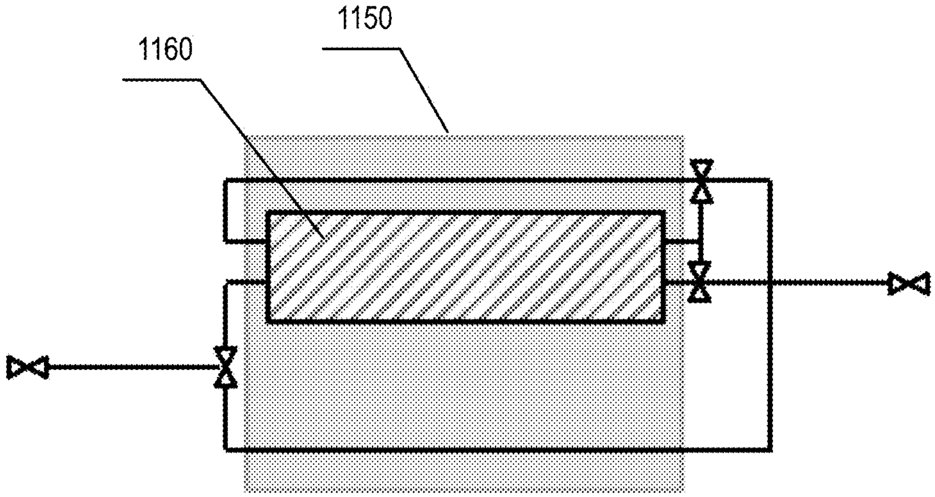
FIG. 31 is a schematic for an example cooling system that comprises a heat exchange pathway containing a catalyst.

Accordingly, the system can include a reprocessing sub-network within the heat exchanger, as shown in FIG. 31, that includes a first selectable conduit channel that transfers hydrogen fuel in the cryo-compressed state to the storage vessel and a second selectable conduit channel that recirculates the hydrogen fuel through the heat exchanger. The first and second selectable conduit channels may be subsequent to an integrated catalyst 1160 and/or an output of the cooling system 1120. Selection of the two selectable conduit channels may be based on sensed para ortho concentrations. In such a variation, this reprocessing sub-network may be configured such that hydrogen fuel may be selectively exposed to the catalyst or not when passing through the heat exchanger 1122 as shown in FIG. 31.

The refrigeration system 1124 functions to actively cool and extract heat energy from a component of the system and thereby hydrogen fuel of the component.

In some variations, the refrigeration system 1124 may be thermally coupled to the heat exchanger 1122, the storage system 1130, the dispensing system 1140, the fuel processing network 1150, or some other suitable component of the system.

Figure 29B:
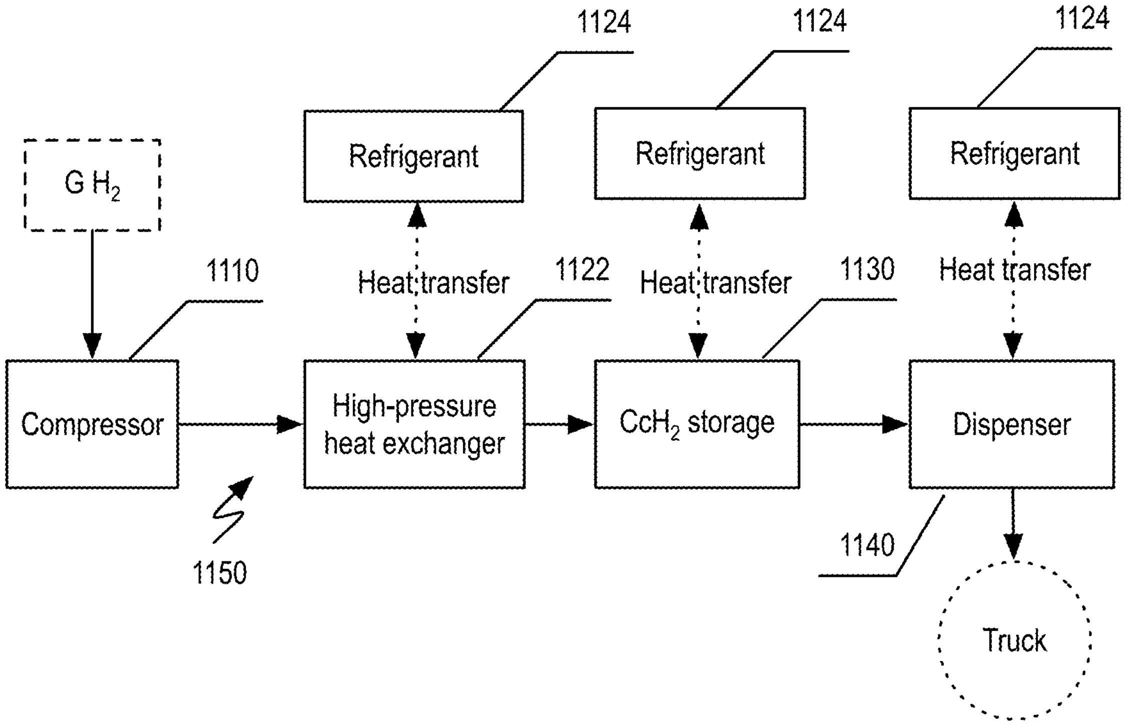
Figure 29C:
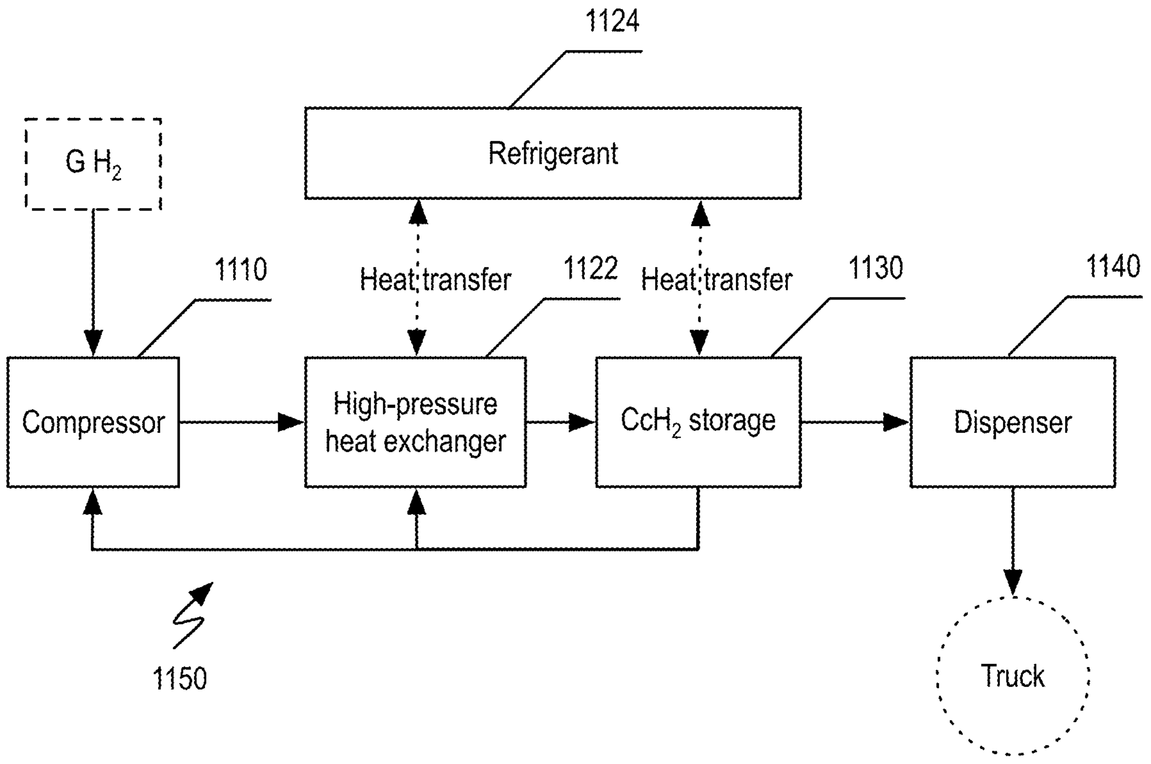

In one variation, the cooling system 120 includes a refrigeration system 1124 that is thermally coupled to the storage system 1130, this may be independent of any heat exchanger or other cooling system used to cool compressed hydrogen. As shown in FIG. 29B, a distinct refrigeration system may be integrated with a heat exchanger 1122, the storage system 1130, and the dispensing system 1140. In some variations, a refrigeration system 1124 used by a heat exchanger 1122 may be shared with other components as shown in FIG. 29C.

In one variation, liquid $N_2$ can be utilized. Once $LN_2$ has gasified, it enters the refrigeration loop and is re-liquified. This can also be combined with sacrificial $LN_2$. In another embodiment, similar refrigerant loops using in liquid natural gas, such as propane and ethylene, can also be implemented.

The storage system 1130 functions as a buffer or temporary storage solution for processed and conditions cryo-compressed hydrogen. The storage system 1130 include one, or more, tanks, receptacles, or other suitable vessels enabled to store cryo-compressed hydrogen. Hydrogen fuel is preferably supplied as input that has been pressurized and cooled to a pressure and temperate state of cryo-compressed hydrogen.

The storage system 1130 may comprise one, or more, tanks/receptacles enabled to hold high pressure hydrogen. Additionally, the tanks may be sufficiently insulated such that cryo-compressed hydrogen held within the tanks is maintained at relatively constant temperature. Additionally or alternatively, some, or all tanks of the storage system 1130 may have minimal, or no, insulation but are contained within the cooling system 1120, such that the cooling system provides additional cooling and/or insulation for the tanks. In some variations, the tanks of the cooling system 1120 may be multi-layered insulated storage vessels for enhanced cryo-compressed hydrogen as described in PCT Application with Pub. No. WO2023/183946, filed on 26 Mar. 2024, titled "SYSTEM AND OPERATING METHOD FOR ENHANCED DORMANCY IN CRYO-COMPRESSED HYDROGEN STORAGE VESSELS", which is hereby incorporated in its entirety by this reference.

In some variations, the storage system 1130 may be a multi-tank storage system, wherein the storage system 1130 includes a plurality of tanks for cryo-compressed hydrogen storage. Dependent on implementation, these tanks may or may not be interconnected.

In one variation, different tanks from a multi-tank storage system may store cryo-compressed hydrogen of different states. In particular, the multi-tank storage system may store cryo-compressed hydrogen of different ortho-para concentrations, which functions to store different cryo-compressed hydrogen for different amounts of dormancy (e.g., short-term and long-term storage). Accordingly, a first storage tank and a second storage tank of the plurality of storage tanks may store hydrogen of cryo-compressed hydrogen with differing ortho-para concentrations. The tanks preferably contain a specific population of ortho-hydrogen for specific end-use cases, such as immediate driving or immediate idling of a long-haul truck.

The system can preferably selectively process and generate the cryo-compressed hydrogen of a targeted state and then deliver it to a corresponding tank. Then, the system switches to processing and generating cryo-compressed hydrogen of a different state for another tank.

In such a variation, the fuel processing network 150 may include routing options to selectively direct produced cryo-compressed hydrogen to a select tank based on ortho-para concentrations of prepared cryo-compressed hydrogen. In a similar way, the fuel processing network 1150 may include reprocessing sub-networks to reprocess hydrogen from the plurality of tanks.

Accordingly, a storage system 1130 with a plurality of tanks may include long-term storage tanks and short-term storage tanks. The long-term storage tanks are used to store long-term use hydrogen and short-term storage tanks may be used to store short-term use hydrogen as described herein.

Long-term storage tanks may be characterized as tanks wherein the cryo-compressed hydrogen is converted or relaxed to a majority para state, its equilibrium state.

Long-term use hydrogen characterizes cryo-compressed hydrogen that has been converted to its equilibrium, or near-equilibrium, ortho-para concentration. The para to ortho conversion of hydrogen is an endothermic reaction. The stored cryo-compressed hydrogen storage can warm up over time due to controlled or uncontrolled heat flux through the storage system, which drives the equilibrium concentration towards ortho-hydrogen. Over time, this results in the endothermic para-to-ortho conversion, which absorbs energy and can thereby increase dormancy. Storage in these long-term systems can be used when dispensing demand decreases, such as during the weekend or a holiday, for trucking applications.

Short-term storage tanks may be characterized as tanks wherein the cryo-compressed hydrogen is produced relatively quickly (as compared to the ortho to para conversion) such that cryo-compressed hydrogen is closer to the initial hydrogen gas make up that is obtained (e.g., 75% ortho, 25% para at room temperature). Such a tank contains hydrogen outside of its thermodynamic equilibrium. In other words, the management and tank are design to trap the kinetic product.

Short-term use hydrogen is used herein to characterize cryo-compressed hydrogen closer to the initial hydrogen gas ortho-para concentration that was used to produce the cryo-compressed hydrogen. Typically, this is normal hydrogen, which comprises of 75% ortho-$H_2$. As the terms "short-term" and "long-term" are relatively analogous with respect to use and storage, as used herein, the terms may equally refer to storage or use without any loss of generality. That is, since short-term storage tanks are used for short-term cryo-compressed hydrogen use, "short-term" may equally refer to short-term use or short-term storage; and since long-term storage tanks are used for long-term cryo-compressed hydrogen use, "long-term" may equally refer to long-term use or long-term storage. As short-term and long-term refer to the extreme cases, different states between these short-term and long-term states can also be implemented as desired.

In some variations, some tanks of the storage system 1130 may be designated for short-term storage (i.e., short-term tanks). In some variations, short-term tanks are insulated tanks situated outside of the cooling system 120. Alternatively, short-term tanks may be situated within the cooling system 120. These short-term tanks can be used when demand for dispensing is expected to be high, such as during a normal work week for trucking applications. Short tanks, and the strategies that enable short tanks, can be used to ensure certain buffer storage tanks are maintained at a certain pressure. This may be harnessed for cascade-like refueling, or simply to ensure that a given $\Delta P$ is always established for certain refueling protocols.

In some variations, some tanks of the storage system 1130 may be designated for long-term storage (i.e., long-term tanks or buffer storage). In some variations, long-term tanks are insulated tanks situated outside of the cooling system 1120. Alternatively, long-term tanks may be situated within the cooling system 1120. Such long-term storage tanks may contain hydrogen that can be dispensed for long term storage use cases, such as a truck idling for multiple days.

In some variations, long-term tanks may be connected to the compressor 1110 and/or the cooling system 1120. In these variations, as the tank naturally heats and para to ortho conversion occurs, the content of the long-term tank is re-cycled through the compressor 1110 and/or cooling system 1120, thereby re-populating para-hydrogen and re-cooling the hydrogen. In another variation, long-term tanks may be situated within the cooling system 1120. In this variation, the cooling system 1120 may continuously cool the long-term tank thereby maintaining the equilibrium concentration and removing heat if any ortho to para conversion occurs. For example, in one implementation, a counter flow heat exchanger situated around the long-term tank may remove the heat generated. For better energy efficiency, this flow may be increased, decreased, and/or stopped dependent on the heat exchange needs. For example, the cooling flow can be tuned to match the heat flux into the tank and any exothermic conversions that occur.

In some variations, short-term tanks may convert to long-term tanks and vice-versa during regular operation. That is, during operation, tanks in the storage system 1130 may change designation from short-term to long-term and vice-versa. For example, tanks may be initially designated as short-term. After the tank has been full for several days and is still relatively full, it may change designation to a long-term tank and the system may recycle or cool the stored cryo-compressed hydrogen to take into account the ortho to para conversion.

In another variation, a tank used to store long-term use hydrogen may be store hydrogen for some period of time close to the dormancy period of the long-erm use hydrogen such that the hydrogen may then be used as short-term use hydrogen.

The dispensing system functions to "dispense" out cryo-compressed hydrogen. The dispensing system 1140 may be connected to the storage system 1130 such that cryo-compressed hydrogen may be "pumped" from the storage system 1130 to where it will be used. The dispensing system 1140 may be at least partially designed for particular use cases. That is, the dispensing system 1140 may include a nozzle, feed-tube, pump, etc., that is designed to connect to the use case. For example, for truck fueling, the dispensing system 140 may include a nozzle appropriate to connect with the truck fuel tank, thereby enabling fueling of the truck.

The dispensing system may contain another heat exchanger that leverages the already existing refrigeration system or may use the same heat exchanger that is used to cryo-compressed hydrogen.

In some situations, the dispensing system 1140 or a truck (or receiving equipment) may vent hydrogen. The vented hydrogen can be returned via a dispensing reprocessing sub-network 1154 back to the storage 1130 or compressor 1110 as shown in FIG. 30A.

In variations that include a plurality of storage system 1130 tanks, the dispensing system 1140, may access different types of storage tanks (e.g., long-term, short-term) thereby, providing different types of cryo-compressed hydrogen as a fuel source. Accordingly, the dispensing system selectively dispenses from a select storage tank of the plurality of storage tanks based on pressures and ortho-para concentration of the select storage tank. Dependent on implementation, the type of cryo-compressed hydrogen may be selected (e.g., by a user/customer) or automatically determined (e.g., by a control system provided with the type of available cryo-compressed hydrogen and/or the type of fuel utilization). By having options as it pertains to pressure and ortho-para concentration, many different types of refueling protocols and on-board use cases can be served, with a single refueling system.

In some variations, the system may not include a dispensing system 1140 per se. In these variations, tanks within the storage system 1130 may play multi-functional role. For example, tanks (or sets of tanks) within the storage system 1130 may be the exact type that can be used by a vehicle. These tanks may fill a storage purpose while connected to the system, but may then be disconnected and attached to a vehicle as fuel canisters (e.g., fuel canisters on a truck). Once the fuel canister(s) are empty, they may then be offloaded and connected back into the storage system 1130. This may be particularly useful for multi-layer insulation storage tanks.

The fuel processing network 1150 functions as connecting conduits used to transfer hydrogen fuel through the various components of the system. The fuel processing network 1150 can include a plurality of interconnecting conduit channels 1152. These conduit channels may link or connect outputs and inputs of various components. For example, in system with a compressor 1110, cooling system 1120, storage system 1130, and dispensing system 1140, the conduit channels 1152 may include: a compressed hydrogen conduit channel connecting an output of the compressor 1110 to an input of the cooling system 1120; a processed cryo-compressed hydrogen conduit channel connecting an output of the cooling system 1120 to an input of the storage system 1130; and a dispensing conduit channel connecting an output of the storage system 1130 to the dispensing system 1140.

The fuel processing network 1150 is preferably directed such that hydrogen fuel may be transferred in one direction. In some variations, the fuel processing network 1150 may include control valves, pressure regulation, or other control flow systems used to direct or otherwise manage flue of hydrogen fuel (depending on state of the hydrogen fuel). A control system may manage operation and control of the fuel processing network 1150.

As discussed, some variations may include various reprocessing sub-network, which function as flow circuits within the fuel processing network 1150 to recirculate and process hydrogen fuel in some way.

A reprocessing sub-network may be used to re-cool hydrogen, to alter ortho-para concentrations through exposure to a catalyst 160, and/or convert vented hydrogen back to cryo-compressed hydrogen. The resulting cryo-compressed hydrogen may then be restored in the storage system.

In one variation, the system includes a cooling system reprocessing sub-network. In some variations, this may be integrated directly within the cooling system 1120. For example, a heat exchanger 1122 may have a set of conduit channels with control valves that may be used to recycle hydrogen back through the cooler to cool the hydrogen. In other variations, the cooling system reprocessing sub-network may recycle hydrogen from the output of the cooling system 1120 or from the storage system 1130 back through the cooling system 1120.

In another variation, the system includes a catalyst reprocessing sub-network. In this variation, a conduit channel may be used to return hydrogen fuel for further exposure to a catalyst, which functions to alter the ortho-para concentrations. The hydrogen fuel may be repeatedly exposed to the catalyst by cycling repeatedly back through the catalyst reprocessing subnetwork. In some variations, the catalyst reprocessing sub-network may be the same as a cooling system reprocessing sub-network.

In some variations, a control system may control a set of valves to redirect hydrogen flow through the fuel processing network. For example, control valves may be used to selectively determine if cryo-compressed hydrogen output from some component like a heat exchanger 1122 should be reprocessed or if it should be directed to the storage system 1130. In such a variation, the fuel processing network 1150 may include a first selectable interconnection conduit channel from the heat exchanger system 1122 connecting to the storage system 1130 (or optionally the dispensing system 1140 in some variations), and a second selectable interconnection conduit channel from the heat exchanger, returning hydrogen fuel back to a preceding component. In some variations, the preceding component can be the cooling system 1120 with an integrated catalyst system or simply a standalone catalyst system.

In one variation, the system includes a vented hydrogen fuel reprocessing sub-network that transfers or cycles vented gaseous hydrogen fuel back from the storage vessel (or suitable component) to a compressor 1110 so as to be reprocessed. In this variation, the storage system 1130 may include a vent used to discharge gaseous hydrogen that can form. This functions to avoid waste and make the system more efficient. The storage system 130 may vent gaseous hydrogen that is collected and redirected via the vented hydrogen fuel reprocessing sub-network back to the compressor 1110.

As discussed, some system variations may use a multi-tank storage system 1140. In such a variation, the fuel processing network 1150 may have selectable conduit channels to selectively fill different tanks. Alternatively, a fuel processing network may interconnect the tanks of the storage system 1130 such that cryo-compressed hydrogen sequentially fills each tank.

In some variations, particularly variations that include long-term and short-term storage, the system may incorporate a catalyst that speeds up the ortho to para conversion of the cryo-compressed hydrogen. The catalyst 1160 may include catalyst systems and/or processes such as described in PCT Application with Pub. No. WO2023/183946, which is incorporated by reference. In a variation that includes a catalyst, in one variation, the catalyst may be integrated such that hydrogen fuel may have the ortho-para concentrations altered to impact the dormancy of the cryo-compressed hydrogen fuel.

In some variations, the fuel processing network 1150 may selectively route the hydrogen fuel to different components for differing processing. The fuel processing network 1150 may include a selectable catalyst conduit channel and a non-catalyst conduit channel. In this way, the system may pass hydrogen fuel through the catalyst to increase dormancy but could also not pass the hydrogen fuel to the catalyst if the cryo-compressed hydrogen is for immediate use. In other variations, different catalysts or catalyst systems may be configured for differing exposure or impact of the catalyst may be used for different selectable conduit channels.

The catalyst may alternatively or additionally be integrated within some portion of the fuel processing network 1150 or as a separate component. Examples of catalysts for the ortho to para conversion may include: a hydrogen catalyst (e.g., ortho-hydrogen has catalytic properties), molecular and material catalysts (e.g., hydrous ferric oxide, chromium oxides, nickel oxides), and/or field catalysts (e.g., paramagnets). Any other ortho to para catalysts may be incorporated as applicable. The catalyst may be incorporated into any and/or all system components and connectors where cryogenic hydrogen passes through. For example, the catalyst may be incorporated into the tubing 1110 that is within the cooling system 1120. As part of the FIG. 23 example, the catalyst may be in the flow tubes of the heat exchanger. In one implementation, as shown in FIG. 21, gaseous hydrogen may wrap back and travel through the catalyst embedded heat exchanger multiple times. In another implementation, the catalyst may be coated within the walls of a microdiffusion bonded heat exchanger.

As another variation, the catalyst may be in storage tanks designated for long-term storage. In the case of a multi-tank storage system 1130, one or more tank may include a catalyst (possibly different types of catalysts) to calibrate stored hydrogen In one implementation of a catalyst within long-term storage tanks, the inner lining of the storage tank may be lined with the catalyst. In another implementation, a minimum amount of ortho-hydrogen may be kept (or pumped into) a long-term storage tank to promote the auto-catalytic effect of ortho-hydrogen.

In some variations, the system may include a sensing system to monitor state of the hydrogen fuel. The sensing system may include pressure sensors or detectors, temperature sensors, and/or sensors for monitoring ortho and/or para concentrations in hydrogen (e.g., a ortho-para monitoring system). The sensing system accordingly be output pressure parameters, temperature parameters, and/or ortho or para concentration parameters for hydrogen within the system and various points.

In one embodiment, a temperature-based sensor mechanism is used to infer the ortho-para concentration. A certain section of the sub-network may be calibrated to the temperature of the hydrogen following a known amount of ortho-conversion. This may be performed for a number of reference conditions. Each reference corresponds to a fixed amount of ortho hydrogen that was converted. This exothermicity increases the temperature of the hydrogen and its surrounding environment. In this way, with sufficient calibration under multiple reference cases, temperature sensor can be used to infer the ortho concentration.

In a similar variation, the temperatures of hydrogen fuel flowing through a heat exchanger under various conditions without a catalyst may be used for establishing reference temperatures. The various conditions could include a variety of hydrogen fuel flowrates and refrigerant flow rates during operation of the heat exchanger. This can establish a number of reference conditions for various operating conditions of the heat exchanger. When the heat exchanger is equipped with an integrated catalyst (such as in FIG. 31), temperature differences from the reference temperature of similar conditions (e.g., corresponding hydrogen fuel/refrigerant flow rates) can be associated with the exothermic reaction of ortho to para conversion. In other words, as the ortho-to-para conversion energy is known across relevant working conditions (e.g. in kJ/kg), if the flow rate is known, and if any possible temperature deviation is measured relative to a baseline case (e.g. no conversion), then the total conversion and conversion % of the flowing hydrogen can be assigned.

The system may additionally include a control system that functions to manage and control operation of the components and flow of hydrogen through and within the system. Control system can be configured to manage conditioning and production of hydrogen fuel and/or dispensing fuel from the dispensing system 140. The control system can additionally collect sensed parameters from the sensing system so as to determine how to alter operation of the system.

The control system may be used to selectably and dynamically direct flow of hydrogen fuel between different components for updated processing. This may be used to cool the hydrogen, or target some amount of catalyst exposure, to select or move hydrogen from different storage tanks of the storage system 130, and/or take other actions.

The control system may operate using pre-configured presets, based on user input, and/or sensed conditions.

As an example of pre-configured pre-sets, the control system may control the flow to target some temperature and/or amount of catalyst exposure. The operation of the system may be based on expected results of how processing of the hydrogen fuel will impact the state of the fuel. In one variation using temperature as an indicator for orthro to para conversion, a temperature sensor may measure the temperature and recycle hydrogen fuel through a catalyst equipped heat exchanger until a desired temperature difference is achieved, which would indicate a desired amount of ortho-to-para conversion has been achieved.

In some variations, the targeted properties may be conditional on other external factors such as time. For example, the system may operate with a configured setting for producing low dormancy during the work week, and then produce long dormancy over the weekend.

As an example of using user input, the control system may change operation in response to some user input. For example, the targeted level of dormancy may be determined based on some user input device. In one example, a user at 140 dispensing system 140 may select one of a set of possible dormancy levels depending on the desired amount of dormancy (e.g., long dormancy, short dormancy, no dormancy).

As an example of using sensed conditions, the control system may dynamically adjust exposure to a catalyst based on detected ortho-para conditions. In such a variation, the system may include a ortho-para monitoring system that collects ortho-para concentration data from the hydrogen fuel in the cryo-compressed state. In this variation, the fuel processing network 1150 may include a reprocessing sub-network, where the control system can cycle hydrogen fuel back to the catalyst through the reprocessing sub-network based on the ortho-para concentration data.

5. Management

Methods for managing cryo-compressed hydrogen may function to facilitate production, storage, maintaining, and/or dispensing cryo-compressed hydrogen. Different variations of the method may facilitate different aspects of these capabilities.

In general, a method for managing cryo-compressed hydrogen can include compressing hydrogen fuel in a gaseous state (i.e., gaseous hydrogen) to a compressed state (i.e., compressed hydrogen), cooling the hydrogen in the compressed state to produce hydrogen fuel in a cryo-compressed state (i.e., cryo-compressed hydrogen), and storing the hydrogen fuel in the cryo-compressed state in a storage system. The method can additionally include dispensing the cryo-compressed hydrogen. The method can additionally include exposing the hydrogen fuel to a catalyst, which alters ortho-para concentration. The method can additionally include reprocessing the hydrogen fuel or a portion of the hydrogen fuel. Reprocessing may be used for converting vented gaseous hydrogen back to cryo-compressed hydrogen, re-cooling the hydrogen fuel, and/or altering the ortho-para concentrations.

The system is preferably implemented through a system such as the one described herein, but any suitable system may be used.

Accordingly, in some variations, the method may be performed with a system that passes hydrogen fuel through a heat exchanger with an integrated catalyst. In such a variation, the method may include cooling the hydrogen in a compressed state to produce hydrogen fuel in a cryo-compressed state, which comprises passing the hydrogen fuel in the compressed state through a heat exchanger and exposing the hydrogen fuel to a catalyst while within the heat exchanger, and storing the hydrogen fuel in a cryo-compressed state in a storage system, when the hydrogen fuel reaches a desired ortho concentration level.

This method could similarly include compressing hydrogen fuel in a gaseous state to a compressed state, but a source of compressed hydrogen fuel may alternatively be supplied from some other source. Similarly, this method may include dispensing the cryo-compressed hydrogen and/or other processes for maintaining the cryo-compressed hydrogen.

Figure 37:
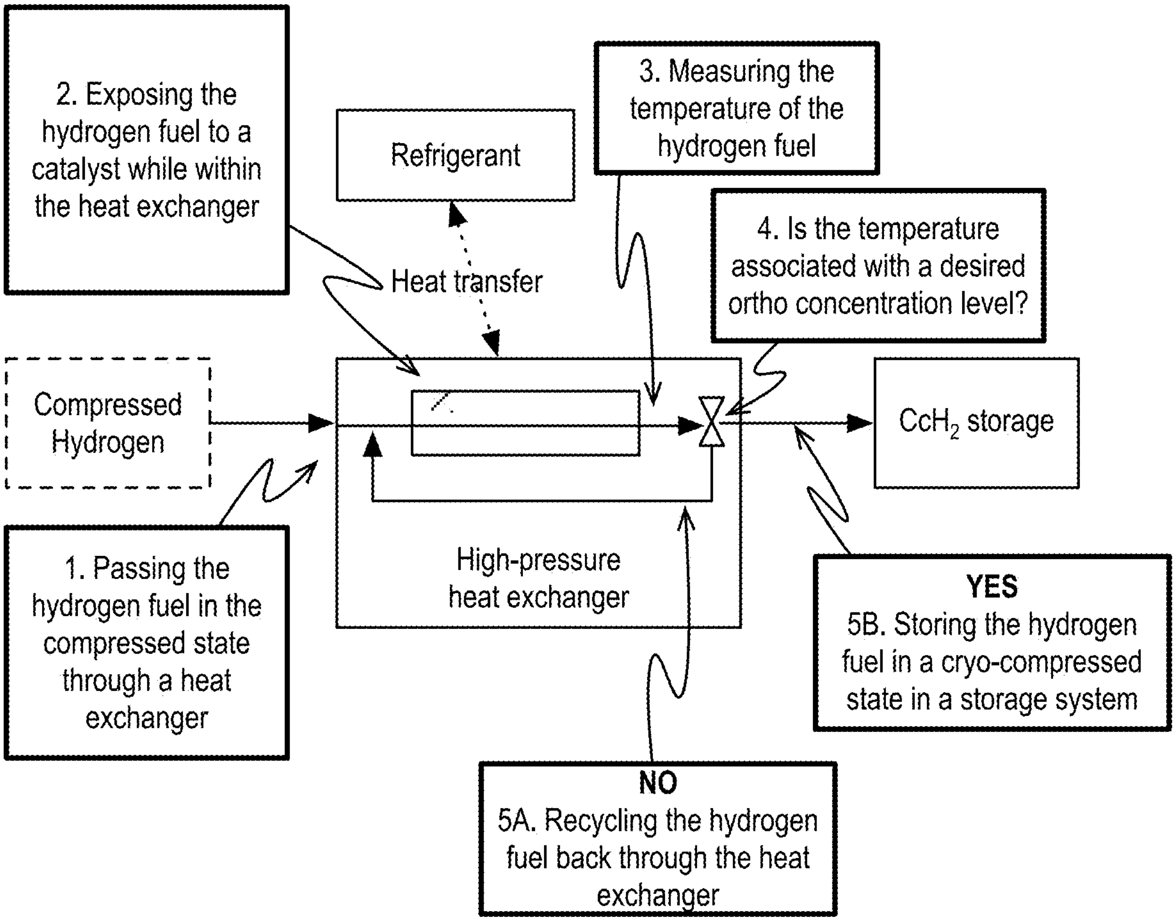
FIG. 37 is a schematic diagram of a method using temperature in evaluating processing of hydrogen fuel for satisfying an ortho concentration level.

In some method variations, temperature sensing may be used to measure an amount of ortho to para conversion. Accordingly, as shown in FIG. 37, the method may more particularly include cooling the hydrogen in a compressed state to produce hydrogen fuel in a cryo-compressed state, which comprises: passing the hydrogen fuel in the compressed state through a heat exchanger, exposing the hydrogen fuel to a catalyst while within the heat exchanger, measuring the temperature of the hydrogen fuel, and based on the temperature associated with a desired ortho concentration level, recycling the hydrogen fuel back through the heat exchanger or storing the hydrogen fuel in a cryo-compressed state in a storage system. Recycling the hydrogen fuel back through the heat exchanger will pass the hydrogen fuel through the heat exchanger a subsequent time and re-exposing the hydrogen fuel to the catalyst a subsequent time. If the temperature indicates a desired ortho concentration is not satisfied, then the hydrogen fuel is recycled through the heat exchanger and the catalyst. If the temperature indicates a desired ortho concentration is satisfied, then the hydrogen fuel can be stored.

Figure 38:
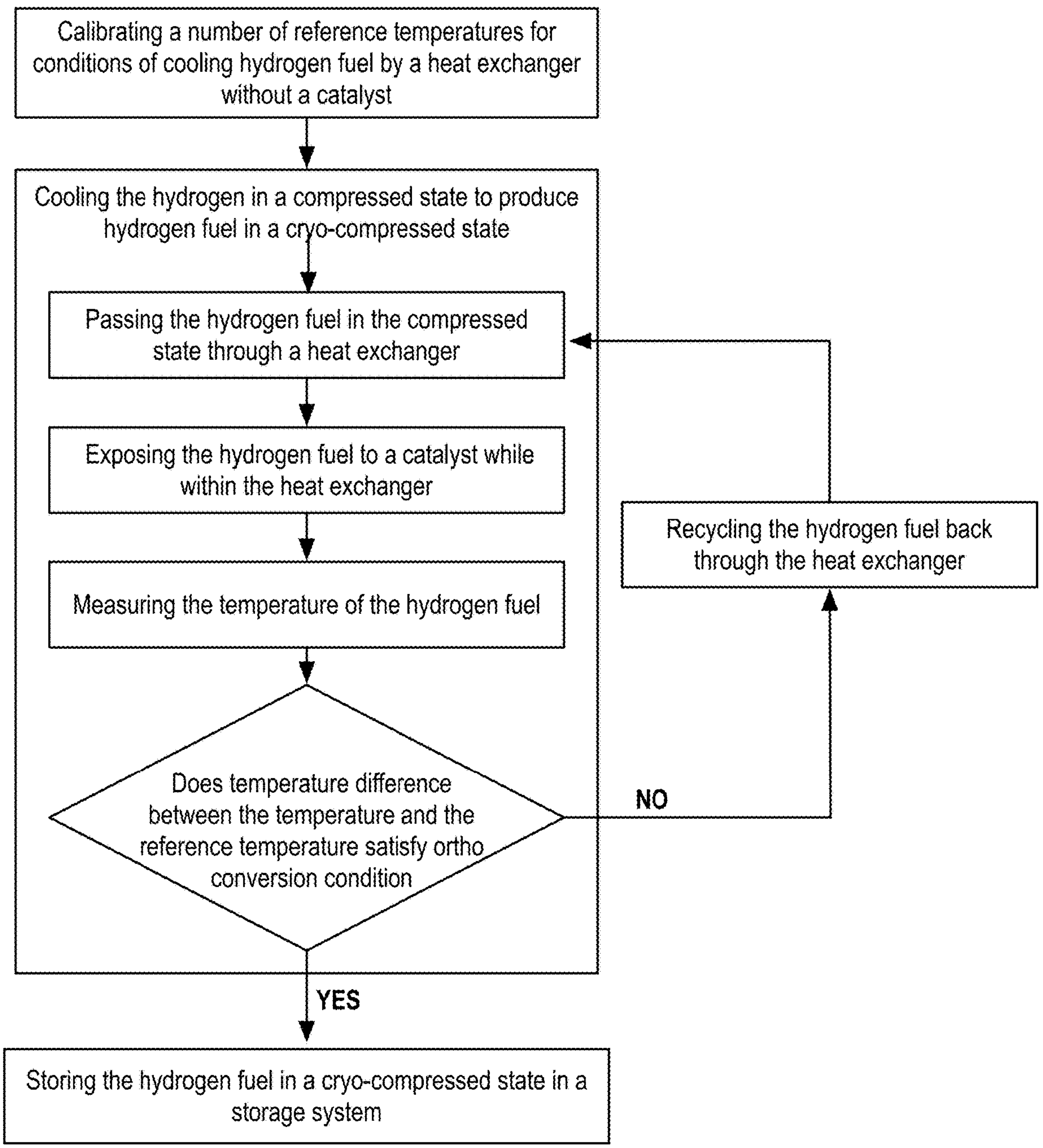
FIG. 38 is a flowchart of an example method using temperature sensing for producing cryo-compressed hydrogen of a targeted ortho concentration.

The temperature associated with a desired ortho concentration level is preferably based on a number of calibrated reference temperatures from conditions without ortho to para conversions (e.g., no exposure to a catalyst). Deviations of the temperature from a reference temperature can be associated with the exothermic reaction from ortho to para conversion initiated from exposure to a catalyst. Accordingly, as shown in FIG. 38, the method may more particularly include: calibrating a number of reference temperatures for conditions of cooling hydrogen fuel by a heat exchanger without a catalyst; cooling the hydrogen in a compressed state to produce hydrogen fuel in a cryo-compressed state, which comprises: passing the hydrogen fuel in the compressed state through a heat exchanger, exposing the hydrogen fuel to a catalyst while within the heat exchanger, measuring the temperature of the hydrogen fuel, and based on a temperature difference between the temperature and the reference temperature (e.g., a reference temperature from similar processing conditions of the heat exchanger without a catalyst), recycling the hydrogen fuel back through the heat exchanger or storing the hydrogen fuel in a cryo-compressed state in a storage system. The temperature difference is associated with an amount of ortho to para conversion and therefor may serve as an indicator of ortho concentration level.

Calibrating a number of reference temperatures for conditions of cooling hydrogen fuel by a heat exchanger can include for a number of conditions, measuring temperature of passing hydrogen fuel through the heat exchanger without a catalyst. A reference temperature may be used for calculating the temperature difference based on which corresponds to the current conditions. The number of conditions can include conditions for different hydrogen fuel flowrates and/or refrigerant flow rates. The temperature is preferably measured at the same location or region during calibration and during operation. In some variations, the temperature is measured at the end of the heat exchanger or near where the hydrogen fuel would exit the heat exchanger. In other words, measuring the temperature of the hydrogen fuel is measured after passing the hydrogen fuel through the heat exchanger.

In addition to using temperature as a proxy for measuring ortho concentration, temperature may also be used to detect when a catalyst has degraded. If processing of the hydrogen fuel through the heat exchanger deviates from expected results (e.g., some number of cycles or amount of flow typical for a certain targeted ortho conversion level), then triggering a catalyst degradation alert. For example, if it takes ten cycles through the heat exchanger to reach a targeted ortho concentration level (as indicated by temperature) when five is more normal, then it may mean the catalyst has degraded and a new catalyst should be installed soon.

Figure 32:
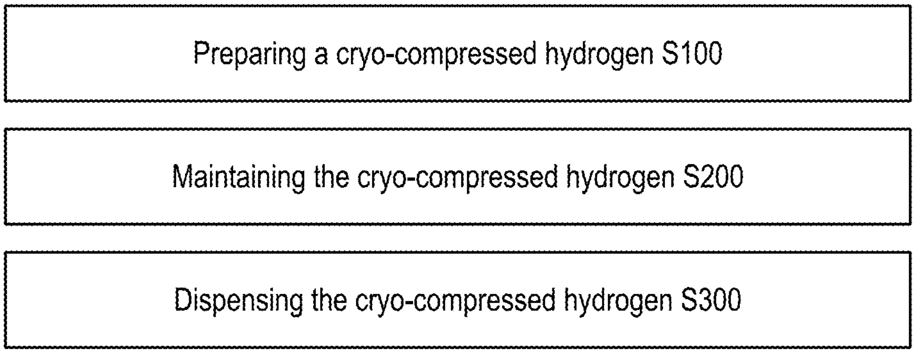
FIG. 32 is a flowchart representation of an example method for preparing, maintaining, and utilizing cryo-compressed hydrogen.

In general, the various processes may be characterized as preparing cryo-compressed hydrogen S100; maintaining the cryo-compressed hydrogen S200; and dispensing the cryo-compressed hydrogen as shown in FIG. 32. These processes may be implemented independently or in combination. The method is preferably implemented with a system such as described herein, but other suitable systems may alternatively be used.

In particular these cryo-compressed hydrogen processes may be characterized wherein: preparing cryo-compressed hydrogen S100, comprises obtaining hydrogen S102, compressing the hydrogen S104, thereby producing high pressure hydrogen, and cooling the high pressure hydrogen S106, thereby producing cryo-compressed hydrogen; maintaining the cryo-compressed hydrogen S200 comprises determining an ortho-hydrogen threshold S202, modifying the cryo-compressed hydrogen S204 to the ortho-hydrogen threshold, storing the cryo-compressed hydrogen S206 according to the ortho-hydrogen threshold, re-cooling the cryo-compressed hydrogen S208, and maintain the hydrogen at a given tank at a target pressure where application; and dispensing the cryo-compressed hydrogen S300, comprising optionally determining a type of cryo-compressed hydrogen utilization S302, comprising determining the appropriate ortho-hydrogen threshold for utilization. Such a method functions to produce cryo-compressed hydrogen, to store cryo-compressed hydrogen for short-term and long-term storage, and to provide different types of cryo-compressed hydrogen as a fuel source, dependent on the end-use utilization. Additionally, the method may leverage the quantity of short-term and long-term stored cryo-compressed hydrogen, and the demand for short-term use and long-term use cryo-compressed hydrogen to produce and provide the appropriate types of cryo-compressed hydrogen on a dynamic case-to-case basis. The method may be implemented with the system as described above but may be generally implemented with any appropriate system.

The method provides an over-arching supply chain for cryo-compressed hydrogen fuel starting from the acquisition of hydrogen to dispensation of cryo-compressed hydrogen fuel. That is, the method may be broken down into subgroups of method steps that provide a specific implementation.

The method may be or include processes for production of cryo-compressed hydrogen. That is, a method for cryo-compressed hydrogen production, includes: preparing cryo-compressed hydrogen, comprising obtaining hydrogen, compressing the hydrogen, thereby producing high pressure hydrogen, and cooling the high pressure hydrogen, thereby producing cryo-compressed hydrogen; and maintaining the cryo-compressed hydrogen, comprising determining an ortho-hydrogen threshold, modifying the cryo-compressed hydrogen to the ortho-hydrogen threshold, storing the cryo-compressed hydrogen according to the ortho-hydrogen threshold, and if needed, re-cooling the cryo-compressed hydrogen. In some instance, maintaining a given tank at a given pressure can also be implemented. This method may function to produce and enhance the thermal properties of cryo-compressed hydrogen based on the desired storage duration and dispensing needs.

Figure 36:
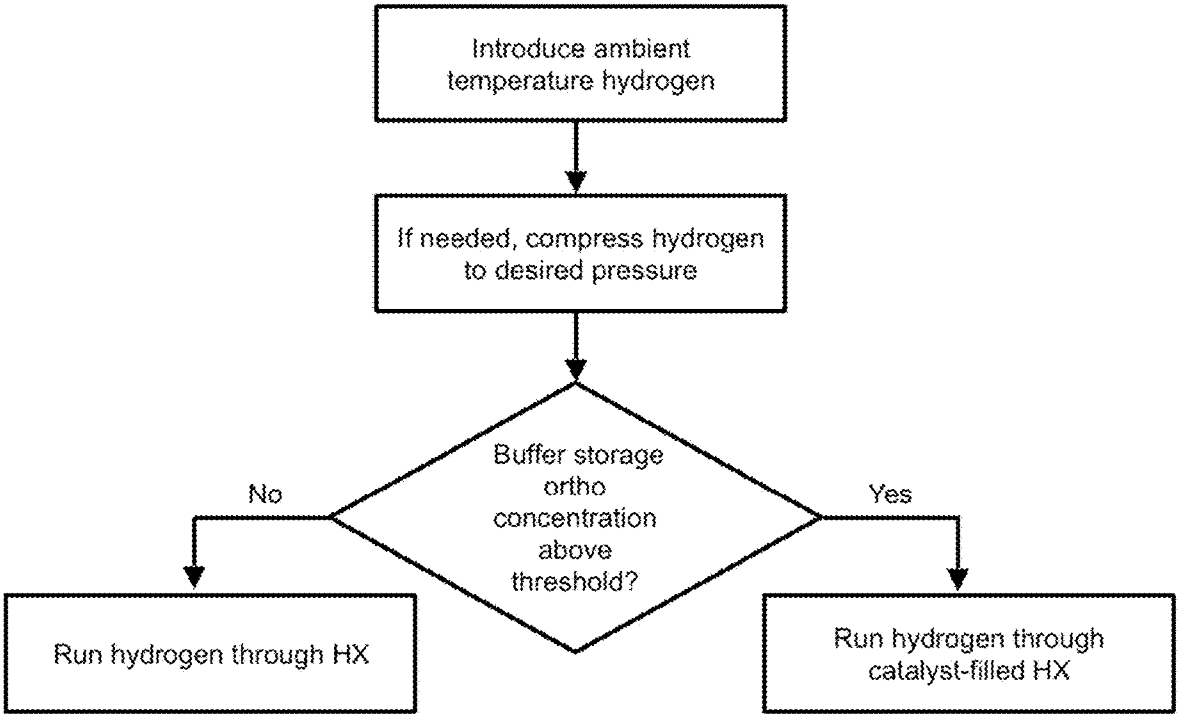
FIG. 36 is a directed flowchart representation of an example method for preparing and maintaining cryo-compressed hydrogen.

In some variations, production of cryo-compressed hydrogen may include variations to produce cryo-compressed hydrogen of a targeted ortho-para concentration. Such a variation may additionally include optionally exposing of the hydrogen fuel to a catalyst. In some variations, the catalyst may be integrated into a heat exchanger though a catalyst system may be integrated into other components where exposure to the catalyst is possible. As shown in FIG. 36, production of cryo-compressed hydrogen may have the option of exposing the hydrogen to a catalyst-filled heat exchanger (HX) or running the hydrogen through the heat exchanger without exposure to the catalyst.

The method may also be implemented as just a fuel dispensation method. That is, a method for demand-side cryo-compressed hydrogen utilization, includes: maintaining the cryo-compressed hydrogen, comprising determining an ortho-hydrogen threshold, modifying the cryo-compressed hydrogen to the ortho-hydrogen threshold, storing the cryo-compressed hydrogen according to the ortho-hydrogen threshold, and re-cooling the cryo-compressed hydrogen, as needed; and dispensing the cryo-compressed hydrogen, comprising determining a type of cryo-compressed hydrogen utilization, comprising determining the appropriate ortho-hydrogen threshold for utilization. This method may function to preferentially provide cryo-compressed hydrogen dependent on utilization need and flow rates required. In some instances, a cascade refueling protocol can be implemented. As such, various pressures can be maintained in the array of storage tanks.

Figure 33:
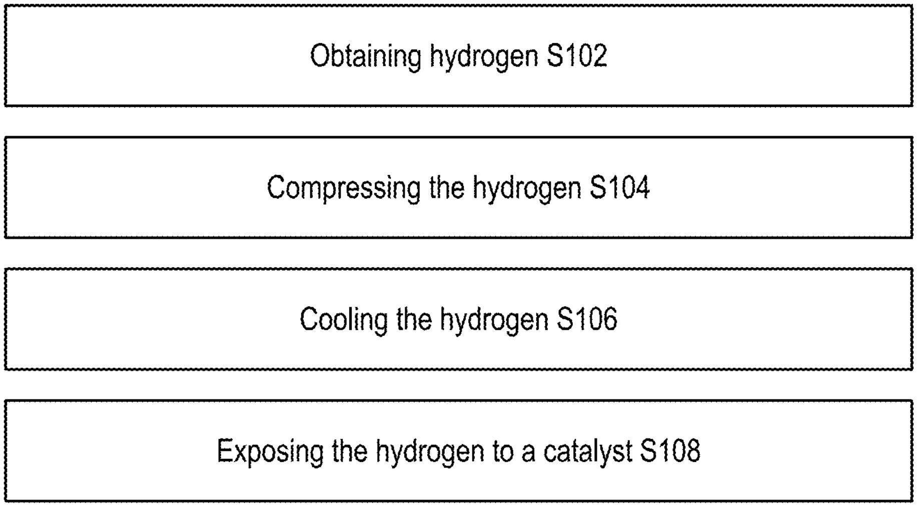
FIG. 33 is a flowchart representation of an example method for preparing cryo-compressed hydrogen.

Block S100, which includes preparing a cryo-compressed hydrogen functions to produce cryo-compressed hydrogen directly from gaseous hydrogen without initially producing liquid hydrogen (e.g., as shown in FIG. 22 with the bold solid path). As shown in FIG. 33, preparing a cryo-compressed hydrogen may include: obtaining hydrogen S102, compressing the hydrogen S104, and cooling the high-pressure hydrogen S106. As shown in FIG. 39, block S100 provides a more energy efficient method of producing cryo-compressed hydrogen as compared to initially producing liquid hydrogen. That is, directly preparing cryo-compressed hydrogen S100 enables efficient cryo-compressed hydrogen production at any scale.

Block S102, which includes obtaining hydrogen, functions in acquiring hydrogen for processing. Obtaining hydrogen S102, may occur from an external source. Alternatively, obtaining hydrogen S102 may comprise a production process (e.g., electrolysis), wherein hydrogen is extracted from a fluid (e.g., water). Obtaining hydrogen S102 typically comprises obtaining hydrogen gas at ambient or near ambient conditions. Alternatively, obtaining hydrogen S102 may comprise obtaining previously processed hydrogen (e.g., high pressure hydrogen, pre-cooled hydrogen, liquid hydrogen, etc.). Gaseous hydrogen can be channeled or otherwise supplied to a compressor system.

Block S104, which includes compressing the hydrogen, functions to produce high pressure hydrogen from the obtained hydrogen. Preferably, compressing the hydrogen S104 increases the pressure of the hydrogen to the desired cryo-compressed pressure (~200-700 bar). Compressing the hydrogen S104 may include utilizing a compressor for pressurizing the hydrogen. In some variations, compressing the hydrogen S104 may occur in conjunction with other hydrogen processing steps, such as cooling the hydrogen S106. For example, cooling power may be utilized from a cooling system, e.g., a cooling system from the system as described above.

Block S106, which includes cooling the hydrogen, functions to produce cooled hydrogen from the obtained hydrogen. Preferably, cooling the hydrogen S106 decreases the temperature of the hydrogen to the desired cryo-compressed temperature (~33-200 K). Cooling the hydrogen S106 may include utilizing a refrigeration system for cooling the hydrogen. In some variations, cooling the hydrogen S106 may occur in conjunction with other hydrogen processing steps, such as compressing the hydrogen S104. Cooling the hydrogen may include passing the hydrogen fuel through a heat exchanger or transferring it into a cryo-compressed storage unit which is maintained at cryogenic temperatures.

In some variations, preparing the cryo-compressed hydrogen can include exposing the hydrogen fuel to a catalyst S108. Exposing the hydrogen fuel to a catalyst may be used to alter the para and/or ortho concentrations. In one variation, the catalyst is integrated within the heat exchanger. Accordingly, in some variations cooling the hydrogen fuel (e.g., fuel in a compressed state) includes passing the hydrogen fuel in the compressed state through a heat exchanger and exposing the hydrogen fuel to a catalyst while within the heat exchanger. In one variation, the catalyst is integrated as one optional conduit channel running through the heat exchanger and where there is another optional conduit channel running through the heat exchanger without the catalyst (if no change to the ortho-para concentrations is desired). As indicated above, the method may re-expose the hydrogen to a catalyst until a desired ortho concentration level is achieved. In one variation, this level may be approximated or determined based on temperature measurements and how they differ from a reference temperature when no or little ortho to para conversion occurred.

Figure 34:
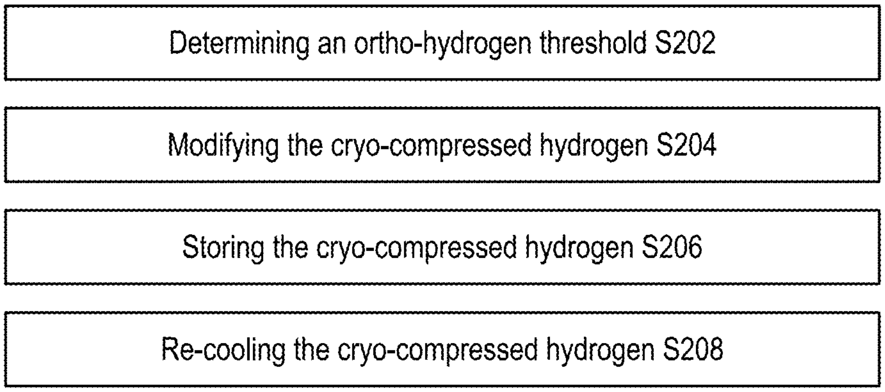
FIG. 34 is a flowchart representation of an example method for maintaining cryo-compressed hydrogen.

Block S200, which includes maintaining the cryo-compressed hydrogen, functions in storing the hydrogen. More specifically, block S200 may function in storing hydrogen in the desired hydrogen state and/or converting and then storing the hydrogen in the desired stored state. Maintaining the cryo-compressed hydrogen S200 includes: determining an ortho-hydrogen threshold S202 based on operating profile, modifying the cryo-compressed hydrogen S204 to the ortho-hydrogen threshold, storing the cryo-compressed hydrogen S206, and re-cooling the cryo-compressed hydrogen S208 as shown in FIG. 34.

Block S202, which includes determining an ortho-hydrogen threshold, functions to set a desired maximum ortho-hydrogen concentration for the cryo-compressed hydrogen based on the desired use case. Typically, ortho-hydrogen concentration can range from 75% to <0.3%. Normal hydrogen, which is 75% ortho hydrogen, is the typical hydrogen at the inlet of the process. The final ortho concentration, or the threshold value, depends on the desired use case.

At one extreme, is the use case of long-term storage (or extended use). For long term storage (or extended use), the ortho-hydrogen threshold may be at or near 15% ortho-hydrogen. Determining a long-term threshold may be based on use cases where cryo-compressed hydrogen will be dispensed for non-immediate usage (e.g., a fueled vehicle that won't be operated for several days), or slow usage (e.g., a fueled vehicle or data center uses cryo-compressed hydrogen in small amounts or intermittently) and the temperature of the hydrogen system. From a supply side "use case", determining a long-term threshold may be based on having a sufficiently large amount of unused cryo-compressed hydrogen at hand. For example, cryo-compressed hydrogen has been produced (or is being produced), but no vehicles are present for fueling. As the hydrogen will not be immediately used, it may be designated as long-term storage.

The ortho-concentration can be used to control the pressurization rate of the system. As it is desirable for the system to contain an array of tank at various pressure levels, in order to meet various refueling protocols, the pressurization rate can be controlled by the ortho-concentration of the hydrogen that is introduced into the vessels. A cryo-compressed hydrogen storage vessel with high ortho-concentration will have a higher pressurization rate than a system with cryo-compressed hydrogen with equilibrium ortho hydrogen at a cryogenic temperature.

At the other extreme, is the use case of short-term storage (or immediate use). For short storage (or immediate use), the ortho-hydrogen threshold may be set at, or near, the ortho ambient concentrations (e.g., normal hydrogen concentrations with ~75% ortho-hydrogen). Determining a short-term threshold may be based on use cases where cryo-compressed hydrogen will be dispensed for immediate use. For example, this may include the use case in which cryo-compressed hydrogen is soon dispensed into a truck (e.g., the use case where the truck is going to drive immediately for a long-haul operation). From a supply-side use-case, determining a short-term threshold may be based on a shortage of hydrogen. For example, if the demand for hydrogen is sufficiently high, there may be no time for further processing of cryo-compressed hydrogen and vehicles may be directly fueled as cryo-compressed hydrogen is produced. In such examples, the hydrogen ortho-threshold can remain high, such as 75%. This further minimizes the energy cost of the process, as cooling power is not needed to compensate the exothermic ortho-to-para transition. As the hydrogen is going to be quickly used, there is low probably of the conversion occurring after being dispensed.

As the method functions to produce and distribute cryo-compressed hydrogen, determining an ortho-hydrogen threshold S202 may change, or be changed, dynamically. Determining an ortho-hydrogen threshold S202, may set any threshold between the two extreme use cases (short term and long term). As method operations occur over longer periods, the threshold may become better optimized dependent on the methods for cryo-compressed production and demand and types of utilization.

Additionally or alternatively, in variations where the method is implemented for systems with multiple storage containers, an ortho-hydrogen threshold may be set for each container. Determining an ortho-hydrogen threshold S202 may be set manually. Alternatively, the ortho-hydrogen threshold may be automatically set dependent on the method parameters, refueling demand, and the type of truck driving. These parameters may further include: amount of cryo-compressed hydrogen currently stored, current state for the cryo-compressed hydrogen in each storage container, total storage container capacity, rate of cryo-compressed production, demand for cryo-compressed hydrogen (quantity and type). Additional or alternative parameters may also be included in determining ortho-hydrogen threshold S202.

Block S204, which includes modifying the cryo-compressed hydrogen, functions to alter the state of the cryo-compressed hydrogen. In one variation, modifying the cryo-compressed hydrogen involves converting cryo-compressed hydrogen to the desired ortho-hydrogen threshold. That is, block S204 functions to reduce the ortho-hydrogen concentration of the cryo-compressed hydrogen, until it is below the threshold set by block S202. In many variations, this may be done in conjunction with re-cooling the cryo-compressed hydrogen and storing the hydrogen for a given duration. The cooling of hydrogen drives down the equilibrium ortho concentration and the specific storage duration enable the hydrogen to reach this equilibrium value. As the conversion itself heats the stored hydrogen, there is constant feedback between the current ortho-hydrogen concentration and whether additional re-cooling cycles are required. Additionally, modifying the cryo-compressed hydrogen S204 may occur in conjunction with preparing a cryo-compressed hydrogen S100.

In many variations, modifying the cryo-compressed hydrogen S204 includes incorporating a catalyst. Incorporating catalyst functions to improve reaction kinetics, thereby enabling faster ortho to para conversion. A catalyst may be particularly important in use cases where demand for long-term storage cryo-compressed hydrogen is high. This method can involve running the hydrogen through a catalyst-filled heat exchanger, such as that depicted in FIG. 31. Additionally or alternatively, particularly when demand is not so high, block S204 may not take any real action, as ortho to para conversion occurs naturally over slower time scales (e.g., over 10-20 days), or perhaps the threshold ortho value is that of normal hydrogen.

Block S206, which includes storing the cryo-compressed hydrogen, functions to store the cryo-compressed hydrogen at, or below, the determined ortho-hydrogen concentration. Storing the cryo-compressed hydrogen preferably stores the cryo-compressed hydrogen in containers able to hold and sufficiently insulate the cryo-compressed hydrogen (i.e., mid to low temperatures and high pressures). In many variations, dependent on the ortho-concentration, this storage may be in specific containers allocated for short-term or long-term storage, or somewhere in between. Generally, the lower the ortho-concentration, the longer the term of storage.

In some variations, the method may include variations of selectively transferring hydrogen to one of a set of storage vessels of a storage system. The cryo-compressed hydrogen may be stored into a storage vessel based on the ortho-hydrogen concentration, such that at least two different storage vessels in the storage system may have differing ortho concentrations. In this way, the method involves establishing a cryo-compressed hydrogen buffer array with known and different ortho-concentrations and pressures, to enable tailored fuel for various use cases and fueling protocols. A dispensing system may selectively engage with at least one of the set of storage vessels based on a desired ortho-concentration (or dormancy). In some cases, the different cryo-compressed hydrogen fuel with differing ortho-concentrations within the storage vessels may be mixed or combined to adjust ortho-concentrations across the storge system and/or when dispensing.

Block S208, which includes re-cooling the cryo-compressed hydrogen functions to remove the heat of conversion and potentially any external heat introduced into the system as needed to maintain the ortho-threshold value. Re-cooling the cryo-compressed hydrogen may incorporate any desired refrigeration method. Re-cooling the cryo-compressed hydrogen can also involve running the hydrogen through a catalyst-filled heat exchanger.

As another option, maintaining the cryo-compressed hydrogen S200 may include venting gaseous hydrogen from the storages system and recycling the gaseous hydrogen to a compressor for compressing and cooling the hydrogen back to a cryo-compressed state.

Block S300, which includes dispensing the cryo-compressed hydrogen functions to provide the cryo-compressed hydrogen for use. Block S300 may be specific for the implemented use case, with significant variations on what it is dispensed to (e.g., truck fuel, airplane fuel, data center energy supply, etc.) and general trends in how the fuel has been used or expected to be used (e.g., quantity, rate of use, etc.).

In some variations, dispensing the cryo-compressed hydrogen may additionally include cooling the hydrogen fuel in a cryo-compressed state during dispensing. In one particular variation, the cooling of the hydrogen fuel during dispensing may include cycling the hydrogen fuel back through a heat exchanger during dispensing as shown in FIG. 10B. Accordingly, the method may include dispensing the hydrogen in the cryo-compressed state by cycling the hydrogen fuel in the cryo-compressed state from the storage system through the heat exchanger to an output.

Figure 35:
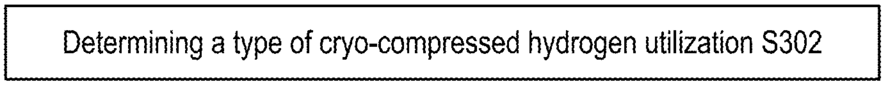
FIG. 35 is a flowchart representation of an example method for dispensing cryo-compressed hydrogen.
Figure 40:
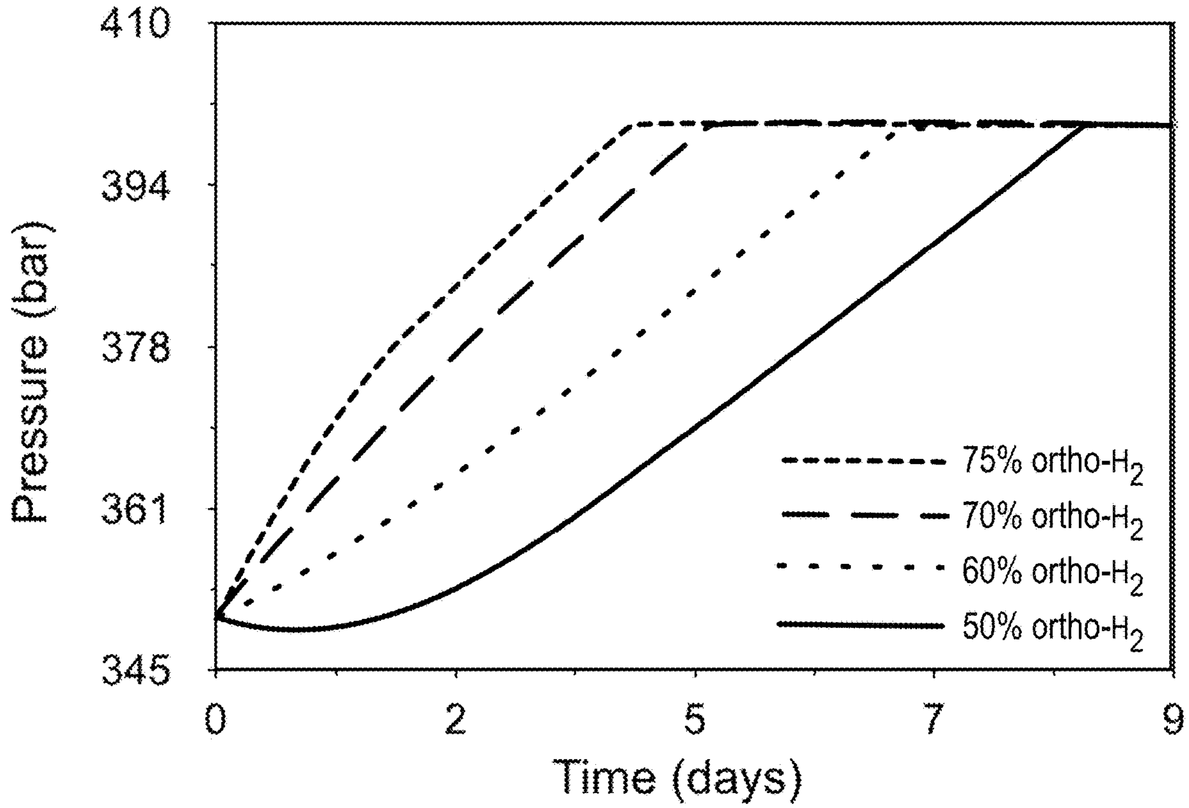
FIG. 40 is a graph showing the dormancy for cryo-compressed hydrogen for different ortho-hydrogen concentrations.
Figure 41:
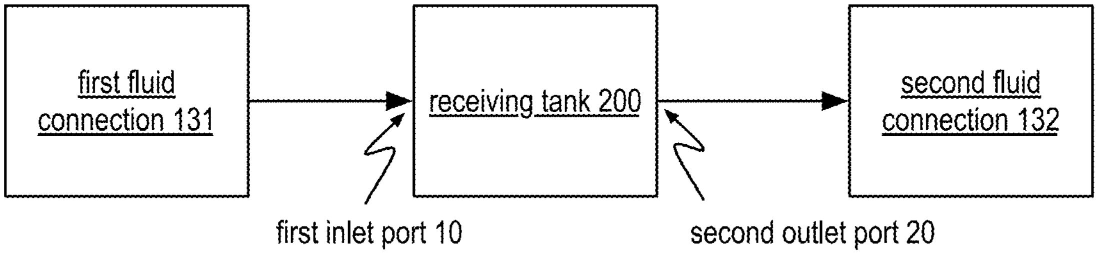
FIG. 41 is a schematic diagram of a variant of the system.

Dispensing the cryo-compressed hydrogen S300 may, in some variations include determining a type of cryo-compressed hydrogen utilization S302 as shown in FIG. 35. As shown in FIG. 40, the ortho-para ratio may be controlled to target different to improve cryo-compressed hydrogen dormancy, thereby avoiding venting. For example, tuning the ortho-concentration to 50% can double the dormancy relative to normal hydrogen.

Block S302, which includes determining a type of cryo-compressed hydrogen utilization, functions to determine at what rate the cryo-compressed hydrogen will be used as a fuel, and thereby an appropriately improved ortho-hydrogen threshold to dispense for utilization. Note that conversion, such as via catalyst, requires additional energy to compensate for the exothermic conversion. As a result, this method optimizes energy savings based on desired used case. For example, for use cases, where the cryo-compressed hydrogen will be immediately used, unmodified (or short term) cryo-compressed hydrogen may be allocated. For example, this may be the case for heavy construction vehicles that will directly use large quantities of fuel immediately following refueling. Alternatively, for use cases where the cryo-compressed hydrogen will be used slowly, or not used at all for some time, very low ortho-hydrogen threshold (or relatively long-term) may be allocated. For example, this may be the case for a truck that is refueled right before a holiday, and will not be operated for several days. As another example, a truck is fueled 1-2 days before it drives, due to refueling station constraints. In such a case, the additional energy required to ensure a low ortho-threshold, perhaps even equilibrium ortho-concentration, is justified.

The method(s) can be performed automatically, manually, responsive to a control input (e.g., at a manual coupling; manual input; etc.), responsive to satisfaction of a trigger condition (e.g., establishment of fluid connection between the receiving vessel and the buffer storage, etc.), and/or with any other suitable timing. All or portions of the method can be performed in real time (e.g., responsive to a request), iteratively, concurrently, asynchronously, periodically, and/or at any other suitable time. All or portions of the method can be performed automatically, manually, semi-automatically, and/or otherwise performed. All or portions of the method can be performed by one or more components of the system, controlled using a computing system, using a database (e.g., a system database, a third-party database, etc.), manually regulated by a user (e.g., operating a manual valve or controller), and/or by any other suitable system. The computing system can include one or more: CPUs, GPUs, custom FPGA/ASICS, microprocessors, servers, cloud computing, and/or any other suitable components. The computing system can be local, remote, distributed, or otherwise arranged relative to any other system or module.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A cascade system for cryo-compressed hydrogen ($CcH_2$) dispensation comprising:

a cryogenic pump;

a plurality of cryogenic buffer storage tanks, each housing $CcH_2$ and configured to be selectively fluidly coupled to the cryogenic pump;

a cooling system thermally coupled to the plurality of cryogenic buffer storage tanks, wherein the cooling system is configured to maintain an internal temperature of the plurality of cryogenic buffer storage tanks within a cryogenic temperature range;

a hydrogen dispenser comprising a set of fluid connections configured to be selectively coupled to the plurality of cryogenic buffer storage tanks; and a receiving tank comprising: a first inlet port and a second outlet port, the first inlet port coupled to a first fluid connection of the hydrogen dispenser, wherein $CcH_2$ pressure within the first fluid connection is configured to circulate $CcH_2$ through the second outlet port.

2. The cascade system for cryo-compressed hydrogen ($CcH_2$) dispensation of claim 1, wherein the second outlet port is configured to be selectively fluidly coupled to a cryogenic buffer storage tank of the plurality via a second fluid connection of the hydrogen dispenser to reduce temperature rise due to hydrogen compression within the receiving tank during $CcH_2$ dispensation.

3. The cascade system for cryo-compressed hydrogen ($CcH_2$) dispensation of claim 1, wherein the first fluid connection is configured to catalyze hydrogen spin-state conversion.

4. The cascade system for cryo-compressed hydrogen ($CcH_2$) dispensation of claim 1, wherein the plurality of cryogenic buffer storage tanks comprises a cascade filling system based on $CcH_2$ pressure.

5. A method for managing cryo-compressed hydrogen comprising:

compressing a mass of hydrogen gas ($GH_2$) using a compressor;

using a cooling system thermally coupled to a plurality of cryogenic buffer storage tanks, cooling the mass of compressed hydrogen gas ($CGH_2$) to a cryo-compressed hydrogen ($CcH_2$) state;

storing the mass of $CcH_2$ in the plurality of cryogenic buffer storage tanks;

dispensing, from the plurality of cryogenic buffer storage tanks, a first portion of the mass of $CcH_2$ by cascade filling; and concurrently with dispensing the first portion of the mass of $CcH_2$, cooling the first portion and catalyzing a hydrogen spin state conversion.

6. The method of claim 5, further comprising: dispensing a second portion of the mass of $CcH_2$, from at least one cryogenic buffer storage tank of the plurality; and heating the second portion to produce $CGH_2$.

7. The method of claim 6, wherein the first and second portion comprise hydrogen gas from a first cryogenic buffer storage tank of the plurality of cryogenic buffer storage tanks.

8. The method of claim 5, wherein the first portion of the mass of $CcH_2$ is dispensed into a receiving tank via a first fluid connection, the method further comprising: contemporaneously with dispensing the first portion of the mass of $CcH_2$, evacuating a subset of the first portion through an outlet of the receiving tank contemporaneous with dispensation into the receiving tank.

9. The method of claim 8, further comprising: externally cooling the subset of the first portion relative to the receiving tank; and, subsequently, storing the subset of the first portion.

10. The method of claim 9, wherein the subset of the first portion is stored in a cryogenic buffer storage tank of the plurality.

11. The method of claim 8, wherein evacuating the subset of the first portion reduces compressive heating of $CcH_2$ within the receiving tank caused by hydrogen entering through the first fluid connection.

12. The method of claim 11, wherein a fluid pressure within the first fluid connection is above 350 bar.

13. The method of claim 11, wherein the pressure differential across the receiving tank is less than 50 bar.

14. The method of claim 5, wherein a mass flow rate of dispensation of the first portion is more than double a maximum mass flow rate of the compressor.

15. The method of claim 5, wherein the plurality of cryogenic buffer storage tanks defines a cascade of $CcH_2$ pressures, wherein dispensing the first portion of the mass of $CcH_2$ comprises selectively dispensing from the plurality of cryogenic buffer storage tanks, based on the cascade of $CcH_2$ pressures, from lowest to highest $CcH_2$ pressure.

16. The method of claim 15, wherein selectively dispensing from the plurality of cryogenic buffer storage tanks is further based on a $CcH_2$ ortho-concentration.

17. The method of claim 15, further comprising: after dispensing $CcH_2$ from a first cryogenic buffer storage tank of the plurality, selectively heating the depleted first cryogenic buffer storage tank to increase the $CcH_2$ pressure within the first cryogenic buffer storage tank.

18. The method of claim 5, further comprising venting gaseous hydrogen from the plurality of cryogenic buffer storage tanks; and recycling the gaseous hydrogen to the compressor.

19. The method of claim 5, wherein the first portion is cooled using liquid nitrogen ($LN_2$).

20. The method of claim 5, wherein the first portion is cooled using a refrigeration system.

* * * * *